US012353319B2

(12) United States Patent
Hoermann

(10) Patent No.: US 12,353,319 B2
(45) Date of Patent: Jul. 8, 2025

(54) SCALABLE EXECUTION TRACING FOR LARGE PROGRAM CODEBASES

(71) Applicant: Oracle International Corporation, Redwood City, CA (US)

(72) Inventor: Christian Rudolf Hoermann, Cary, NC (US)

(73) Assignee: Oracle International Corporation, Redwood City, CA (US)

( * ) Notice: Subject to any disclaimer, the term of this patent is extended or adjusted under 35 U.S.C. 154(b) by 110 days.

(21) Appl. No.: 18/052,888

(22) Filed: Nov. 4, 2022

(65) Prior Publication Data

US 2023/0094191 A1   Mar. 30, 2023

Related U.S. Application Data

(63) Continuation of application No. 16/844,902, filed on Apr. 9, 2020, now Pat. No. 11,494,287, which is a continuation of application No. 15/941,953, filed on Mar. 30, 2018, now Pat. No. 10,657,031.

(51) Int. Cl.
| | |
|---|---|
| *G06F 11/3698* | (2025.01) |
| *G06F 11/3604* | (2025.01) |
| *G06F 11/362* | (2025.01) |
| *G06F 11/3668* | (2025.01) |

(52) U.S. Cl.
CPC ...... *G06F 11/3698* (2025.01); *G06F 11/3612* (2013.01); *G06F 11/3668* (2013.01)

(58) Field of Classification Search
CPC ............. G06F 11/3664; G06F 11/3612; G06F 11/3668; G06F 11/323; G06F 2201/86; G06F 11/3636; G06F 11/3644
See application file for complete search history.

(56) References Cited

U.S. PATENT DOCUMENTS

| | | | |
|---|---|---|---|
| 5,889,993 | A | 3/1999 | Kroeger |
| 6,134,676 | A | 10/2000 | VanHuben |
| 6,189,141 | B1 | 2/2001 | Benitez et al. |
| 6,327,699 | B1 | 12/2001 | Larus et al. |
| 7,251,809 | B2 | 7/2007 | Barclay et al. |
| 7,802,149 | B2 | 9/2010 | Cruickshank et al. |
| 7,827,539 | B1 | 11/2010 | Wygodny et al. |

(Continued)

OTHER PUBLICATIONS

"Eclipse Diver—Dynamic Interactive View for Reverse Engineering", Retrieved from URL: https://eclipsediver.wordpress.com/docs/ on Jan. 5, 2018, pp. 1-55.

(Continued)

*Primary Examiner* — Daxin Wu
(74) *Attorney, Agent, or Firm* — Robert C. Kowert; Kowert, Hood, Munyon, Rankin & Goetzel, P.C.

(57) ABSTRACT

Indications of a plurality of events whose occurrence is detected in a particular execution of a program are obtained. One or more partitions of a trace object corresponding to the execution are constructed, including a first partition corresponding to a first subset of the events. The first partition comprises a header portion which includes a compressed representation of one or more event chains, and a data portion comprising a compressed events record indicating an occurrence, during the execution, of a particular sequence of events indicated by an event chain. The trace object is stored.

20 Claims, 26 Drawing Sheets

(56) References Cited

U.S. PATENT DOCUMENTS

| | | | |
|---|---|---|---|
| 8,091,074 B2* | 1/2012 | Lyon-Smith | G06F 8/33 |
| | | | 717/128 |
| 8,799,927 B1 | 8/2014 | Taylor | |
| 9,632,915 B2* | 4/2017 | Davis | G06F 11/3612 |
| 9,658,941 B2* | 5/2017 | Voccio | G06F 11/3636 |
| 9,658,943 B2 | 5/2017 | Gounares | |
| 10,025,412 B2 | 7/2018 | Shepelev | |
| 2001/0034598 A1 | 10/2001 | Swoboda | |
| 2001/0043122 A1 | 11/2001 | Swoboda | |
| 2005/0091643 A1 | 4/2005 | Ekanadham | |
| 2006/0195444 A1 | 8/2006 | Sastry | |
| 2006/0259827 A1 | 11/2006 | Sohm et al. | |
| 2008/0126828 A1 | 5/2008 | Girouard | |
| 2009/0007075 A1 | 1/2009 | Edmark et al. | |
| 2009/0089800 A1 | 4/2009 | Jones et al. | |
| 2010/0333071 A1 | 12/2010 | Kuiper | |
| 2011/0119654 A1 | 5/2011 | Miller et al. | |
| 2011/0197179 A1 | 8/2011 | Kratochvil | |
| 2011/0227925 A1* | 9/2011 | De Pauw | G06T 11/206 |
| | | | 345/440 |
| 2011/0283266 A1* | 11/2011 | Gallagher | G06F 11/3409 |
| | | | 717/130 |
| 2012/0324423 A1 | 12/2012 | Khan et al. | |
| 2013/0047140 A1* | 2/2013 | Shann | G06F 11/3688 |
| | | | 717/127 |
| 2014/0244986 A1 | 8/2014 | Balasundaram | |
| 2015/0212928 A1* | 7/2015 | Gounares | G06F 11/3664 |
| | | | 717/125 |
| 2015/0234730 A1 | 8/2015 | Puthuff et al. | |
| 2016/0124728 A1 | 5/2016 | Mahaffey | |
| 2017/0075792 A1* | 3/2017 | Udvuleanu | G06F 11/3668 |
| 2017/0103011 A1* | 4/2017 | Ida | G06F 11/34 |
| 2018/0129589 A1* | 5/2018 | O'Dowd | G06F 17/40 |
| 2018/0307544 A1 | 10/2018 | Chen | |
| 2019/0065346 A1* | 2/2019 | Krauss | G06F 11/3612 |
| 2019/0303270 A1 | 10/2019 | Hoermann | |

OTHER PUBLICATIONS

"Navigating through Code with the Debugger", Retrieved from URL: https://msdn.microsoft.com/en-us/library/y740d9d3.aspx on Jan. 5, 2018, pp. 1-8.

"What is Chronon?", Retrieved from URL: http://chrononsystems.com/what-is-chronon/technology on Jan. 5, 2018, pp. 1-3.

* cited by examiner

Annotated header decompression example 1402

```
Reading header
Read  1 bits: 0 # There is another chain to process. Each chain
starts with an uncompressed 4 byte event ID
Read 32 bits: 536876001 # header[0] = 536876001
Read  1 bits: 0 # Next eventID is delta + previous event ID
Read  4 bits: 2 # header[1] = 536876003
Read  1 bits: 1 # Need to read 1 more bit to decide next step
Read  1 bits: 0 # Uncompressed 4 byte event ID follows
Read 32 bits: 971 # header[2] = 971
Read  1 bits: 1 # Need to read 1 more bit to decide next step
Read  1 bits: 0 # Uncompressed 4 byte event ID follows
Read 32 bits: 536876006 # header[3] = 536876006
Read  1 bits: 1 # Need to read 1 more bit to decide next step
Read  1 bits: 0 # Uncompressed 4 byte event ID follows
Read 32 bits: 536876033 # header[4] = 536876033
Read  1 bits: 0 # Next eventID is delta + previous event ID
Read  4 bits: 2 # header[5] = 536876035
Read  1 bits: 0 # Next eventID is delta + previous event ID
Read  4 bits: 3 # header[6] = 536876038
Read  1 bits: 0 # Next eventID is delta + previous event ID
Read  4 bits: 1 # header[7] = 536876039
Read  1 bits: 0 # Next eventID is delta + previous event ID
Read  4 bits: 2 # header[8] = 536876041
Read  1 bits: 1 # Need to read 1 more bit to decide next step
Read  1 bits: 0 # Uncompressed 4 byte event ID follows
Read 32 bits: 973 # header[9] = 973
Read  1 bits: 1 # Need to read 1 more bit to decide next step
Read  1 bits: 0 # Uncompressed 4 byte event ID follows
Read 32 bits: 536876042 # header[10] = 536876042
Read  1 bits: 0 # Next eventID is delta + previous event ID
Read  4 bits: 1 # header[11] = 536876043
Read  1 bits: 1 # Need to read 1 more bit to decide next step
Read  1 bits: 1 # Back reference follows. Bits to read is approx.
log2(count of eventIDs processed so far)
Read  4 bits: 11 # header[12] = back reference to index 11 (During
decompression, in the header[], a back reference may be stored as a
32bit integer and flagged by making the top 3 bits 111)
####### end of event chain
Read  1 bits: 0 # There is another chain to process. Each chain
starts with an uncompressed 4 byte event ID
Read 32 bits: 536876100 # header[13] = 536876100
Read  1 bits: 0 # Next eventID is delta + previous event ID
Read  4 bits: 4 # header[14] = 536876104
Read  1 bits: 1 # Need to read 1 more bit to decide next step
Read  1 bits: 0 # Uncompressed 4 byte event ID follows
Read 32 bits: 536876113 # header[15] = 536876113
   . . .
```

FIG. 14

Annotated events
portion
decompression
example 1602

```
Reading a new chain. All chains start with an index into header[]
Read  7 bits: 0 # uncompressed[0] = header[0] = 536876001
Read  1 bits: 1 # Need to read 1 more bit to decide what to do
Read  1 bits: 0 # Next 5 bits specify how many times next event ID is
most likely next event ID indicated in header
Read  5 bits: 8 # Next 8 + 8(baseline) = 16 event IDs can be computed
without reading any more of the data portion
    uncompressed[1]  = header[0+1]  = 536876003
    uncompressed[2]  = header[1+1]  = 971
    uncompressed[3]  = header[2+1]  = 536876006
    uncompressed[4]  = header[3+1]  = 536876033
    uncompressed[5]  = header[4+1]  = 536876035
    uncompressed[6]  = header[5+1]  = 536876038
    uncompressed[7]  = header[6+1]  = 536876039
    uncompressed[8]  = header[7+1]  = 536876041
    uncompressed[9]  = header[8+1]  = 973
    uncompressed[10] = header[9+1]  = 536876042
    uncompressed[11] = header[10+1] = 536876043
    uncompressed[12] = header[11+1] => header[11] = 536876043
    uncompressed[13] = header[11+1] => header[11] = 536876043
    uncompressed[14] = header[11+1] => header[11] = 536876043
    uncompressed[15] = header[11+1] => header[11] = 536876043
    uncompressed[16] = header[11+1] => header[11] = 536876043
Read  1 bits: 1 # Need to read 1 more bit to decide what to do
Read  1 bits: 1 # End of chain (next event ID is not the most likely
next event ID indicated in the header)
...
Read  7 bits: 67 # uncompressed[86] = header[67] = 536876047
Read  1 bits: 0 # Next event is most likely next event ID;
uncompressed[87] = header[67+1] => header[30] = 536876045
Read  1 bits: 0 # Next event is most likely next event ID;
uncompressed[88] = header[30+1] = 536876046
Read  1 bits: 0 # Next event is most likely next event ID;
uncompressed[89] = header[31+1] => header[31] = 536876046
Read  1 bits: 0 # Next event is most likely next event ID;
uncompressed[90] = header[31+1] => header[31] = 536876046
Read  1 bits: 0 # Next event is most likely next event ID;
uncompressed[91] = header[31+1] => header[31] = 536876046
Read  1 bits: 0 # Next event is most likely next event ID;
uncompressed[92] = header[31+1] => header[31] = 536876046
Read  1 bits: 0 # Next event is most likely next event ID;
uncompressed[93] = header[31+1] => header[31] = 536876046
Read  1 bits: 1 # Need to read 1 more bit to decide what to do
Read  1 bits: 1 # End of chain (next event ID is not the most likely
next event ID)

Potential full trace tree 1702
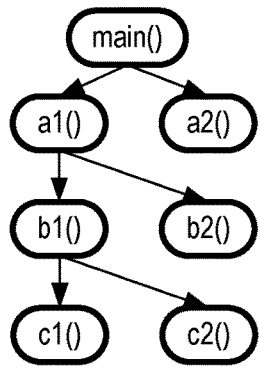
1704: Parse trace object in execution order
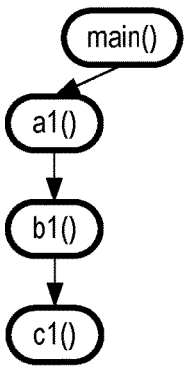
1706: Prune c1() (e.g., based on presence of c1() call and return events within the same partition)
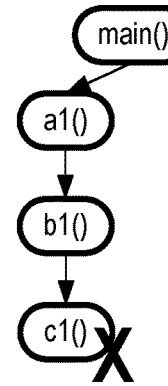
1708: Continue parsing trace object
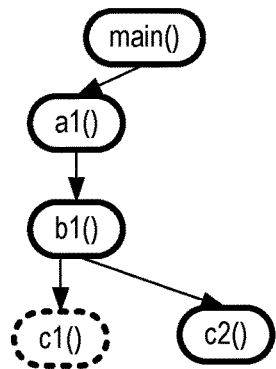
1710: Prune c2() and b(1) (also based on partition locality)
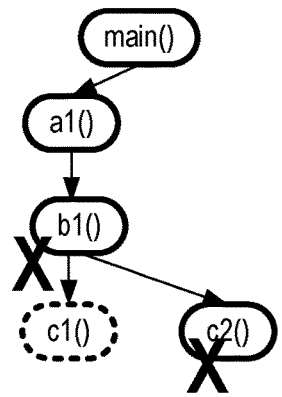
1712: Pruned tree (children nodes of pruned nodes (e.g., children c1() and c2() of b1()) can be instantiated on demand)
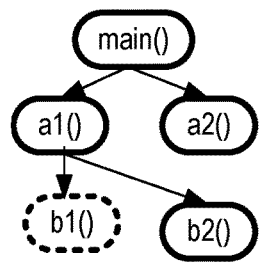
FIG. 17

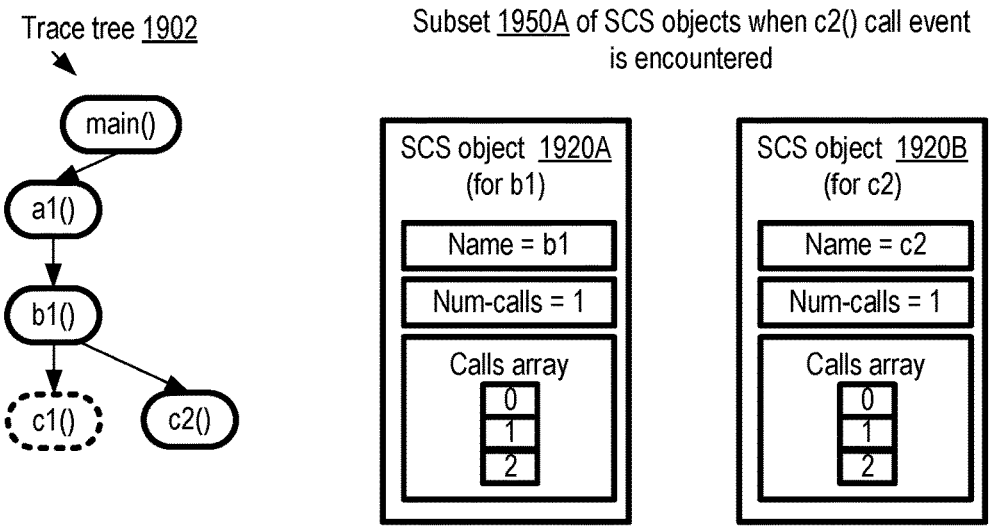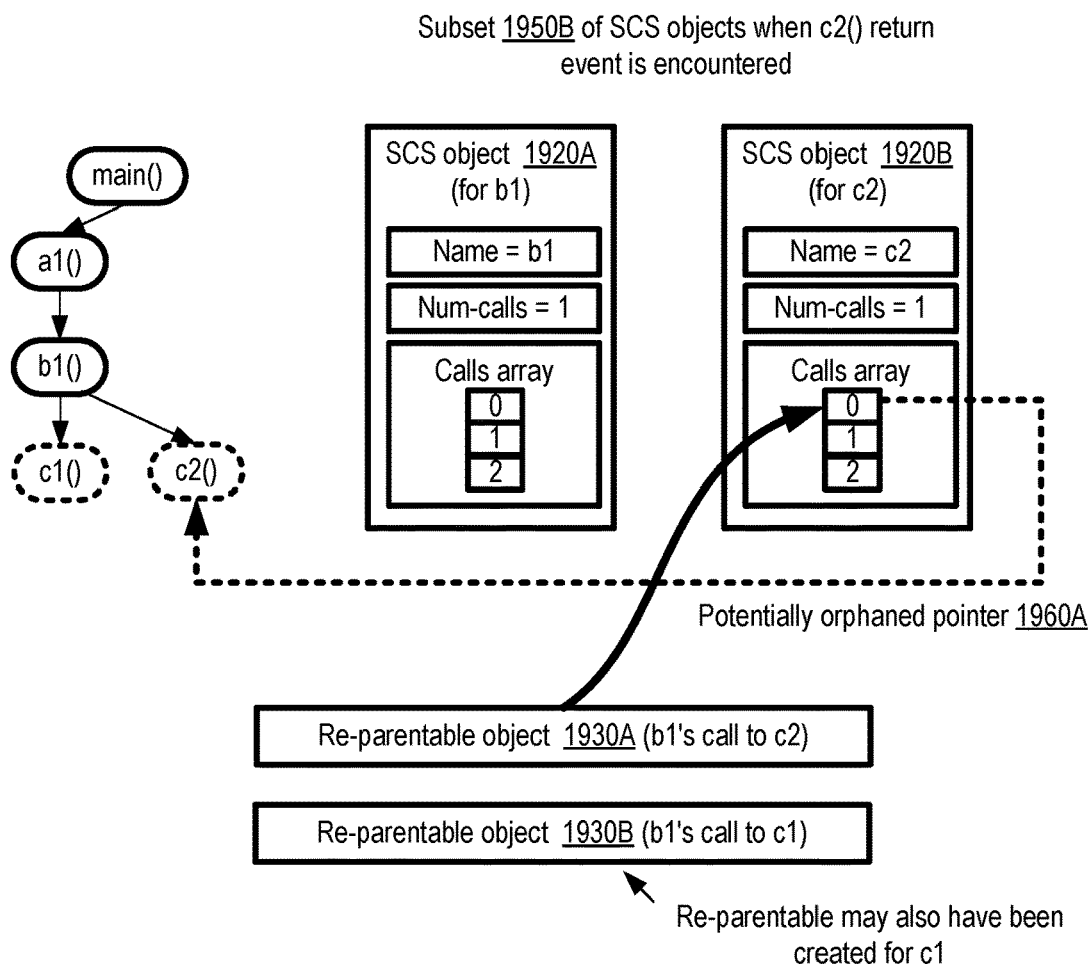
FIG. 19

SCALABLE EXECUTION TRACING FOR LARGE PROGRAM CODEBASES

This application is a continuation of U.S. patent Ser. No. 16/844,902, filed Apr. 9, 2020, which is a continuation of U.S. patent Ser. No. 15/941,953 Mar. 30, 2018, now U.S. Pat. No. 10,657,031, which are hereby incorporated by reference herein in their entirety.

BACKGROUND

The source code underlying many complex applications may comprise tens of thousands of files, with very large numbers of potential invocations or calls between the code represented in the different files. Auditors of the source code (e.g., individuals assigned the task of identifying potential security flaws), as well as new developers assigned to the application, may therefore face a steep learning curve. Even experienced developers involved in designing and coding the application may understand only a small part of the code well, typically limited to a small part of the code that the developers interact with regularly.

With respect to a goal of obtaining a thorough understanding of the common code paths of a sophisticated application such as a database management system, a multi-tier web-based application and the like, existing source code analysis tools, debuggers and integrated development environments (IDEs) may be insufficient for a variety of reasons. Such reasons may include, among others, an inability to quickly narrow down the parts of the code that are most relevant, the imprecision and incompleteness of the analysis provided (for example, with respect to function pointers, which may be used quite frequently in some programs), and/or burdensome configuration requirements. Providing easy-to-use automated tools or services that can efficiently provide accurate insights into source code representing commonly-used flows of application logic remains a non-trivial technical challenge.

SUMMARY

Various embodiments of systems, apparatus and methods for scalable execution tracing of programs with large code bases are disclosed. According to some embodiments, a method may comprise performing, by one or more computing devices, obtaining respective indications of a plurality of events detected in a particular execution of a program. The method may further comprise constructing a plurality of partitions of a trace object corresponding to the particular execution. The plurality of partitions may include a first partition corresponding to a first subset of the plurality of events. The first partition may comprise a header portion and a data portion. The header portion may include a compressed representation of one or more event chains, while the data portion may comprise a compressed events record indicating an occurrence, during the execution, of a particular sequence of events indicated at least in part by an event chain represented in the header portion. The method may further comprise storing the trace object.

According to one embodiment, a method may comprise performing, by one or more computing devices, obtaining a trace object comprising one or more partitions, with individual ones of the partitions comprising an indication of a plurality of events which occurred during an execution of a program. The method may further comprise generating, using the trace object, a visualization data set comprising a plurality of nodes representing respective execution units of at least a portion of the execution. An individual execution unit may correspond to one or more events of the plurality of events. Generating the visualization data set may comprise pruning, from a tree representation of the execution, a node representing a particular execution unit which meets a partition locality criterion. The method may also include causing at least a subset of the plurality of nodes, and one or more source code sections corresponding to respective nodes of the subset, to be displayed via an interactive interface.

According to some embodiments, a method may comprise performing, by one or more computing devices, obtaining an indication of a particular batch of yet-to-be-executed code of a running program. The particular batch may comprise one or more branches including a particular branch which occurs at the end of a particular basic block. (The basic block may not include any branches within it.) The method may include causing an instrumented version of the particular batch to be generated. The instrumented version may comprise tracing instructions inserted at a position reached if the particular branch is taken, and may not include inserted tracing instructions in the particular basic block.

BRIEF DESCRIPTION OF THE DRAWINGS

FIG. 14 illustrates an annotated example of a decompression of part of a header portion of a trace partition, according to at least some embodiments.

FIG. 16 illustrates an annotated example of a decompression of part of a data portion of a trace partition, according to at least some embodiments.

FIG. 17 illustrates an example of pruning of a trace tree generated for a visualization data set, according to at least some embodiments.

FIG. 19, FIG. 20 and FIG. 21 collectively illustrate examples of the creation of "re-parentable objects" during search index generation for some traced programs, according to at least some embodiments.

Figure 1:
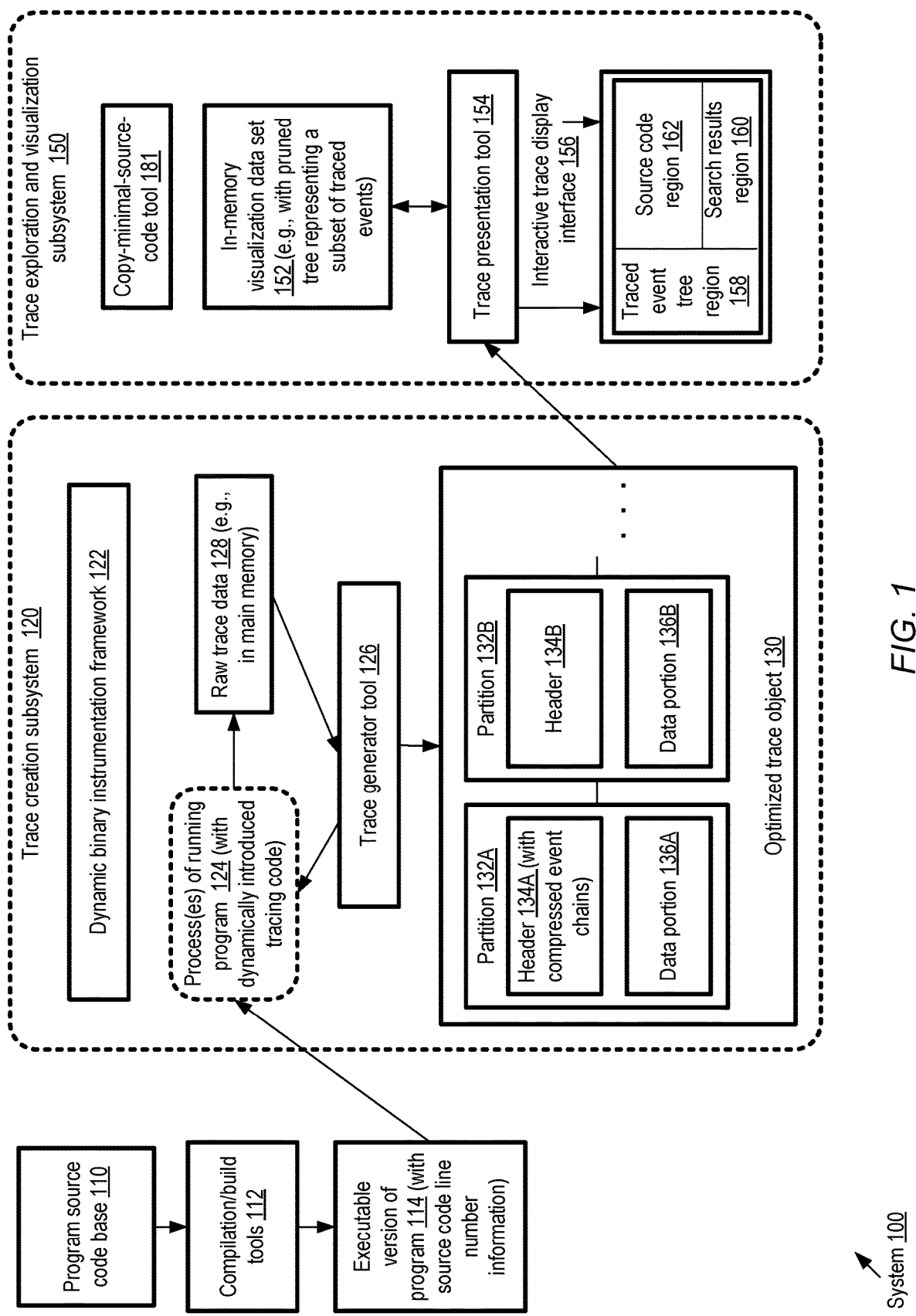
FIG. 1 illustrates an example system environment in which scalable execution tracing for programs with large code bases may be implemented, according to at least some embodiments.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION OF EMBODIMENTS

Various embodiments of systems, apparatus and methods for scalable execution tracing of programs with large code bases, which may be used, for example, to quickly understand the code, help identify security flaws, debug or enhance the code, are disclosed. At a high level, the workflow used for execution tracing in at least some embodiments may be summarized as follows: in a first phase, a highly compressed trace object representing (potentially millions or billions of) events such as function calls and function returns of a program's execution may be created and stored, e.g., with the help of a dynamic code modification tool. In a second phase, the trace object may be analyzed in one or more interactive sessions in various embodiments. In a given session, a space-efficient visualization data set and associated search index may be generated (e.g., in the main memory of a computing device) in some embodiments, enabling users to distinguish the specific lines of source code corresponding to the executable code that was traversed during the execution from the un-executed lines, to search efficiently for various portions of relevant or related source code, and so on.

To accommodate trace data comprising large numbers of events, a dynamically expandable pruned tree representation of at least a subset of the traced events may be generated and presented to users in various embodiments. At least in some embodiments, the tree representation may comprise in-memory nodes representing respective execution units (invocations of source code sections such as functions/procedures/methods), with child nodes of a given execution unit's node indicating other source code sections (if any) invoked from the given execution unit. Note that a given source code section such as a function may of course be invoked multiple times within a given execution of a program; as such, in various embodiments, several different nodes corresponding respectively to the different invocations or execution units of the same source code section may be created within a tree. For example, consider a scenario in which a program P1 includes a main( ) function and another function f1( ) which may be invoked, based on some condition, from the main( ) function one or more times. In one traced execution or run of P1, main( ) may invoke f1( ) five times, resulting in a trace in which five execution units corresponding to f1( ) are captured, and a tree with five nodes corresponding to f1( ) may therefore be constructed. In another traced execution of P1, f1( ) may be called three times from main( ) resulting in three execution units (and, therefore, three tree nodes) corresponding to f1( ) When a node is pruned from the tree in memory, information about the location/address in the trace object where information about the pruned node and its child nodes can be obtained may be retained in memory in various embodiments in a compact data structure, while the child nodes may be removed from memory, thereby reducing the overall amount of memory required. Information about the child nodes may be retrieved into memory from a persistent version of the trace object if and when requested.

Using such optimized trace generation and interactive trace presentation techniques, a comprehensive view of the actual execution of the program (e.g., at the granularity of individual source code lines) may be provided, e.g., with the help of path-specific highlighting. The technical advantages achieved in some embodiments may include enabling a user to view at a glance (via highlighting) the path taken through a particular function's invocation without having to laboriously step through the code, and to simultaneously view the path through the entire code base (via the tree). Another technical advantage may comprise enabling users of the tracing methodology to quickly see that there may exist another path through a currently visualized function that was taken at some other point in the execution (but not during the current invocation of the currently visualized function). These visualization techniques may make it very easy for developers and other users to understand the flow of control of a program and understand the program's source code. A security analyst or auditor, may, for example, notice in some embodiments that a different path is taken during various invocations of a particular function and that a security check may have been skipped in some cases, which may help enhance the overall security of the application for which the program is being used. Even answering simple questions (e.g., exploring all the calls to a particular function and how they occurred) may be done much more efficiently using the described trace tool in various embodiments than via alternative approaches, such as using a debugger and break points. A user may easily jump around (forward/back in the execution), search for calls, filter based on call stack, create multiple tabs/windows to simultaneously visualize/explore different positions in the program at the same time, and so on. In addition, information about which parts of the application code are used most frequently and are therefore better targets for thorough understanding with respect to bug fixes, future enhancements and the like may be provided. Accurate insight into application logic flows may be provided in various embodiments without configuration overhead using the optimized tracing techniques, even when the overall source code base comprises tens of thousands of source code files written by numerous developers over long development cycles.

According to one embodiment, a method may comprise instrumenting, by one or more computing devices, an executable version of a program which contains information about the lines of source code corresponding to various executable instructions of the program. Such instrumenting may, for example, comprise dynamically inserting trace record generation instructions into a running instance or process of the program in some embodiments, without modifying the persistent (e.g., on-disk) version of the executable. In at least some embodiments, a dynamic code modification tool or instrumentation framework supported by a hardware vendor of the processors/cores used for running the program may be employed to insert the trace record generation instructions so as to capture various types of events, such as entries to and exits from functions, methods or procedures, single-entry blocks of code which may include one or more exits (an example of such a block is provided below), and so on. In various embodiments, the term "execution unit" may be used to refer to invocations of any of at least the following source code sections or constructs (some of which may be programming-language dependent): functions, methods, procedures, and/or at least some types of code blocks which have a single entry and may include one or more exits via respective branches. A given execution unit may have a starting trace event (e.g., a call to a function) and an ending trace event (e.g., a return from a function) in various embodiments. In at least some embodiments, the dynamic instrumentation may require no changes to the application source code, and may be implemented after the executable version of the program has already been generated (e.g., after a program has been compiled with the options needed to capture source code information, as part of a normal build workflow).

In various embodiments, the instrumentation code inserted into the program may be structured so as to minimize the overhead associated with recording events, while still being able to capture unusual or uncommon events (such as exceptions or errors) which may be necessary to provide comprehensive and accurate coverage of the execution of the application. For example, the trace record generation code corresponding to a source code section such as a function return may comprise a common-path portion (to capture the more likely execution sequences, as when the function returns normally) and a conditional uncommon-path portion (to capture less likely execution sequences, as when an exception or error occurs). The common-path instrumentation code may be expected to be executed the vast majority of the times that the function is invoked, and may therefore be streamlined; the uncommon-path portion may be expected to be executed relatively rarely, and only if an easy-to-compute condition is satisfied. Branches in the code generation code itself may be avoided or eliminated to the extent possible in at least some embodiments.

In some embodiments, a trace generator tool may be used to instrument an execution of a program using dynamic code modification, to collect trace events generated during the execution as a result of the instrumentation, and to produce a compressed trace object corresponding to the execution. In one embodiment, the program to be traced may be run via the trace generator tool—e.g., if the trace generator tool is named "getTrace", and the program to be traced is called "prog1", the command "getTrace prog1 <prog1-arguments>" may be used to run the program. In other embodiments, the trace tool may be used to instrument and capture events from a running process—e.g., if the process identifier of one of the processes of the running program is "pid1", the equivalent of the command "getTrace—p pid1" may be used. As records of traced events are collected, they may be buffered (e.g., within an in-memory data structure) in various embodiments, and a space-optimized trace partition or "chunk" representing some number of detected events may be stored in persistent storage periodically (e.g., when the fraction of a buffer occupied by the trace records reaches a configurable threshold). As such, in various embodiments, the overall trace object corresponding to the program's execution as a whole may comprise one or more optimized partitions, with each partition representing a subset of the events traced during the execution. In at least some embodiments, a given partition may comprise a header portion and a data portion. Based on the intuition that some event sequences are much more likely to occur during an execution than others, the header portion of a given partition may indicate compact or compressed representations of a set of frequent event chains in some embodiments, while the data portion may indicate (using additional compression techniques) the actual sequences of events which occurred during the portion of the execution which is captured by the partition. In effect, in such embodiments, a set of common event chains may be defined in the header portion, and the data portion may comprise event records containing pointers (e.g., index-based addresses or locations within the header) to various event chains (and/or individual events) that were detected during the execution using the instrumentation.

Using the trace object, in various embodiments a visualization data set comprising a plurality of nodes representing respective execution units of at least a portion of the execution may be generated. As indicated above, a given execution unit may correspond to one or more events of at least one event chain indicated in a header portion of a partition. In some embodiments, generating the visualization data set may comprise constructing a tree representation of the execution and pruning, from the tree representation, a node representing a particular execution unit which meets a partition locality criterion. In one embodiment, if both the starting or initial event of an execution unit (such as a call to a function) and the ending or final event of the execution unit (such as a return from the function) are located in the same trace partition, the execution unit may be deemed to have met the partition locality criterion and the corresponding node may be pruned. At least in some embodiments, the pruning operation may comprise removing child nodes of the pruned node, while retaining a name or identifier of the pruned node (e.g., a name or identifier of a function whose invocation is represented by the pruned node), as well as address information indicating where in the trace object the information about the pruned node and its children can be found. Such locality-based pruning may be useful in various embodiments because, in a scenario where the pruned information is requested (e.g., in response to an interactive request to expand the pruned node), the information required to instantiate details of the pruned node (e.g., its children nodes) may be obtained by accessing a single partition, which may be efficient from an I/O (input/output) cost perspective. In contrast, in such an embodiment, if the starting and ending events of an execution unit happen to be stored within different partitions of the trace object, the locality criterion may not be met and the corresponding node may be retained in the pruned version of the tree. According to one embodiment, when a node representing an execution unit is pruned from a tree, an address record indicating a location, within a particular partition of the trace object, of an event corresponding to the execution unit may be stored (e.g., as part of, or accessible from, the pruned tree). The address record may in effect be considered a highly condensed representation of the pruned node in such an embodiment. Child nodes of the pruned node (representing other execution units which may have been invoked from the pruned execution unit) may be removed from the tree during pruning. In response to the detection of a request to expand information pertaining to the pruned execution unit, the address record and the particular partition may be examined to generate and display more comprehensive information about the pruned node, including its child nodes.

In various embodiments, an interactive interface may be used to present the dynamically modifiable pruned tree. Users may explore various aspects of the traced execution of the program via the interactive interface, with only the needed subset of the traced event information being retained in memory at a given point during an interaction session in some embodiments. Users may, for example, expand portions of the pruned tree as needed, view the source code corresponding to various execution units, determine how many times a given source code section was invoked, search for other invocations of a source code section, and so on. Within a portion of source code corresponding to an execution unit such as an invocation of a function or method, lines may be highlighted using a color code (or other indicator) to allow users to distinguish the lines that were actually executed from the lines that were bypassed—e.g., source code representing the testing of a condition of an "if" statement may be highlighted in one color or font to indicate actual execution, while a different visual indicator may be provided to indicate that the code within the if statement was not executed during a particular execution unit. Users may modify various parameters of the presentation (e.g., the highlighting techniques to be used, the granularity at which traced events are to be presented, various shortcut and navigation keys or other interactive elements), and so on, in some embodiments.

According to at least some embodiments, to generate at least the initial version of the visualization data set, a single pass through the trace object may be required. In one embodiment, a search index for the traced execution may be generated during the single pass; in other embodiments, the search index may be constructed in a separate pass. Unique numeric identifiers (e.g., 32-bit or 64-bit integers) may be used for the events in some embodiments. Generating the search index may in some embodiments comprise storing one or more of (a) a sorted-by-name collection of objects representing source code sections corresponding to various execution units, (b) an indication of the number of invocations of various source code sections, and/or (c) an array whose elements point to tree nodes representing respective execution units. In some embodiments, in order to accommodate possible node orphaning resulting from pruning of nodes at multiple levels of the tree representing a traced program execution, temporary "re-parentable" objects may be created during search index generation; such re-parenting objects may be resolved later. Note that in such embodiments, the creation as well as the resolution/removal of such re-parentable objects may be accomplished in the single pass through the trace object referenced above.

In at least one embodiment, in order to limit the size of the search index as a whole, only up to a configurable maximum number of invocations of a given source code section may be tracked. For example, in response to determining (e.g., during the single pass through the trace object) that an invocation count of some source code section has not yet exceeded a threshold, a search index record representing a particular invocation of that source code section may be stored. In contrast, in response to determining that an invocation count of some other source code section has exceeded a threshold, a search index record representing a particular invocation of the other source code section may not be stored in some embodiments. Such limits on search information may represent a tradeoff between search-related consumption of space and the accuracy of some search features (e.g., a search features which provides listings of all invocations of a given function). Other such space efficiency-related measures may be utilized in some embodiments with respect to the visualization data set—e.g., if the number of events within a given node of the tree exceeds a configurable threshold, one or more dummy records may be inserted to represent the "excessive" events, instead of including respective sets of nodes for all the events. For example, in one embodiment, if the threshold is 5000 events, and a given node would ordinarily have 15000 child events, three dummy child nodes (each representing 5000 events, in order) may be used. In some cases, multiple levels of dummy nodes may be used—e.g., in the above example with a threshold of 5000 events, if a given node has more than 5000*5000 child events, dummy nodes with children dummy nodes of their own may be used. Such "excessive" event counts may, in some cases, result from constructs such as while loops or for loops, but may also occur in the absence of looping constructs in at least some embodiments. If a user indicates programmatically that additional details regarding the nodes which were replaced by the dummy node are desired, the details may be generated from the trace object and presented in such embodiments; however, if the user does not need to view the additional details, memory that would otherwise be allocated for nodes corresponding to the "excessive" events may be saved.

A number of techniques may be employed to compress the amount of data that is stored as part of the persistent multi-partition trace object in various embodiments. In one embodiment, respective sequence frequency records may be generated with respect to one or more events to be represented in a partition. A sequence frequency record may indicate, with respect to a particular event, a set of one or more successor events which meet a frequency-of-occurrence threshold (e.g., the event which, among the set of traced events to be represented in the partition, occurs most frequently immediately after the particular event may be indicated in the sequence frequency record). Event chains to be represented in the header portion of a partition may be generated based at least in part on such sequence frequency records. E.g., if, with respect to a given event E1, the most frequent successor event is E5, and the second most frequent successor event is E43, an event chain starting with E1-E5 may be included in the header, and another event chain starting with E1-E43 may also be included in some embodiments. In at least one embodiment, delta values may be used instead of actual event IDs to compress event chains—e.g., a numeric identifier of one event of the chain may be followed by a (typically small) delta value which indicates a difference between a numeric identifier of a second event and the numeric identifier of the first event. If, in the above example of a chain starting with E1-E5, the numeric identifier of E1 is 10245623, and the numeric identifier of E5 is 10245627, the event chain portion comprising E1-E5 may be represented using 10245623 and the delta value +4, thereby reducing the space that would have been required to store the entire identifier of E5. A compressed events record of the data portion of a particular partition may comprise a location pointer or index, within the header portion of that partition, of a particular event of an event chain, and an encoding comprising one or more bits indicating that additional events indicated in the particular event chain occurred in some embodiments.

According to one embodiment, a system may comprise one or more computing devices. The computing devices may generate and store a trace object corresponding to an execution of a program. The trace object may comprise one or more partitions. A header portion of a partition may comprise a compressed representation of one or more event chains, while a data portion of the partition may comprise a compressed events record indicating an occurrence, during the execution, of a particular sequence of events indicated by an event chain represented in the header. The one or more computing devices may generate, using the trace object, a visualization data set comprising a plurality of nodes representing respective execution units of at least a portion of the execution. An individual execution unit may correspond to one or more events of at least one event chain. Generating the visualization data set may comprise pruning, from a tree representation of the execution, a node representing a particular execution unit which meets a partition locality criterion. One example of partition locality based pruning may, for example, include pruning a given node based on detecting that both the starting event as well as the ending event of a particular invocation of the corresponding function (or method/procedure) are part of the same trace partition, so that only one partition may have to be examined to re-instantiate details (such as child nodes) of the pruned node. The one or more computing devices may cause at least a subset of the plurality of nodes, and one or more source code sections corresponding to respective nodes of the subset, to be displayed via an interactive interface.

According to some embodiments, a non-transitory computer-accessible storage medium may store program instructions that when executed on one or more processors cause the one or more processors to obtain, from an executable version of a program into which event tracing instructions have been inserted after the executable version has been generated, indications of a plurality of events whose occurrence is detected in a particular execution of the program. The instructions when executed on the one or more processors may cause the one or more processors to construct a plurality of partitions of a trace object corresponding to the particular execution, including a first partition corresponding to a first subset of the plurality of events. The first partition may comprise a header portion and a data portion. The header portion in turn may comprise a compressed representation of one or more event chains, and the data portion may comprise a compressed events record indicating an occurrence, during the execution, of a particular sequence of events indicated by an event chain represented in the header portion. The instructions when executed on the one or more processors may cause the one or more processors to store the trace object.

According to some embodiments, a method may comprise obtaining respective indications of a plurality of events whose occurrence is detected in a particular execution of a program (e.g., from an in-memory buffer into which dynamically inserted instrumentation instructions store event records). The method may further comprise constructing a plurality of partitions of a trace object corresponding to the particular execution. Individual partitions may comprise a header portion and a data portion. The header portion may include a compressed representation of one or more event chains, while the data portion may comprise a compressed events record indicating an occurrence, during the execution, of a particular sequence of events indicated at least in part by an event chain represented in the header portion. The method may further comprise storing the trace object.

According to one embodiment, a method may comprise obtaining a trace object comprising an indication of a plurality of events which occurred during an execution of a program. The method may further comprise generating, using the trace object, a visualization data set comprising a plurality of nodes representing respective execution units of at least a portion of the execution. An individual execution unit may correspond to one or more events of the plurality of events. Generating the visualization data set may include pruning, from a tree representation of the execution, a node representing a particular execution unit which meets a partition locality criterion. The method may also include causing at least a subset of the plurality of nodes, and one or more source code sections corresponding to respective nodes of the subset, to be displayed via an interactive interface.

According to some embodiments, a method may comprise performing, by one or more computing devices, obtaining an indication of a particular batch of yet-to-be-executed code of a running program. The particular batch may comprise one or more branches including a particular branch which occurs at the end of a particular basic block. (The basic block itself may not include any branches within it.) The method may include causing an instrumented version of the particular batch to be generated. The instrumented version may comprise tracing instructions inserted at a position reached if the particular branch is taken, and may not include inserted tracing instructions in the particular basic block.

FIG. 1 illustrates an example system environment in which scalable execution tracing for programs with large code bases may be implemented, according to at least some embodiments. As shown, system 100 may comprise various resources and artifacts of a trace creation subsystem 120 and a trace exploration and visualization subsystem 150, which may collectively be used to gain insights into the logic of a target program by tracing one or more instances of the program's executions. Using a set of compilation and build tools 112, an executable version 114 of a program (with a potentially large source code base 110, comprising tens or hundreds of thousands of files) may be generated in the depicted embodiment. The appropriate compilation flags may be set so that source code line number information (indicating the particular lines of source code files correspond to various portions of the executable version 114) is included in the executable version 114. One or more operating system processes 124 of the program may be instantiated using the executable version 114.

In at least some embodiments, a dynamic binary instrumentation framework 122 may be available. The dynamic binary instrumentation framework may comprise, for example, a dynamic code modifier tool that can be used to alter the set of instructions being executed as part of a running program or process, without altering the on-disk version of the program in some embodiments. The trace generator tool 126 may utilize the code modifier to insert trace record generation code into running process 124 in the depicted embodiment. Such dynamic binary instrumentation capabilities may, for example, be provided in various embodiments by a hardware vendor or other third party, such as the entities responsible for producing the processors or operating system used, and/or an entity defining the processor architecture used for running the program 114. In one embodiment, for example, the "Pin" dynamic binary instrumentation tool developed by Intel Corporation may be employed. In some embodiments, a dynamic binary instrumentation framework may provide a set of application programming interfaces (APIs) that can be used by the trace generator tool 126 to introduce trace record generation code into a program after the executable version of the program has been generated—that is, source code changes may not be required to the program to be traced. In various embodiments, the trace generator tool 126 may in effect utilize the framework 122 to dynamically intercept execution of various instructions of the executable version, and generate instrumentation code to record corresponding events such as function invocations or exits, entries and exits from straight-line (non-branching) code blocks, etc. In the depicted embodiment, the instrumentation code may be optimized for common execution pathways (e.g., normal exits from functions, methods or procedures), while still being able to capture unusual execution pathways (e.g., exceptions, errors and the like). Additional details regarding the instrumentation techniques that may be employed in various embodiments are provided below, e.g., in the context of FIG. 3-FIG. 8.

As the instrumented processes 124 run, raw trace data 128 may be generated by the dynamically introduced tracing code in the depicted embodiment. The trace generator tool 126 may utilize one or more main memory buffers to store the raw trace records temporarily as they are produced, and convert them into an optimized trace object 130 comprising a plurality of partitions 132 (e.g., 132A and 132B) in some embodiments. In one embodiment, for example, an iterative approach may be used to create the partitions: each time that the aggregate size of not-yet-persisted trace data exceeds a threshold (e.g., a configurable number of megabytes) in a main memory of a computing device being used by the trace generator tool 126, a new partition may be created and stored (e.g., on disk or some other persistent medium). A given partition 132 may comprise a respective header portion 134 (e.g., 134A and 134B) and a respective data portion 136 (e.g., 136A or 136B) in the depicted embodiment. As discussed below in further detail, in some embodiments the header portion and the data portion may be generated using respective compression methodologies to optimize the amount of space required to store any given partition. A header portion 134 may comprise compressed representations of event chains, with at least some of the event chains representing common or frequent sequences of events captured in the raw trace data 128 in the depicted embodiment, while a data portion 136 may comprise one or more compressed events records, containing pointers to event chains of the header. In effect, in various embodiments, the header portions may represent a way to avoid repeating sequences of event identifiers when indicating the events that occurred during the program's execution—the data portions may simply point to repeated event sequences by using event chains stored once in the header.

One or more partitions 132, which make up the optimized trace object 130, may collectively represent the traced execution of the program 114 in the depicted embodiment. By using space optimization techniques when generating the partitions 132, raw trace data 128 comprising millions or billions of traced events may be stored using a relatively small amount of storage or memory in various embodiments. In some embodiments, individual partitions may be stored as respective files within a file system. It is noted that a trace object comprising space-optimized partitions may not necessarily be stored in persistent storage in some embodiments; for example, volatile storage devices may be used in at least one embodiment for the trace object. Programs whose executions comprise forking or creation of processes (and/or threads within a process) may be traced and explored in at least some embodiments. Indirect function calls (e.g., functions called using function pointers), shared library functions and the like may be captured and displayed in various embodiments, including unusual or edge cases (such as abnormal function returns via exceptions and the like).

In some embodiments, a trace presentation tool 154, implemented on one or more computing devices of the exploration and visualization subsystem 150, may be responsible for generating a visualization data set 152 from the optimized trace object 130, and presenting it via an interactive trace display interface 156 to users such as security auditors, developers and the like. In some cases, the total amount of traced event data available may be too large to fit into the memory available for the visualization data set, so space optimization techniques may also be employed by the trace presentation tool. For example, as the event information contained in the trace object 130 is parsed, a tree of nodes representing respective execution units (such respective invocations of functions, method, procedures, and blocks of code that were visited within functions) may be generated. A given execution unit may be represented by one or more events indicated in the trace partitions in various embodiments. To save on space, when generating the visualization data set, the trace presentation tool may prune a subset of nodes from the tree, e.g., based on partition locality considerations as described below in further detail. If and when a user submits a request to expand the information being displayed via the interface 156, details of a pruned node may be re-instantiated in various embodiments.

In at least some embodiments, as the trace object 130 is parsed and the tree of traced events is generated, a search index which can be used to quickly explore various aspects of the traced events may be created concurrently. A single pass through the trace object may be sufficient to create an initial tree and a search index in one embodiment. In other embodiments, a search index may be created in a separate pass through the trace object. As shown, the interface 156 may comprise a plurality of configurable regions or views in the depicted embodiment, including for example a traced event tree region 158, a source code 162, a search results region 160 and so on. The interface may, for example, enable users to view, with respect to a given instance of execution of a function, which subset of lines of source code of the function were actually executed during that instance of execution, and which lines were bypassed (not executed). Unlike some tools which may require stepping through the code or setting breakpoints, which can take a lot of time and may require familiarity with the program, the interface 156 may in some embodiments use highlighting (or other types of visual cues such as fonts, text colors, and the like) to distinguish the lines of source that were executed from those lines that were not executed. As a result, the executed portions of code of a source file may be apparent at a glance.

Several different aspects of the captured program events may be indicated via highlighting or other visual cues in at least some embodiments. For example, in one embodiment, respective highlighting colors may be used to indicate (a) lines of source code that were executed in a particular invocation of the currently visualized function, (b) lines of source code of a function that were executed at some point by the current thread (but not in the current invocation itself), (c) lines of source code that were never executed by the current thread, and/or (d) the current position in the source code. With respect to the current position in the source code, different colors may be used in some embodiments to distinguish between (a) a call that can be jumped into, versus (b) some other instruction (other than a call), for which "jumping into" may not make sense. In some embodiments, for example, a tree shown in the visualization may show only a subset of block-visited nodes (nodes indicating visits to sections of code within a function) to reduce clutter (this is different from the pruning of tree nodes based on locality considerations). In one such embodiment, a block-visited node may only be added to a tree if a function call or return event is not encountered for some threshold number of successive events of the trace (e.g., if 50 block visited events occur in succession without any intervening function call or return events, a node may be created for the 50$^{th}$ block-visited event). As a result of this clutter reduction technique, the actual current position (in the source code) may lie between two nodes shown in the tree, one of which may be highlighted in the tree (e.g., because by default, one node in the tree may always be highlighted in various embodiments). It may thus appear, from examining the visualization of the tree alone in such a scenario, that a "jump into" should work from the current position in the source code. The use of different highlighting colors for the current position in the source code and tree may therefore be useful to indicate whether a "jump into" is actually possible or not, regardless of what the highlighted node in the tree appears to suggest. Note that coverage highlighting may also be provided for the entire source code file in some embodiment, not just for the function being viewed currently. A number of navigational elements, search features and the like may be provided via the interactive interface 156 in various embodiments, as discussed below in further detail, enabling users to quickly gain insight into potentially complex programs. In at least some embodiments the interface may include mechanisms for stepping backwards in the execution, or more generally to navigate the execution in random order. Such types of navigation may not even be possible, or (if they are possible) may require rerunning the program, when some other tools such as debuggers are employed. In some embodiments, the interface may provide summarized information about program execution, such as the number of times a particular line of the code was invoked, the number of times that a particular calling function invoked a particular called function, the number of iterations of a loop of code, etc.

In various embodiments, the trace generator tool 126 and/or the trace presentation tool 154 may be implemented using one or more computing devices. In some embodiments, the functionality of the trace generator tool and the trace presentation tool described above may be combined into a single consolidated tracing tool, e.g., with different arguments being used for trace generation than are used for trace presentation. In one embodiment, the functionality of the trace generator tool 126 and the trace presentation tool 154 may be incorporated within a larger tool, an integrated development environment, or a debugging tool, or packaged together with a debugger or an integrated development environment. In some embodiments, the trace exploration and visualization may be performed on a computing device which does not, at least by default, contain or have access to a copy of the source code base 110, or on a computing device other than the one on which the program was executed. In one such embodiment, a tool 181 which can (if desired) copy just the subset of the source code files whose code was executed in a given trace object may be used to obtain a local copy of relevant source code for visualization and exploration of that trace object. In some cases, the trace may be visualized and examined on a device which could not have been used for executing the program (e.g., because a different hardware architecture and/or operating system is in use on the visualization device). This flexibility with respect to where the trace is examined/viewed may facilitate collaboration and discussion among program developers and other users; a given trace may for example easily be shared among multiple interested parties. As discussed below, artifacts produced during the trace generation in some embodiments may include event-to-source-code mappings which can be used by the tool 181 to select and copy the appropriate set of source code files.

As one skilled in the art will appreciate in light of this disclosure, certain embodiments may be capable of achieving various advantages, including some or all of the following. Detailed information about the flow of execution of large programs may be provided using relatively small amounts of memory and an easy-to-use interface. Application security may thereby be enhanced, since it may become much easier to verify whether security-related code is being invoked as intended. Users may be able to quickly determine those parts of program source code that are used most frequently, which may in turn lead to reducing the time taken to debug the code and/or introduce enhancements. Without much effort, developers may be able to explore the flow of control through a complex application, allowing them to get up to speed quickly on unfamiliar parts of the application.

In much of the following description, C/C++ is used as the example programming language (of the traced program, as well as the trace tools) to illustrate various techniques employed for tracing. It is noted that similar scalable tracing techniques may be employed with equal success with respect to traced programs and trace tools written in other languages in various embodiments (such as Java, Scala and the like); the illustrative use of C/C++ style syntax and constructs is not intended to be restrictive. In addition, techniques similar to those described herein may be operating system agnostic and hardware agnostic—that is, they may be employed for programs executed using a variety of operating systems and/or a variety of hardware platforms in different embodiments.

Figure 2:
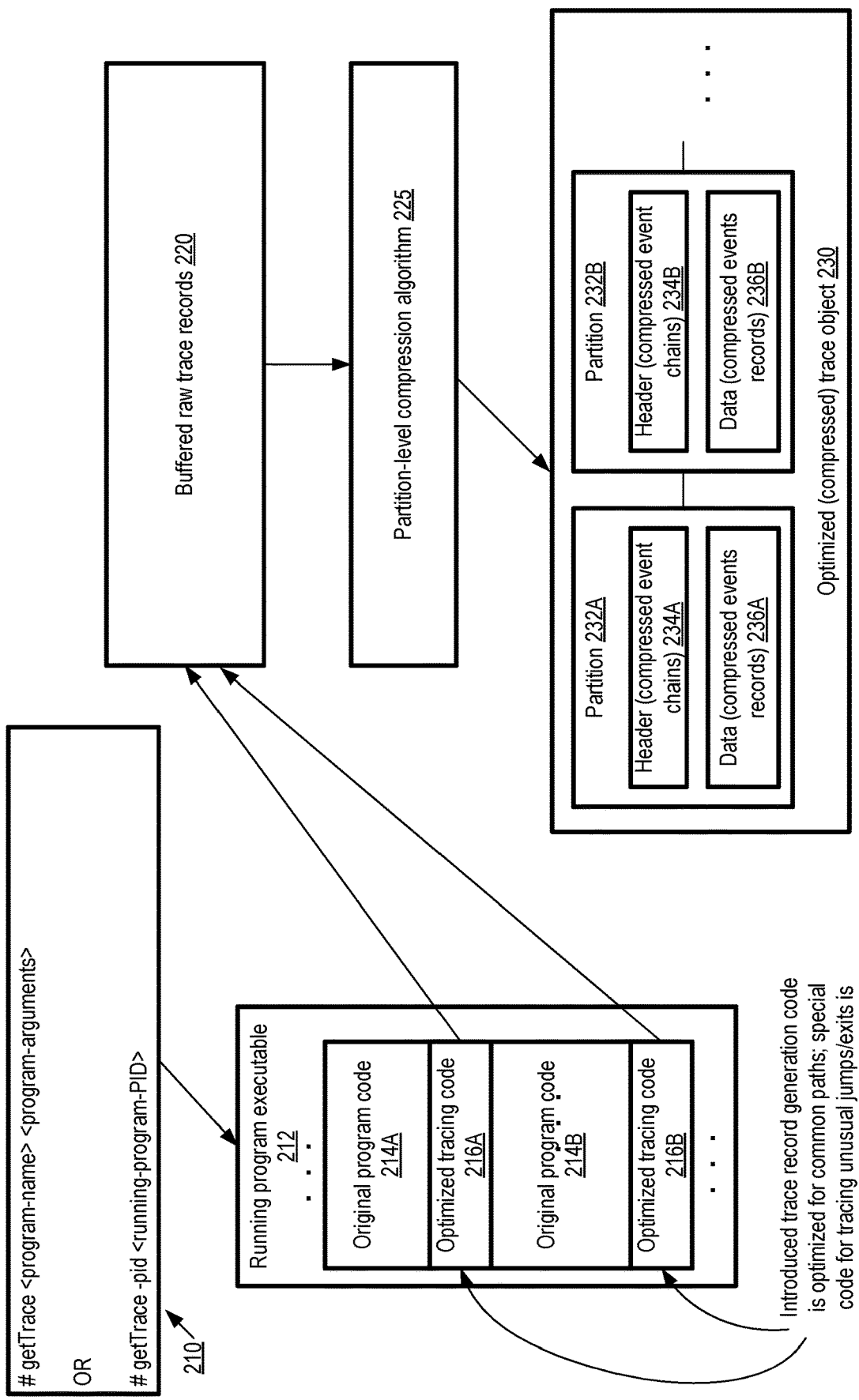
FIG. 2 illustrates example buffering of raw trace records from an instrumented version of an executable program prior to the use of a compression algorithm to generate a multi-partition trace object, according to at least some embodiments.

FIG. 2 illustrates example buffering of raw trace records from an instrumented version of an executable program prior to the use of a compression algorithm to generate a multi-partition trace object, according to at least some embodiments. As indicated by element 210, at least two alternative approaches to trigger the collection of trace records may be supported in the depicted embodiment. In one approach, a trace generator tool (called "getTrace" in the example scenario depicted in FIG. 2) may be used to start up the program to be traced—e.g., by issuing the command "getTrace <program-name> <program-arguments>". In a second approach, the trace generator tool may attach to a running process of the program, e.g., using the process identifier (PID) of the process in the command "getTrace-pid <running-program-PID>". Multiple processes of the program, and multiple threads within a given process, may be traced in at least some embodiments.

Within the program executable 212, the trace generator tool may dynamically introduce code to generate trace records representing various types of events of interest in the depicted embodiment. In effect, the instrumented program executable may conceptually comprise portions 214 (e.g., 214A and 214B) of the original code, interspersed with optimized tracing code 216 (e.g., 216A and 216B). The introduced trace record generation code may be optimized for common paths of execution in various embodiments, such that special code for tracing unusual jumps, exception-based exits and the like may only be invoked if needed. Branches within the tracing code 216 itself may be avoided or minimized in various embodiments to help reduce the overhead associated with tracing. Additional details regarding optimized trace generation code insertion techniques are provided below.

The optimized tracing code 216 may generate raw (uncompressed) trace records in the depicted embodiment as the program runs. These raw trace records may be buffered (as indicated in element 220), and a partition-level compression algorithm 225 may be employed to create an optimized or compressed trace object 230 as shown. The trace object 230 may comprise a sequence of partitions 232 (e.g., 232A and 232B), with each partition comprising a respective header portion 234 (e.g., 234A and 234B) with one or more compressed event chains, and a respective data portion 236 (e.g., 236A and 236B) with one or more compressed events records in the depicted embodiment. Details of the contents of the event chains and the event records are provided below. Note that different instances or executions of the same program may be traced as desired in various embodiments, resulting in the creation of respective trace objects 230.

Figure 3:
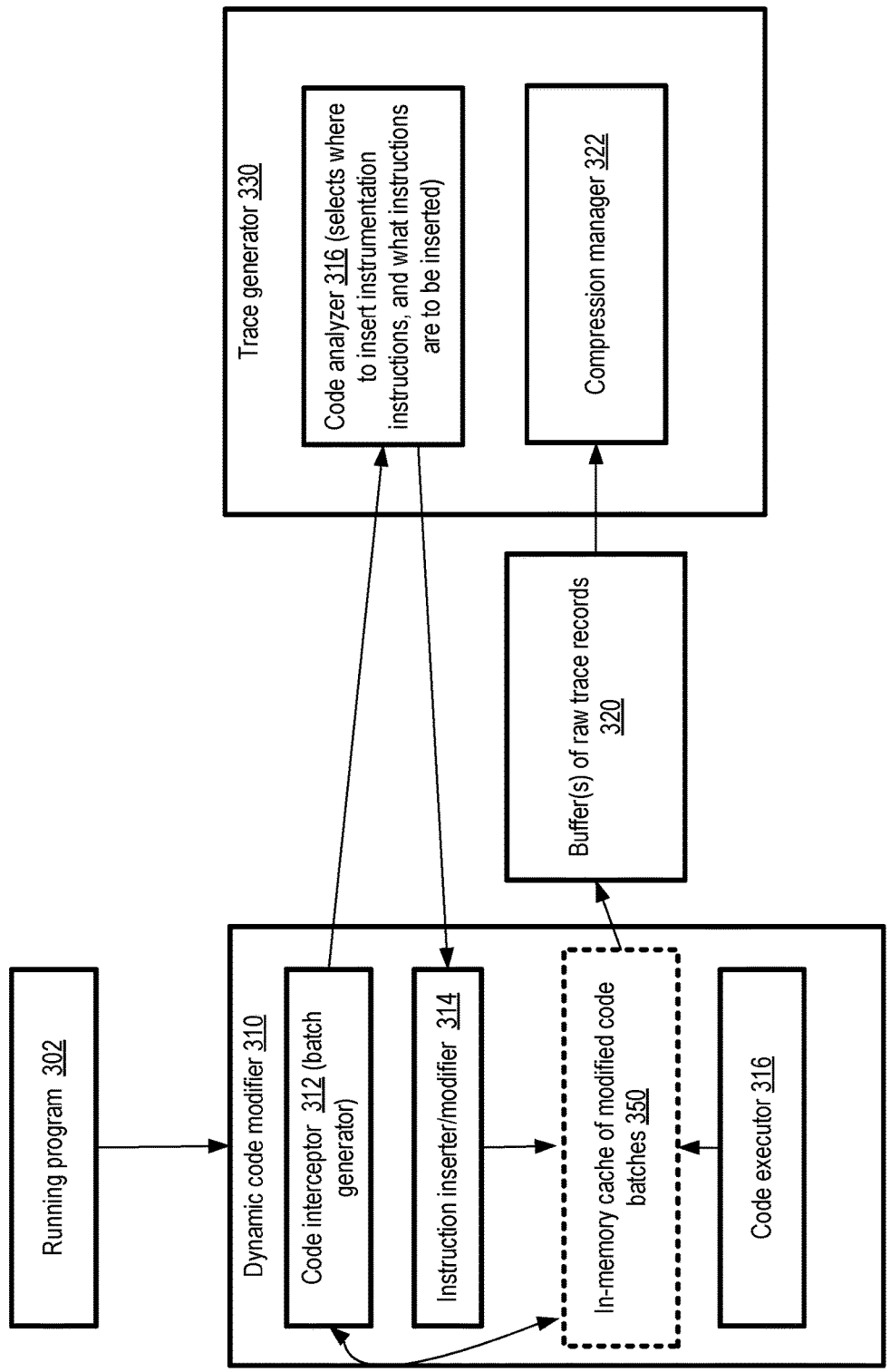
FIG. 3 illustrates an example dynamic code modifier which may be used to instrument running programs to obtain raw trace records, according to at least some embodiments.

FIG. 3 illustrates an example dynamic code modifier which may be used to instrument running programs to obtain raw trace records, according to at least some embodiments. As shown, a dynamic code modifier 310 (which may be part of a dynamic binary instrumentation framework of the kind mentioned earlier) may comprise a number of subcomponents such as a code interceptor 312, an instruction inserter/modifier 314, and a code executor 316. As a program 302 runs, the code interceptor 312 may identify sets or batches of yet-to-be-executed instructions which are not already present in an in-memory cache 350, and provide indications of the batches to a code analyzer component 316 of a trace generator tool 330. The code interceptor 312 may also be referred to as a batch generator in various embodiments.

The code analyzer 316 may examine a given batch of instructions provided by the code interceptor 312 in the depicted embodiment, and select locations in the batch where instrumentation or trace record generation instructions are to be inserted, as well as the particular trace generation instructions to be inserted in the selected locations. Indications of the to-be-inserted tracing instructions may be provided, e.g., via one or more APIs supported by the dynamic code modifier 310, to an instruction inserter/modifier 314 in various embodiments. The requested insertions may be performed by the inserter/modifier 314, and a modified version of the batch may be stored in cache 350. Code executor 316 may then cause the modified batch of instructions to be executed in the depicted embodiment. As a result of the insertion of the trace generation instructions, raw trace records may be generated and stored in one or more in-memory buffers 320 when the instrumented version of the batch executes in some embodiments. Such raw trace records may be used to generate a compressed trace object by compression manager 322 in the depicted embodiment.

A cached version of a batch may potentially be executed many times in some embodiments (e.g., thousands or even millions of times), depending on the presence of looping constructs, other repeat invocations of the same code, and the like in the code of the running program 302. The code analyzer 316 may typically only have to make decisions regarding where and how to instrument a given batch of instructions only once in various embodiments, after which the instrumented version may be cached, ideally for the duration of the running program. Of course, depending on the size of the cache, some instrumented code batches may occasionally be ejected or displaced from the cache 350 in various embodiments. In some cases in which a batch IB1 of instrumented code (corresponding to un-instrumented batch UB1) is removed from the cache in the depicted embodiment, and the code interceptor again encounters UB1 in the yet-to-be-executed instructions of the program, the original un-instrumented version UB1 may again be provided to the trace generator 330 for analysis, and may be re-instrumented and re-cached.

Figure 4:
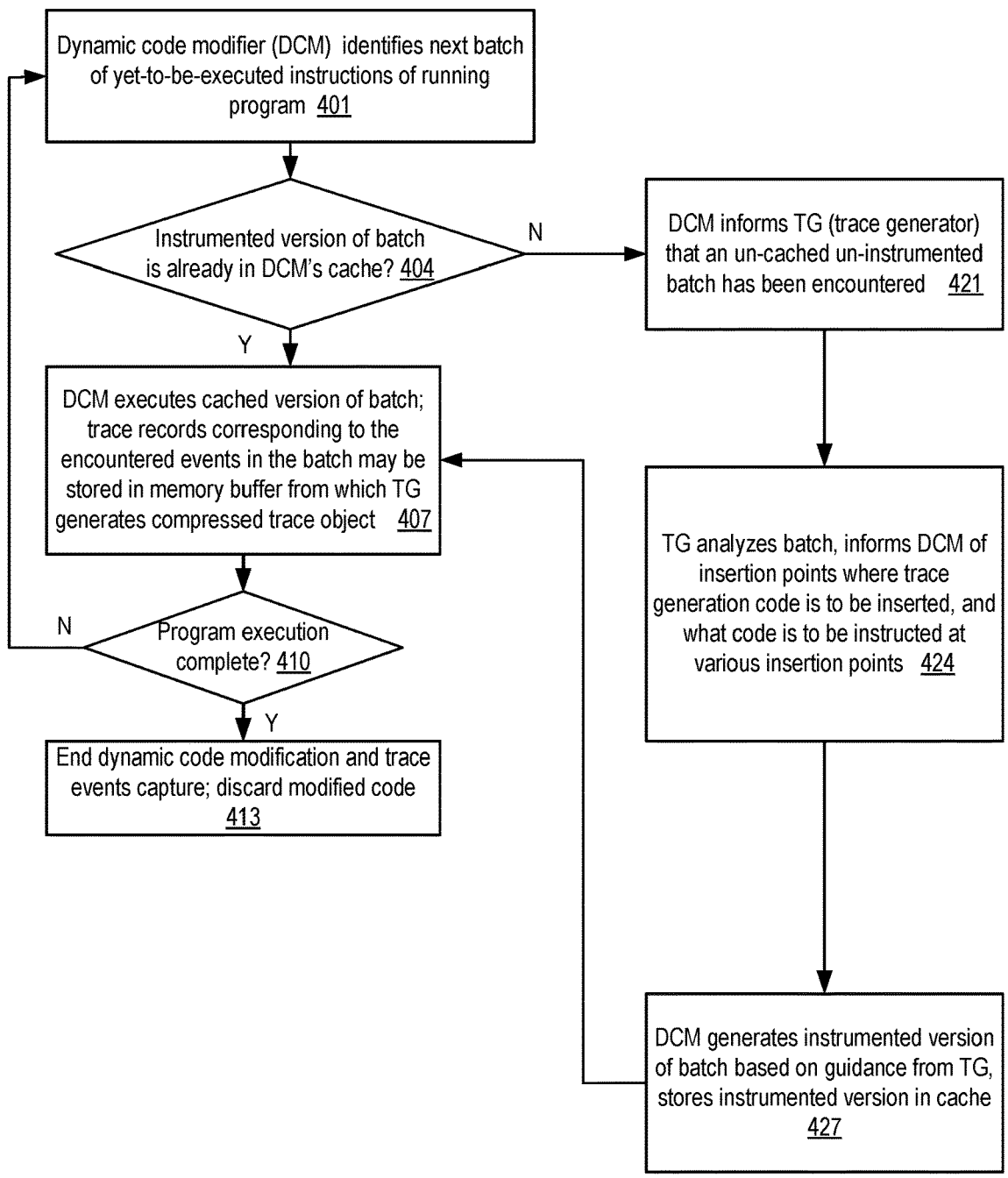
FIG. 4 is a flow diagram illustrating aspects of operations that may be performed to dynamically instrument a running program to be traced, according to at least some embodiments.

FIG. 4 is a flow diagram illustrating aspects of operations that may be performed to dynamically instrument a running program to be traced, according to at least some embodiments. As shown in element 401, a dynamic code modifier (DCM) may identify the next batch of yet-to-be-executed instructions of a running program, e.g., immediately prior to or very shortly before the execution of the batch. Note that the batch may of course contain conditional instructions (e.g., corresponding to "if" statements or the like), so not all the instructions of the batch would necessarily be executed; as such, a given batch may comprise a set of instructions from which at least one instruction will be executed in the depicted embodiment. If an instrumented version of the batch is already in a cache of modified code (as determined in operations corresponding to element 404), the cached version of the batch, which may include trace generation instructions inserted dynamically by the DCM, may be executed. If the cache does not contain an instrumented version of the batch, the DCM may inform the trace generator tool that an un-cached un-instrumented batch has been encountered (element 421) in the depicted embodiment. In some embodiments, the TG may register a set of callback routines with the DCM, and such callback routines may be used to inform the TG when an un-cached batch is encountered. In at least some embodiments, an API implemented by the DCM may enable the TG to instruct the DCM regarding batch boundaries/sizes (e.g., exactly what defines or constitutes a batch), and batches may be generated at different granularities based on the needs of the TG.

The TG may analyze the batch, and inform the DCM (e.g., using APIs) to insert specified trace generation instructions at one or more insertion points in the batch (element 424) in various embodiments. The TG may, for example, command the DCM to include instructions to write one or more event identifiers into an in-memory buffer in some embodiments. In at least one embodiment, when the TG is provided an indication of a batch of instructions that has not previously been analyzed by the TG, one or more new event identifiers may be generated for respective events identified in the batch (e.g., 32-bit unsigned integers may be used for event identifiers), and a mapping between the event identifier and the corresponding source code lines (indicated by debug information associated with the batch) and/or function name may be stored by the TG. Such mappings may be used later to display source code corresponding to traced events, e.g., via a trace visualization interface in various embodiments.

Based on the guidance provided by the TG, the DCM may generate an instrumented version of the batch, and store it in the cache in the depicted embodiment (element 427). The DCM may then execute the modified/instrumented version of the batch (element 407), which may result in trace events being added to a buffer from which a compressed trace object may later be generated by the TG. If, after the modified batch has been executed, the program execution is complete (as detected in operations corresponding to element 410), the dynamic code modification of the program may be ended, with all the trace events being captured in the buffer(s) designated by the TG in the depicted embodiment. Note that the modified versions of the code may only be stored in the cache, being deleted at the end of the execution of the program (or when the trace generator tool is detached from the running program) and the original executable of the program may remain unmodified in embodiments in which the technique illustrated in FIG. 4 is used. If there are more instructions to be executed, the operations corresponding to elements 401 onwards may be repeated with respect to the next batch.

A number of techniques may be employed to reduce the overhead introduced by adding trace generation code into the running program while still ensuring that the desired set of events is captured in various embodiments. As mentioned earlier, in at least some embodiments events may be recorded for function calls (or procedure/method calls), returns, as well as blocks of code that are visited within various functions, methods, or procedures. The number of blocks of code visited may often be extremely high in some cases, and the manner in which code block coverage instrumentation instructions are added may therefore impact the overhead of tracing (e.g., the slowdown of the traced program), as well as the size of the trace object, substantially.

Figure 5:
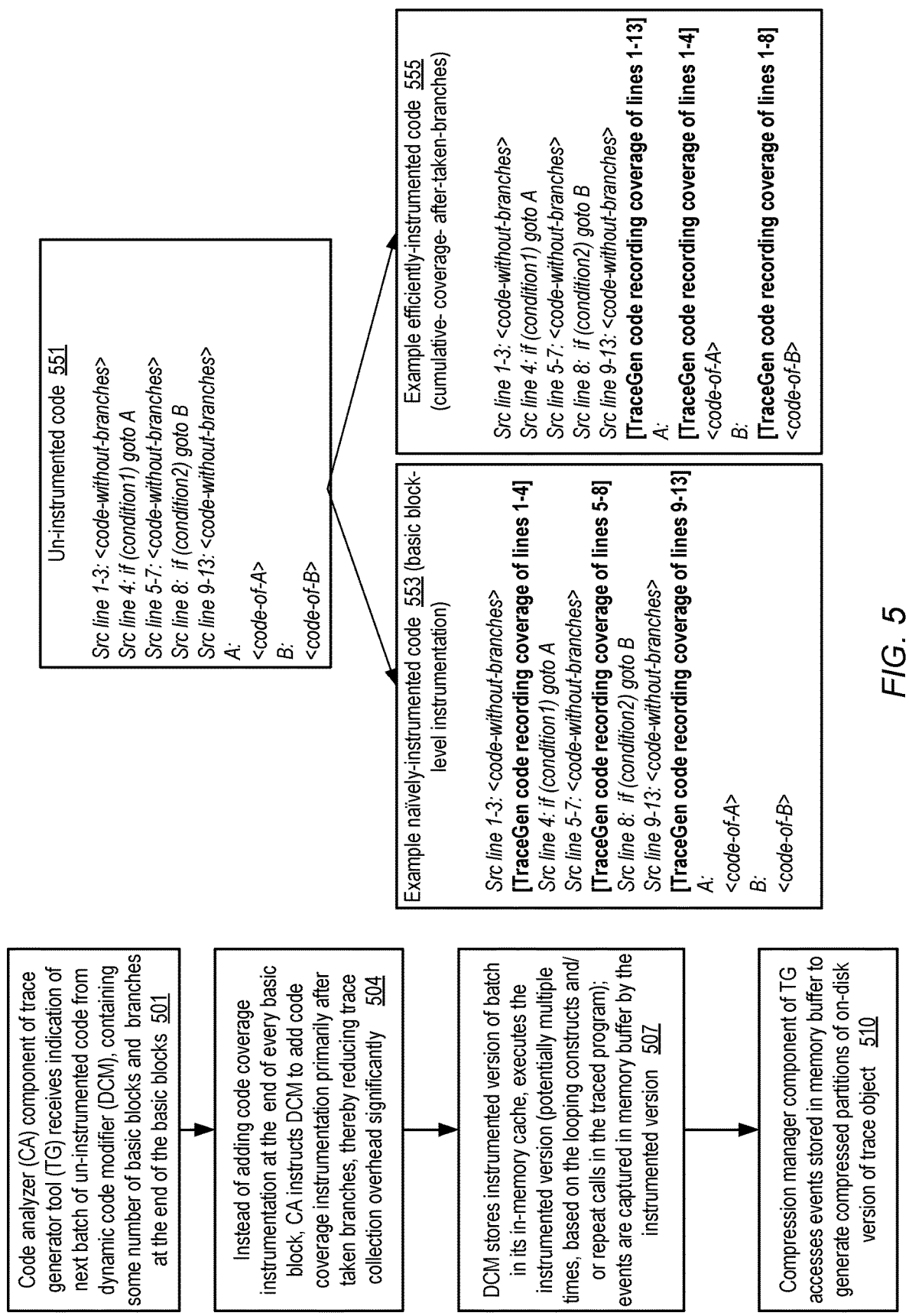
FIG. 5 illustrates an example technique for efficient code block coverage instrumentation, according to at least some embodiments.

FIG. 5 illustrates an example technique for efficient code block coverage instrumentation, according to at least some embodiments. As shown in element 501, a code analyzer (CA) component of a trace generator tool (TG) may receive an indication of the next batch of un-instrumented code encountered during execution of the traced program, e.g., from a dynamic code modifier (DCM). The batch may containing some number of basic blocks (sequences of instructions without branches) and corresponding branches at the end of the basic blocks in the depicted embodiment. Instead of adding code coverage instrumentation at the end of every basic block, which may seem like a reasonable straightforward approach, the CA may instruct the DCM to add code coverage instrumentation primarily after taken branches in the depicted embodiment (element 504). Depending on the instructions that make up the batch, such an approach may result in a significant reduction of trace collection overhead, as explained below with the help of an example also shown in FIG. 5. The DCM may then store the instrumented version of the batch in its in-memory cache and execute the instrumented version (element 507). The instrumented batch may be executed multiple times during the lifetime of the running program, e.g., depending on the looping constructs in the program, repeat calls to the same routine, and the like. Event records generated by the inserted instrumentation code may be captured in one or more memory buffers in various embodiments. A compression manager component of the TG may access the event records stored in the buffer(s) to generate compressed partitions of a trace object, from which the operations of the program may later be visualized in at least some embodiments.

A simplified example of such optimized insertion of trace generation code is provided in FIG. 5. An un-instrumented version 551 of a section of code may comprise several basic blocks (labeled <code-without-branches>) interspersed with conditional goto instructions. A basic block may comprise a single-entry, single-exit construct in the depicted embodiment, typically with a branch or return at the end (which is also considered part of the basic block). The single-entry property implies that the execution of the program will never jump into the middle of a basic block. Because either all instructions of a given basic block are executed, or none are executed, it may be easy to record code coverage at the granularity of basic blocks in the depicted embodiment. In one naively instrumented version 553 of the code, trace generation code recording the visit to lines 1-3 of the source code may be inserted at the end of the first basic block, just before the code corresponding to the first if statement. Similar sections of trace generation code may be inserted just before the second if statement and after the instructions corresponding to line 13. This example of naïve instrumentation may be referred to as basic block-level instrumentation.

In contrast, in an efficiently-instrumented version of the code 555, coverage instrumentation may be added after taken branches (e.g., at the position reached after the taken branch corresponding to "goto A", and at the position reached after the taken branch corresponding to "goto B"), as well as after the instructions corresponding to line 13. As such, when the version of the code shown in element 555 is run, trace generation code for recording coverage may be run only once, regardless of whether condition1 is satisfied, whether condition2 is satisfied, or neither condition is satisfied. In contrast, in the naively-instrumented version, if neither condition1 nor condition2 is satisfied, three different portions of trace generation code may be run, causing more overhead to the running program than if the efficiently-instrumented version were run. Of course, the relative reduction in tracing overhead obtained using such a technique may vary from program to program in various embodiments. Note that some subtle aspects of the modification of the code by the DCM are not shown in FIG. 5: e.g., in scenarios such as that shown in FIG. 5, in one embodiment the DCM may change the labels "A" and "B" to new labels (e.g., "A1" and "B1") to avoid generating misleading trace events if the code corresponding to "A" or "B" were reached from some other part of the program.

In at least some embodiments, trace events corresponding to function calls, returns, as well as code block visits may all be written to the same buffer(s) by trace generation code inserted into the running program. For the purposes of presentation via an interactive interface, code block visited events which occur during a particular function may later have to be matched up with the corresponding function call and function return events. For example, consider the following example sequence of events written to a raw trace buffer: [Call-function-F1, Code-block-visit CBV1, Codeblock-visit CBV2, return]. In this example sequence, the sections of program source code corresponding to CBV1 and CBV2 may be assumed to have been visited from within the invocation of function F1. In some cases, however, the matching of visited code block events to functions may potentially become complicated due to exceptions and/or other similar unusual occurrences. In at least one embodiment, the trace generator tool may use special data structures (separate from the buffers into which event records are written) to determine when such events occur, and to adjust or remediate the contents of the trace object generated from the buffers.

Figure 6:
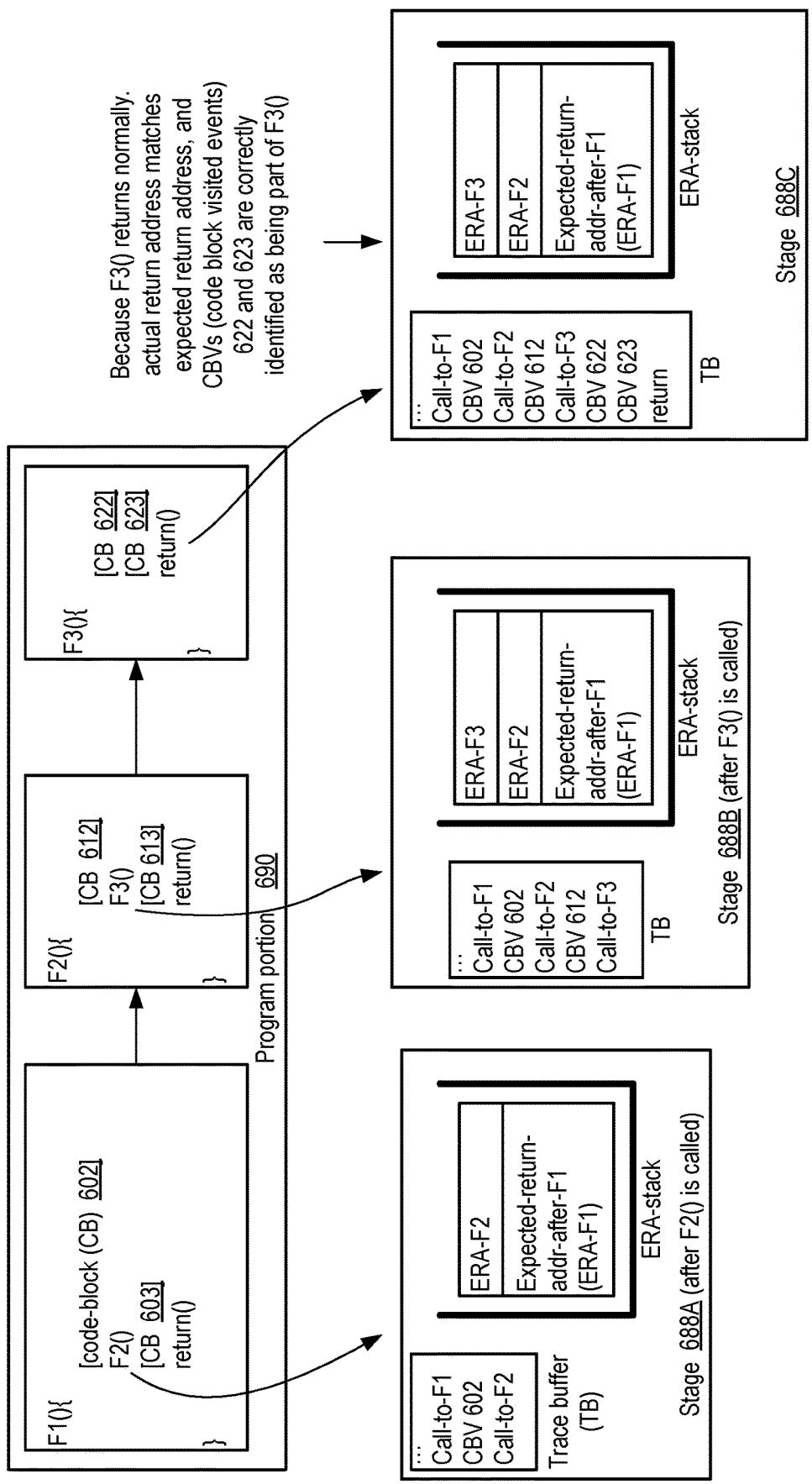
FIG. 6 and FIG. 7 collectively illustrate an example use of a stack data structure for verifying whether function returns occur in an expected sequence, and taking remedial actions if function returns do not occur in the expected sequence, according to at least some embodiments.
Figure 7:
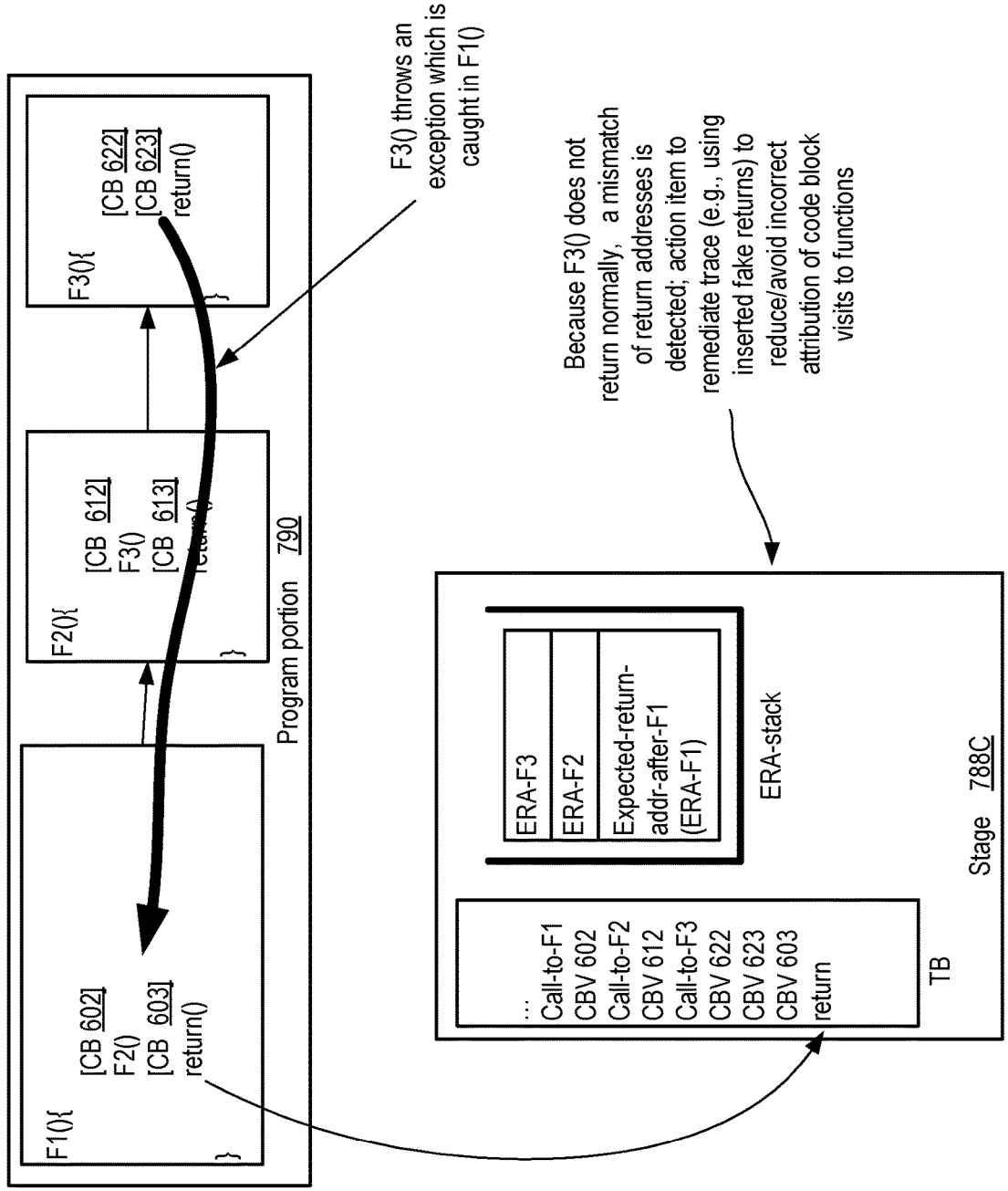

FIG. 6 and FIG. 7 collectively illustrate an example use of a stack data structure for verifying whether function returns occur in an expected sequence, and taking remedial actions if function returns do not occur in the expected sequence, according to at least some embodiments. In a portion 690 of an example traced program, function F1( ) calls function F2( ) and function F2( ) calls function F30. F1( ) includes a code-block 602 before the call to F2( ) and a code block 603 after the return from F20. F2( ) includes a code block 612 before the call to F30, and a code block 613 after F30. F3( ) includes code blocks 622 and 623.

In the depicted embodiment, the trace generator tool may maintain an expected-return-address (ERA) stack data structure, onto which, each time a function call event is encountered, the address of the instruction expected to be executed after that function returns (for example, the instruction positioned immediately after the "jump" instruction representing the call) may be pushed. At least in some embodiments, the stack may be generated and stored in memory, and may not be written to persistent storage. A portion of the recently written contents of the trace buffer (TB) and the current state of the ERA-stack is shown for several stages of the execution of the F1( )-F2( )-F3( ) combination in the depicted example. At stage 688A, immediately after the call to F2( ) (shown as the latest event in TB), the ERA-stack contains expected return addresses for F1 and F2, with ERA-F2 on top of the stack. The trace buffer includes the event for the call-to-F1, the code block visited event 602, and the call-to-F2 event. At stage 688B, immediately after the call to F3( ) from F20, the expected return address ERA-F3 has been pushed onto the stack, and events corresponding to the visit to CB 612 and the call to F3 have been written to the trace. At Stage 688C, F3( ) returns normally, and the expected return address after F3 matches the actual return address. Consequently, the trace events CBV 622 and 623 may be correctly matched up to the call-to-F3 and the return from F3. The stack may be popped when an expected return address matches the actual return address.

In FIG. 7, the same set of functions as that of FIG. 6 is shown. However, in the example scenario shown, F3( ) does not return normally. Instead, an exception occurs within F3( ), e.g., at the end of code block 623, and the exception is handled in F1( ) (e.g., with the logical equivalent of a try-catch clause). As such, F3( ) does not return normally, and F2( ) is bypassed entirely on the execution path from F3( ) back to F1( ). In at least some embodiments, the trace generator may not be able to capture the occurrences of exceptions per se; it may instead only capture function calls, function returns and code block visits. Accordingly, at stage 788C, after F1( ) returns, the return address reached after F1( )'s return may not match the expected return address ERA-F3 which is on top of the stack in the depicted embodiment. In the TB at stage 788C, the code block visited events 622, 623 and 603 may (incorrectly) appear to have occurred between the call to F3 and the next return (assumed to be from F3). In at least some embodiments, one or more trace remediation operations or actions may be implemented at this stage—e.g., an action item record may be stored, indicating that an appropriate number of synthetic or fake return events should be inserted into the on-disk version of the trace just prior to the mismatched return event. In some embodiments, the fake return events may only be added to the on-disk version of the trace object (generated by the compression manager), as the trace buffer may only be writable by the DCM and not by the trace generator tool. Note that at least in some embodiments, in scenarios in which rare events such as the exception shown in FIG. 7 occur, it may not be possible for the tracing tools to perfectly correct the matches between code block visits and function invocations, but the remediation actions may nevertheless help to minimize the extent of the mismatch problem. For example, in one implementation, after fake return events (for the two missing returns from F3( ) and F2( )) are inserted after F1( )'s return as part of the remediation actions in the example scenario depicted in FIG. 7, the trace generator may eventually have to designate all three code block visited events 622, 623 and 603 as being part of the F1( ) invocation (even though 622 and 623 were not actually visited from F1( ). However, despite this slight inaccuracy, the remainder of the code block visited events of the trace which occur after the return from F1( ) (which may number in the millions) would be matched up with functions correctly as a result of the insertion of the fake returns in the above example (assuming there are no other similar exceptions). Another way to consider the beneficial impact and importance of the remediation actions is that, if such actions were not taken in scenarios similar to that shown in FIG. 7, and the exception thrown in F3( ) occurred fairly early in the execution of the program, this may potentially cause the vast majority of code block visited events to be matched up incorrectly with functions.

Of course, exceptions such as that illustrated in FIG. 7 may be very unusual; in the vast majority of cases, F3( ) may return normally, so there would be no mismatch between the expected and actual addresses reached. At the same time, in order to avoid potentially large numbers of incorrect displays of relationships between code blocks and functions, taking the kinds of corrective actions indicated above may be extremely important. Because non-normal exits from functions are much less frequent than normal returns, the trace generator tool may implement the checking of the return address mismatches as follows in at least some embodiments. Code that computes the difference between the actual address and the expected address when any function returns may be dynamically inserted in the form of a "pop-stack" function or routine, which (as implied by its name) has the primary function of popping the ERA stack when a function return is encountered. Code to execute the remedial action may be dynamically inserted as a different function "pop-stack-extended", which is only invoked if a difference was identified between the actual address and the expected address in "pop-stack". In effect, a common-path portion of the inserted instrumentation code may include the pop-stack function, while an uncommon-path portion of the inserted instrumentation code (invoked only if pop-stack's return value indicates a mismatch) may be employed to remediate or adjust the trace if return address mismatches occur in such embodiments. Consequently, if there is no mismatch 99.9999% of the time (when functions exit/return normally), pop-stack-extended may only be called the remaining 0.0001% of the time (when some function exits abnormally). The capability of inserting/calling instrumentation code (e.g., pop-stack-extended) conditionally, based on a return value of a previously-executed function (e.g., pop-stack) may be among the features of the dynamic instrumentation framework in various embodiments. Simplified pseudo-code for one implementation of pop-stack and pop-stack-extended is provided below:

```
pop-stack( ){ // "common" portion of instrumentation code for function returns,
    // executed for every return;
    pop entry from ERA-stack;
    return (difference between expected address and actual address)
}
pop-stack-extended( ){//"uncommon" portion of instrumentation code for function returns,
    //executed only if pop-stack returns a value other than zero;
    examine entries of stack from top-of-stack until a matching return address is found,
        popping the encountered (mismatched) entries;
    store an action item record indicating how many fake returns are to be inserted
        in trace, and where they are to be inserted
}
```

Figure 8:
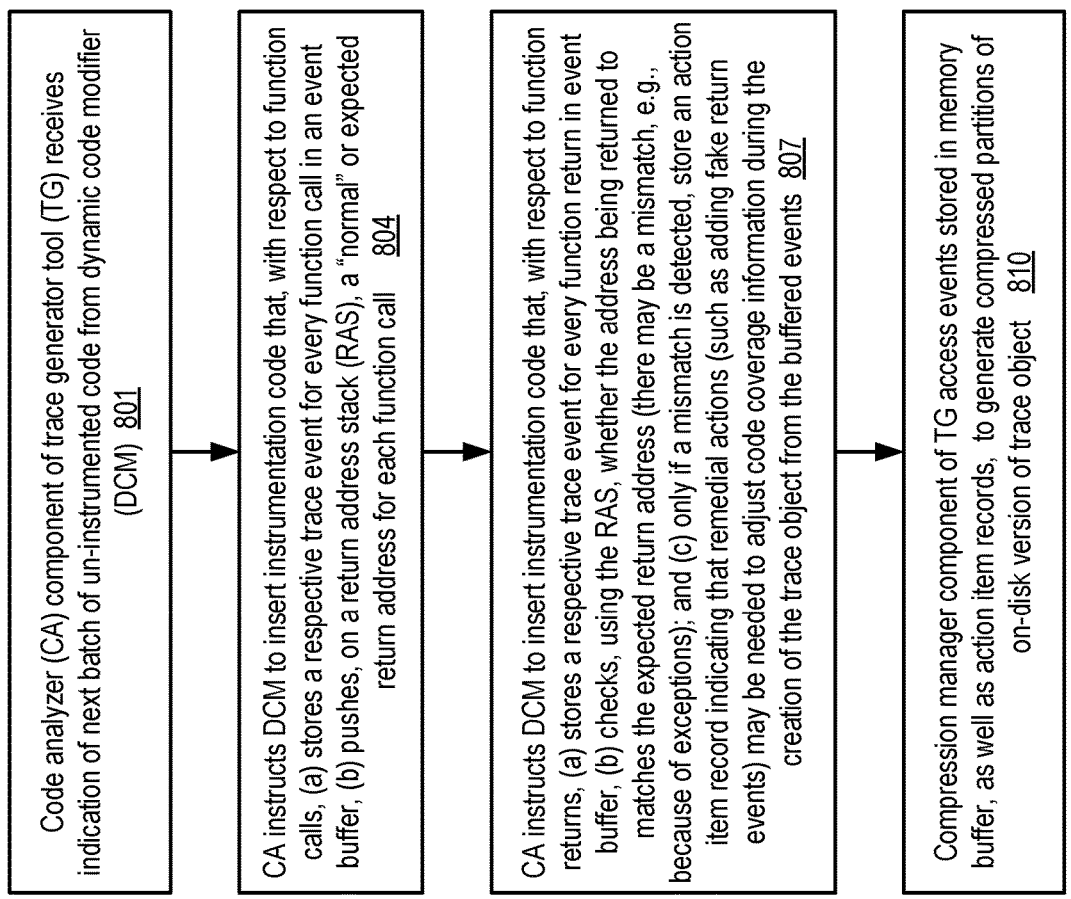
FIG. 8 is a flow diagram illustrating aspects of operations that may be performed to instrument a program to capture function call and return events, according to at least some embodiments.

FIG. 8 is a flow diagram illustrating aspects of operations that may be performed to instrument a program to capture function call and return events, according to at least some embodiments. As shown in element 801, a code analyzer (CA) component of a trace generator (TG) may receive an indication of the next batch of un-instrumented code from a dynamic code modifier (DCM) in the depicted embodiment. The CA may instruct the DCM to insert instrumentation code that, with respect to function calls, (a) stores a respective trace event identifier for every function call in an event buffer, and (b) pushes, on a return address stack (RAS), a "normal" or expected return address for each function call when the function call is encountered (element 804). In one embodiment, for example, if the call instruction is at address A, the expected return address for the call may typically be address (A+1).

With respect to returns from functions, as indicated in element 807, the CA may instruct the DCM to insert instrumentation code that, (a) stores a respective trace event identifier for every function return in the event buffer, (b) checks, using the RAS, whether the address being returned to matches the expected return address (there may be a mismatch, e.g., because of exceptions); and (c) only if a mismatch is detected, store an action item record indicating that remedial actions (such as adding fake return events) may be needed to adjust code coverage information during the creation of the trace object from the buffered events in the depicted embodiment. The instrumented version of the batch of code may then be run, generating event records for function calls and returns, as well as action item records as appropriate. The compression manager component of the TG may access events stored in the memory buffer, as well as action item records, to generate compressed partitions of an on-disk version of a trace object in various embodiments (element 810).

Figure 9:
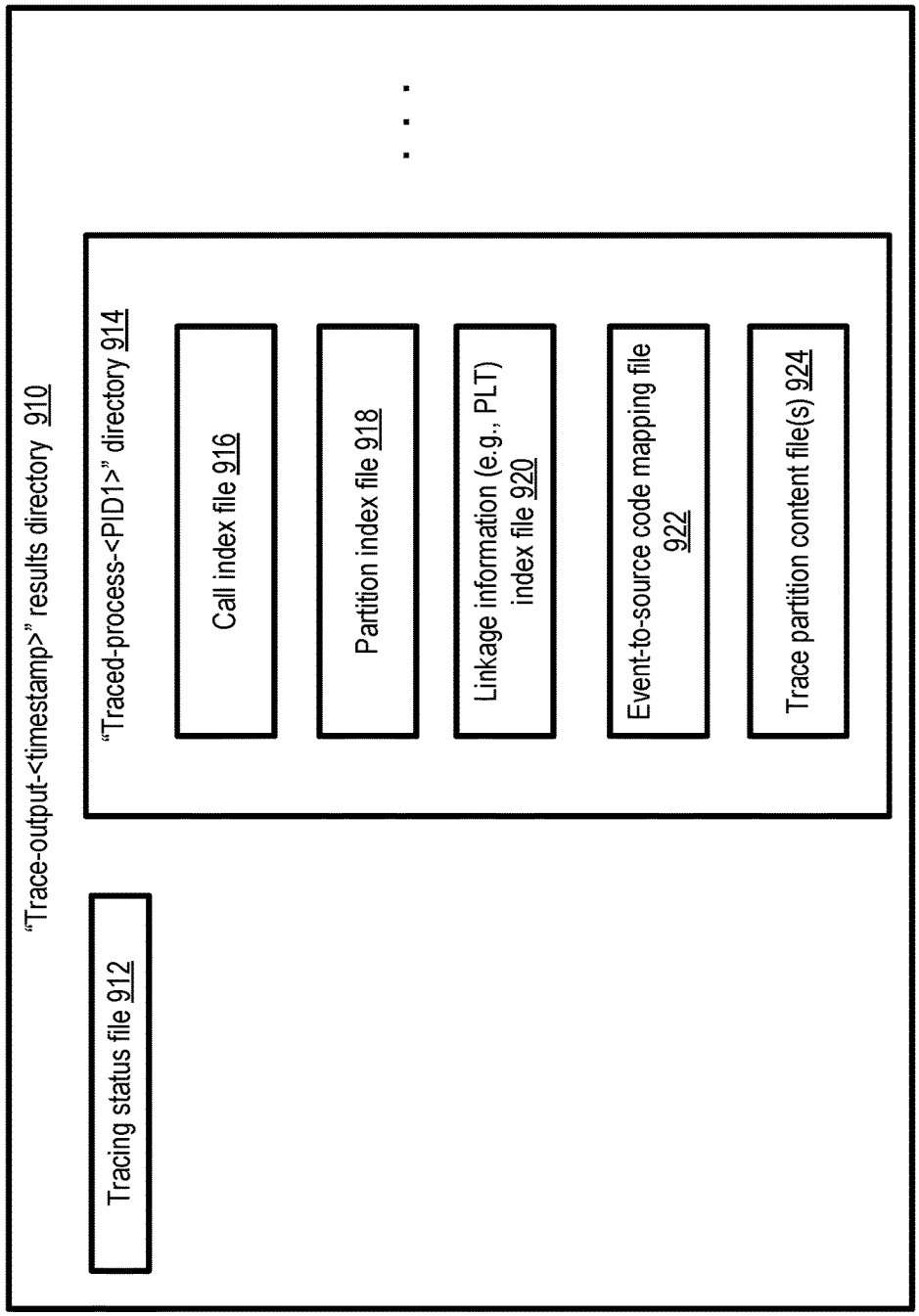
FIG. 9 illustrates example artifacts which may be produced during the tracing of a program execution, according to at least some embodiments.

FIG. 9 illustrates example artifacts which may be produced during the tracing of a program execution, according to at least some embodiments. In the depicted embodiment, the execution of at least one process (with process identifier PID1) of the target program may be traced, e.g., using either of the trace initiation approaches indicated in FIG. 2. A results directory or folder 910 may be created to store the artifacts created during tracing by the trace generator tool in the depicted embodiment. In some embodiments, a timestamp indicating the time at which the request to trace the execution was received or processed may be included in the name of the artifacts directory—e.g., a name similar to "trace-output-<timestamp>" may be used.

As shown, the results directory 910 may comprise a tracing status file 912 (indicating, for example, the processes/threads created during the execution, whether any error was encountered during tracing, or whether the trace was collected and generated successfully) and a respective sub-directory 914 for each of the process(es) that were traced. The name of the sub-directory may contain the process identifier of the corresponding process in some embodiments—e.g., the name "traced-process-<PID1>" may be used.

Within the sub-directory 914 of trace artifacts for the process with identifier PID1, five example files are shown in the depicted embodiment. In some embodiments, trace-related information about all the threads of a given traced process may be stored together, while in other embodiments per-thread files may be used (e.g., five files similar to those shown in FIG. 9 may be created for each thread). In at least some embodiments, as mentioned earlier, integers of a selected length (e.g., 4 bytes, or 8 bytes) may be used as event identifiers, allocated such that distinct ranges of integer values are used for call (invocation) events, return events and block-visited events. For example, in one implementation, the integer 1 may be used for return events, integers between 2 and N may be used to identify call events, and integers greater than N may be used to identify code block visit events. As a result, the type of event represented by a given identifier may be identified easily based on the range to which it belongs. In other embodiments, such range-based separation of event identifiers may not be used.

A call index file 916 may, for example, comprise a list or array of names of various source code sections (e.g., function, method, or procedure names). This enables an event ID that represents a call to be matched to a function name. A complexity may arise with calls into shared libraries, where the call may go to an intermediary structure such as a procedure linkage table (PLT) which then jumps to the actual function. As a result, it may not be easy to tell, at the call site, what the actual function is that will be called. For these cases, the memory address in the intermediary structure (e.g., the PLT) may be stored rather than the function name in the call index file 916 in some embodiments.

A partition index file 918 may indicate the identifiers and/or paths of the source code files which may be referenced in the trace in the depicted embodiment, enabling the matching of file identifiers to file paths. A linkage information index file 920 may map memory addresses in the intermediary structure discussed above (e.g., PLT) to actual function names in some embodiments. This may be done indirectly in at least one embodiment, e.g., by mapping memory addresses to event identifiers that can be looked up in the call index file 916. Analysis code may be added to determine where indirect branch instructions in the intermediary data structure lead in such embodiments.

An event-to-source-code mapping file 922 may indicate the definitions of "block visited" event identifiers in the depicted embodiment. For each event identifier, a list/array of <file ID, line number> pairs may be stored in some embodiments. A <file ID, line number> pair may, for example, comprise seven bytes in one implementation: three bytes for a file identifier, three bytes for a starting line number, and one byte for additional line numbers. The last byte may be represented as a bit sequence in some embodiments, with zeroes indicating lines that are skipped and ones indicating non-skipped lines. For example, if the starting line number is 45 and the last byte is 11010, the code visited would include lines 45, 47, 49 and 50 (with the three "1" bits corresponding, from right to left, to lines 47, 49 and 50). Note that source code often includes comments/blank lines, so it is common for some lines to be "skipped". At least in some embodiments, the executable version of the program being traced may include debug information indicating the source code lines corresponding to various instructions, and the source-code related artifacts stored in the sub-directory may be generated with the help of such debug information. In some embodiments, when determining the source code to be displayed with respect to a given function call, the trace presentation tool may make use of the source code line information for a block visited event which includes the call instruction.

The content of one or more trace partitions for the process may be stored in respective content file(s) 924 within the sub-directory 914 in the depicted embodiment. A given partition may comprise a header portion followed by a data portion in various embodiments. In some embodiments the header portion of a partition may comprise a thread identifier, a count of events included in the partition, the contents of one or more compressed representations of the event chains, and/or a size of the data portion of the partition.

Figure 10:
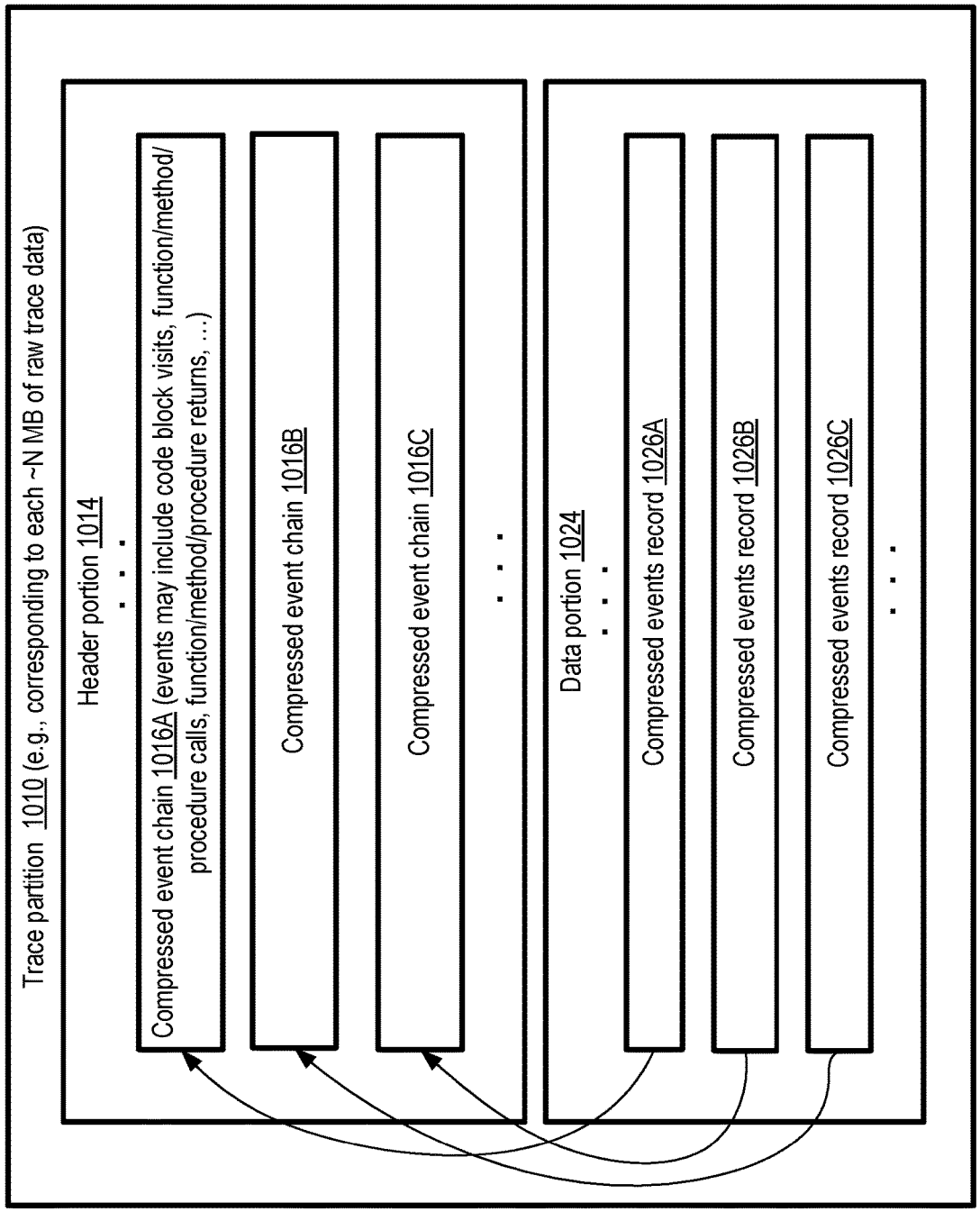
FIG. 10 illustrates example contents of a trace partition, according to at least some embodiments.

FIG. 10 illustrates example contents of a trace partition, according to at least some embodiments. A given trace partition 1010 may be used to store compressed a version of approximately N megabytes of raw trace data in some embodiments, where N is a configuration setting. For example, a pair of buffers of size 1 megabyte each may be reserved for storing raw trace data in the main memory of a computing device. As soon as one of the buffers becomes full (or becomes X % full, where X may be another configurable parameter), its contents may be compressed and stored in a buffer in such an embodiment, while newly-generated trace records may be stored in the second buffer of the pair. In some embodiments, a single buffer may be employed, or more than two buffers may be used.

As shown, the header portion 1014 of the partition 1010 may comprise one or more compressed event chains 1016 in the depicted embodiment, such as chains 1016A, 1016B and 1016C. Individual events of the event chains may for example include, code block visits, calls to functions/methods/procedures, exits from functions/methods/procedures and the like in various embodiments. A given chain may represent a sequence of such events with the member events of a sequence being identified on the basis of frequency of occurrence as discussed below. In many programs, numerous events of the kinds mentioned above may occur repeatedly in the same sequence—e.g., a call to a function f1 may be followed hundreds of times by a call to function f2 during a particular execution of the program, which may motivate the inclusion of f10-f2 as an event chain that can be referenced from the data portion of the partition.

The data portion 1024 may be used to represent the actual sequence of traced events of the partition. Instead of storing the individual event identifiers, location pointers to events of the event chains 1016 of the header portion may be stored in compressed events records 1026 (e.g., 1026A, 1026B or 1026C) to represent the detected occurrences of events in some embodiments. The location pointers to the header contents may use the indexes of the events represented in event chains (e.g., the first event of an event chain stored in the header may be referred to using an index value 0, the second by using a location pointer 1, and so on) in some embodiments, thereby reducing or avoiding the use of event identifiers in the data portion. The location pointers may be followed, in the compressed events records, by compact encodings (e.g., bit sequences comprising a small number of bits) indicating whether (and how many) successor events represented in the event chain actually occurred in various embodiments.

Figure 11:
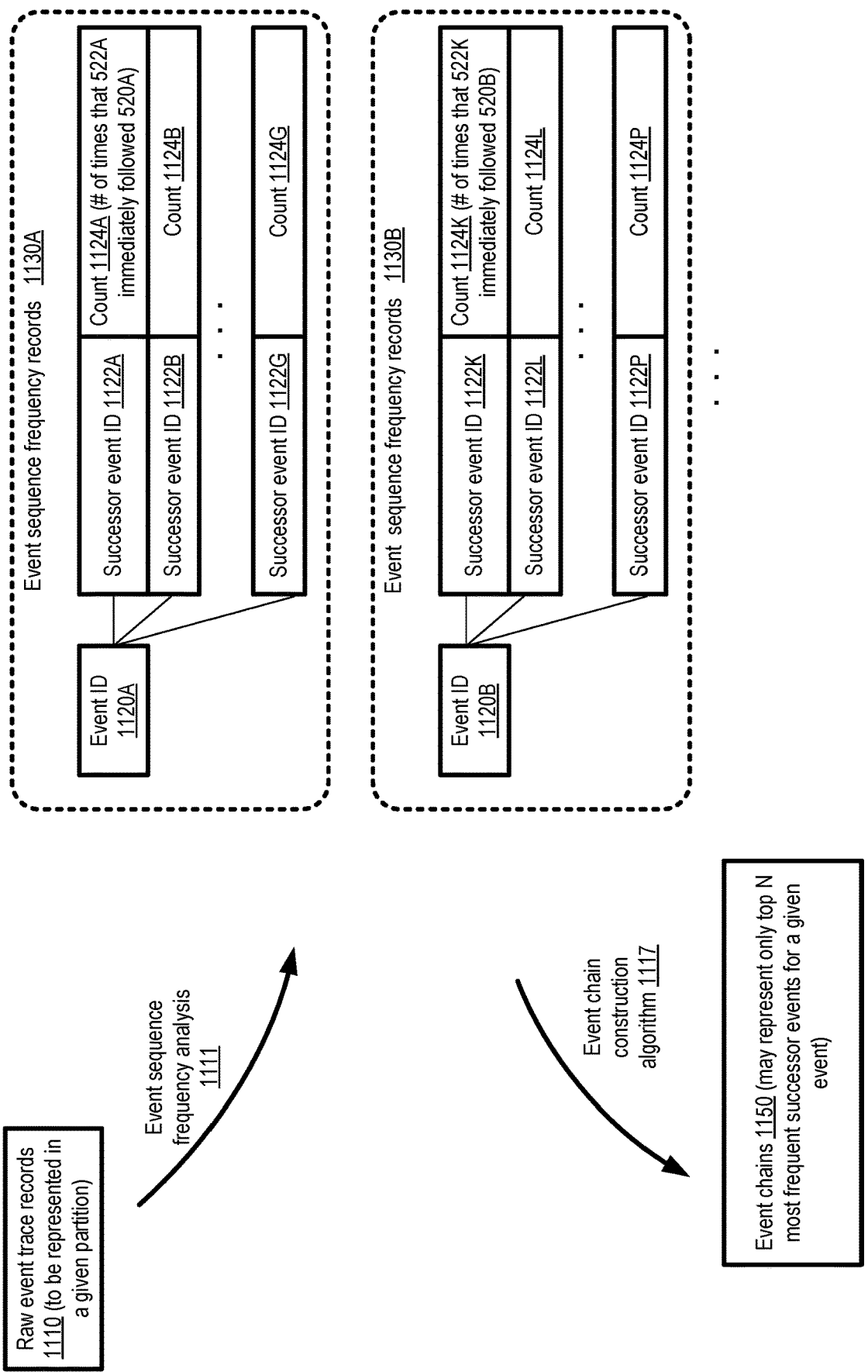
FIG. 11 illustrates an overview of the creation of event chains based on event sequence frequency records, according to at least some embodiments.

As mentioned earlier, the event chains stored in partition headers may be constructed based on the frequency of repetitions of patterns of events. FIG. 11 illustrates an overview of the creation of event chains based on event sequence frequency records, according to at least some embodiments. In the depicted embodiment, a trace generator tool may examine raw event trace records 1110 to be represented in a given partition in order, and generate a respective set of event sequence frequency records 1130 (e.g., 1130A or 1130B) corresponding to individual events. For example, event sequence frequency records 1130A may track, for a given event identifier 1120A, the counts of several different immediate successor events encountered in the raw data. Thus, in the depicted examples, the event with event ID 1120A is immediately followed 1124A times by the event with event ID 1122A, 1124B times by the event with event ID 1122B, and 1124G times by the event with event ID 1122G. Similarly, as indicated in event sequence frequency records 1130B, the event with event ID 1120B is immediately followed 1124K times in the raw data 1110 by the event with event ID 1122K, 1124L times by the event with event ID 1122L, and 1124P times by the event with event ID 1122P. In some embodiments, the following additional optimization may be performed during the event sequence frequency analysis. Instead of keeping track of the occurrence counts for all the different successor events of each event, space may only be allocated for two successor events for each event in such an embodiment, resulting in a relatively simple data structure. Identifying the respective single most frequent successor event for each encountered event may be the objective with respect to generating event chains in various embodiments, and keeping track of such a restricted number (e.g., two) of successor events may suffice in most cases to achieve this objective. For example, in one embodiment, for a particular event E, space may be allocated for keeping track of counts of two successor events SE1 and SE2. SE1 may be set to the first successor event observed in the raw trace data, while SE2 may initially correspond to the second distinct successor event observed (if any). If a third distinct successor event is encountered, the count for the current SE2 may be checked. If the count for SE2 is 1, SE2 may be set to the newly-encountered successor event and the occurrence count for the new event may be tracked going forward in such an embodiment. Similar modifications to SE2 may be made if/when other successor events are encountered. Note that the overall objective of compressing traced event information may be achieved in various embodiments even if, in a few cases, the occurrence counts of the "wrong" successor events (the ones that were not the most frequent or the second-most-frequent successors) happen to be tracked.

After all the events of the raw trace event records 1110 for the partition have been examined in the event sequence frequency analysis phase 1111, in some embodiments a selected number (e.g., one or two) of successor events 1122 with high repetition counts 1124 may be identified for each predecessor event 1120, and used to construct the event chains 1150 to be stored in the header portion of the partition. As such, with respect to a given event, an event chain may indicate the "most-likely-successor" event(s) in such embodiments. The event chain construction algorithm 1117 may employ compression techniques in at least some embodiments, as described below in the context of FIG. 12-FIG. 14. Note that in at least some embodiments in which the raw event trace records 1110 for a given partition are buffered in main memory while the partition is constructed, I/O to/from persistent storage may not be required to examine the raw trace records themselves and construct the frequency records 1130.

Figure 12:
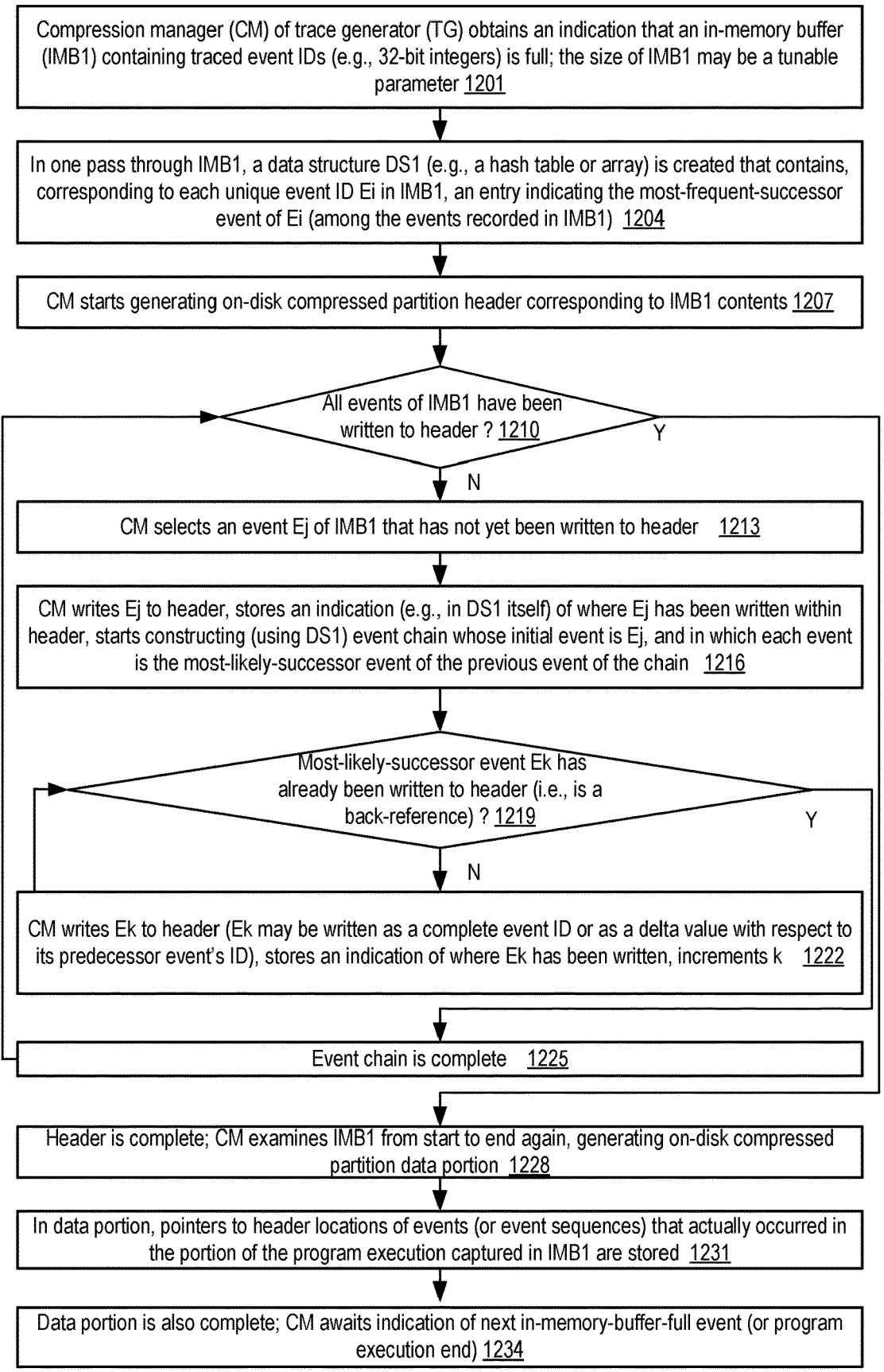
FIG. 12 is a flow diagram illustrating aspects of operations that may be performed to generate contents of header portions and data portions of partitions of a trace object, according to at least some embodiments.

FIG. 12 is a flow diagram illustrating aspects of operations that may be performed to generate contents of header portions and data portions of trace object partitions, according to at least some embodiments. In various embodiments, the instrumented version of the program being traced may write event records to one or more buffers in memory. The compression manager (CM) of a trace generator (TG) may obtain an indication that an in-memory buffer (IMB1) containing traced event IDs (e.g., 32-bit unsigned integers) is full (element 1201) in the depicted embodiment. The size of the buffer may be a tunable parameter in various embodiments. In some embodiments, more than one buffer may be used, so that for example when a first buffer becomes full, the instrumented version of the program may write event records to a second buffer while the first buffer is being converted to a compressed partition. In one pass through IMB1, a data structure DS1 (e.g., a hash table or array) may be created that contains, corresponding to individual event IDs Ei of the unique event IDs in IMB1, a respective entry indicating the most-frequent-successor event of Ei (among the events recorded in IMB1) in the depicted embodiment (element 1204).

The CM may then start generating an on-disk compressed partition header corresponding to IMB1 contents in the depicted embodiment (element 1207). (Note that in some embodiments, storage devices other than disks may be used to store the partitions of the trace objects). If there are still events of IMB1 that have not yet been written to the header portion (as detected in operations corresponding to element 1210), a particular event Ej (which has not yet been written to the header) may be selected as the starting event of the next event chain in the depicted embodiment (element 1213). The CM may write Ej to the header and store an indication (e.g., in the data structure DS1 or elsewhere) indicating where in the header Ej was written (element 1216). The CM may start adding events to the chain whose initial event is Ej, in which each event is the most-likely-successor event of the previous event of the chain (as determined using DS1) in the depicted embodiment.

The construction of the event chain may be terminated if the most-likely-successor event Ek that is found has already been written to the header (as detected on element 1219). If this condition does not hold, the CM may write the most-likely-successor event Ek's ID to the header, either using the complete event identifier of Ek or a delta value relative to the predecessor event ID (element 1222). In addition, an indication of where Ek has been written may be stored, and k may be incremented to process the candidate next event of the chain.

After a given event chain is complete (element 1225), the next event chain may be constructed if at least some events of IMB1 have not yet been written to the header (as detected in element 1210). After all the unique events of IMB1 have been written to the header, the CM may examine IMB1 again from the start to the end, generating the compressed on-disk data portion of the partition (element 1228). In some embodiments, as mentioned earlier, storage devices other than disks may be used. In the data portion, pointers to the header locations of event sequences (or individual events) that actually occurred in the portion of the program execution captured in IMB1 may be stored (element 1231) in the depicted embodiment. After the data portion is written, in various embodiments, the CM may await the next indication that either (a) the traced program's execution has ended or (b) a buffer containing raw trace event records is full (element 1234). In scenarios where a full buffer is again detected, or some raw trace events records that have not yet been processed remain in a buffer when the program execution ends, operations corresponding to element 1201 onwards may be performed with respect to the buffer's contents.

Figure 13:
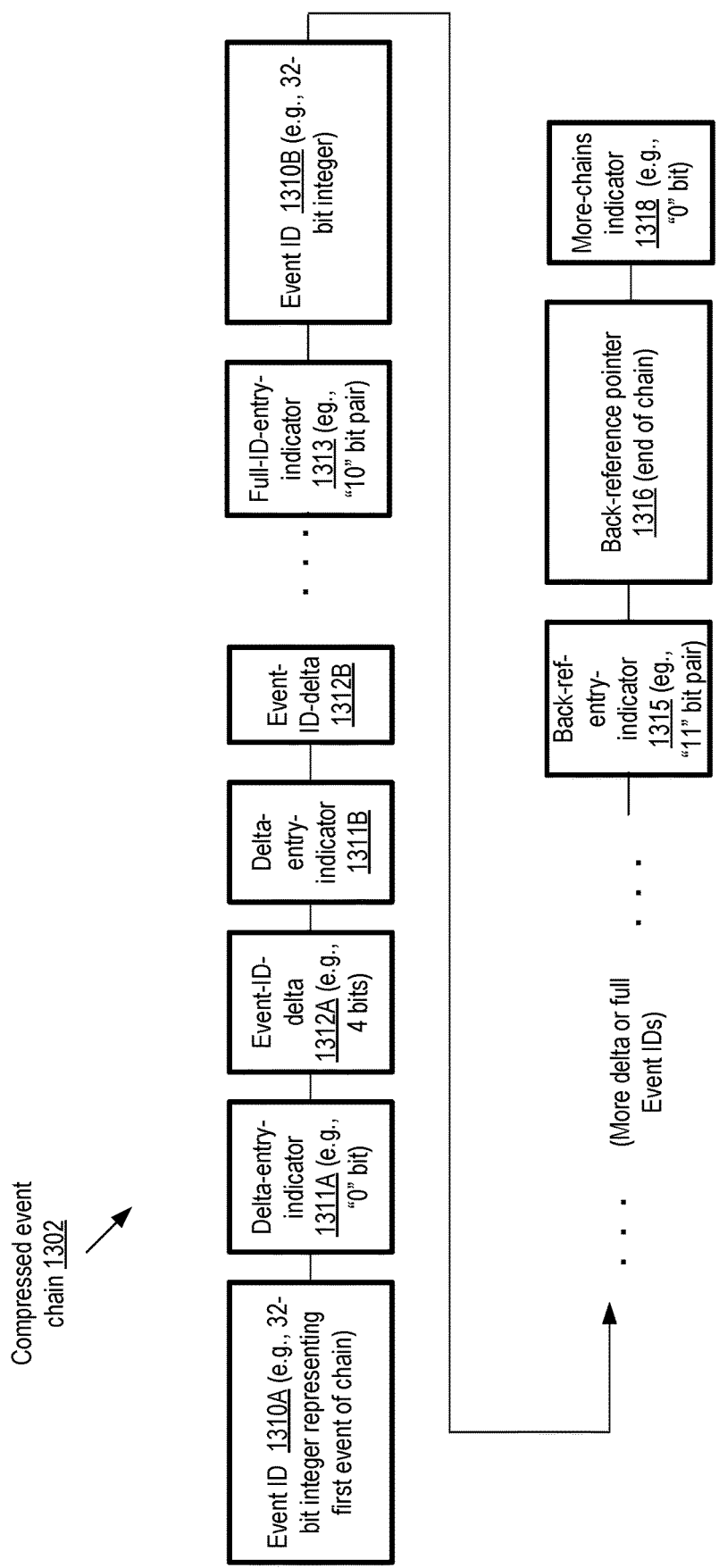
FIG. 13 illustrates example elements of a compressed event chain which may be stored in a header portion of a trace partition, according to at least some embodiments.

FIG. 13 illustrates example elements of a compressed event chain which may be stored in a header portion of a trace partition, according to at least some embodiments. Conceptually, an (uncompressed) event chain may simply comprise a sequence of event IDs (e.g., 32-bit integers). If the uncompressed event chain comprises a sequence of N events, it would require at least 32*N bits (some more bits may be needed to demarcate one event chain from another). A compression algorithm may be used to reduce the number of bits needed (e.g., from approximately 32*N to a lower number) in various embodiments. At a high level, under the assumption that the identifiers of events which follow one another may often be assigned event identifiers that are close to one another, an attempt may be made in various embodiments to replace full event identifiers with delta values in those cases where storing the delta values would reduce space. In cases where the delta value itself is large, the full event identifier may be stored in such embodiments. Finally, a short (e.g., 1-bit or 2-bit) encoding of the type of entry which is placed next in the chain may have to be used to enable the contents of the chain to be interpreted during decompression of the header in the depicted embodiment. (Decompression may be performed, for example, by a trace presentation tool in various embodiments to construct the tree of nodes representing the trace, as discussed below in further detail.) The process used for generating an uncompressed event chain in various embodiments may be summarized as follows. An event, say Ek, which has not yet been written into the current header is picked and written (e.g., into some buffer used during the creation of the header, and/or in the header itself). Next, the single most likely successor event of Ek, say El, is written, so the uncompressed event chain in effect comprises "Ek, El". The process may be continued until eventually an event which has already been written for the current partition is encountered, in which case a back reference to that already-written event may be written, and a new chain may be started with an event that has not yet been written.

As shown, the compressed representation chain 1302 may comprise at least seven types of elements in the depicted embodiment: (a) full event identifiers such as 1310A and 1310B, (b) delta entry indicators such as 1311A and 1311B, (c) delta values such as 1312A and 1312B, (d) full ID indicators such as 1313, (e) back-reference indicators such as 1315, (f) back-reference pointers such as 1316, and (g) more-chains indicators such as 1318. A full event ID 1310 may be stored using 4 bytes or 32 bits in some embodiments; in other embodiments, identifiers of other sizes may be used.

A delta-entry-indicator (e.g., a single "0" bit) may indicate that the next event ID of the chain is represented by a delta value corresponding to the next K bits, where K may represent a configurable parameter. Thus, for example, if K is set to 4, to compute the ID of the event represented by element 1312A, the value stored in the 4 bits following the delta-entry-indicator 1311A may be added to the event ID 1310A in the depicted example. After the event ID corresponding to element 1312A is determined, the next element (1311B) may indicate whether the next event ID of the chain is also to be computed using a delta value. In the depicted example, entry 1311B also indicates that a delta value is to be used, so the event ID corresponding to element 1312B may be computed by adding the value stored in the next K bits to the event ID corresponding to element 1312A, and so on.

In some cases, a delta value may be too large to obtain space savings using the above technique, so a full-ID-entry indicator or encoding 1313 (e.g., a sequence of two bits "10") may be inserted in the chain in the depicted embodiment. The full-entry-ID encoding may mean that the next event ID of the chain (1310B in the depicted example) takes up the maximum size—e.g., 32 bits. The full event ID 1310B may be followed by more delta entry indicators or more full-ID-entry indicators and the corresponding delta values or full IDs, until eventually a back-reference entry indicator 1315 (e.g., the two-bit sequence "11") is encountered, indicating the end of the current chain. A back-reference pointer 1316 may point to an event entry earlier in the chain in the depicted embodiment. For example, consider a scenario in which an uncompressed event sequence comprises E1, Ex, Ey, <back reference 1>, Ea, Eb, <back reference 4>, with the most likely successor event indicated after each event, and the back references use zero-based indexing. In this example, the most likely event following Ex is Ey, and the most likely event following Ey is Ex (the event at index 1, indicated by the back reference 1). Similarly, in this same example, the most likely event following Ea is Eb, and the most likely event following Eb is Ea (the event at index 4). In general, in various embodiments, the number of bits required for a given back reference may depend on where in the chain (i.e., after how many earlier events) that back reference occurs—in the example scenario discussed, <back reference 1> may consume approximately $\log_2(3)$ bits because the first back reference occurs at index 3, while <back reference 4> may consume approximately $\log_2(6)$ bits because the second back reference occurs at index 6. If the header contains more compressed event chains, a more-chains indicator 1318 (e.g., a single "0" bit) may be appended after the back-reference pointer in the depicted embodiment. In at least one embodiment, a more-chains indicator may also be used as the very first element of a header.

The space savings made possible in various embodiments by using the delta values-based approach outlined in FIG. 13 may be approximated as follows with respect to one example scenario. Assume for the purposes of this example that the average number of events in an event chain is 10, that each full event ID uses 32 bits, that 80% of the non-initial events can be expressed using delta values which (including a "0" bit encoding) take up 5 bits each, that full-ID entry indicators and back-reference entry indicators take 2 bits each, and that back reference pointers take up 4 bits. Under these assumptions, the average length of an uncompressed event chain would be 32*10=320 bits (even assuming zero overhead for demarcation entries such as more-chains indicators etc.). In contrast, the average length of a compressed event chain would be:

32 bits (initial event ID)+
(0.8*8*5) bits for the delta entries+
(0.2*8*(2+32)) for the non-initial events that cannot be expressed using deltas+
(2+4) bits for the back reference (which counts as one of the 10 entries)+
1 bit for the more-chains indicator.

These elements would collectively add up to: 32+32+54.4+6+1=125.4 bits, which is a substantial savings over the 320 bits of the uncompressed chain. In practice, depending on the lengths of the chains which can be expressed entirely using delta values, order-of-magnitude savings may be obtained.

To help explain the compression technique used for header portions of trace partitions, it may also be helpful to illustrate the step-by-step decompression of a header (in a manner similar to the decompression performed by a trace presentation tool in some embodiments). FIG. 14 illustrates an annotated example of a decompression of part of a header portion of a trace partition, according to at least some embodiments. The annotated example 1402 begins by presenting the output statement "Reading header", indicating that the decompression processing of the header has begun. The first bit is a 0, indicating that there is at least one event chain in the header. The first event chain begins with an event ID 536876001, as indicated by the annotation "header[0]=536876001". 4-byte (32 bit) unsigned integers are assumed to be used for event IDs, so event IDs can range from 0 to ($2^{32}$−1) in the depicted example.

After the initial event ID 536876001, the next event ID of the chain is represented using a delta value: the 0 bit following 536876001 indicates that a delta value is used, and the next 4 bits indicate the delta amount (2) in the depicted example. Thus, the second event ID of the chain is 536876001+2=536876003, as indicated by the annotation "header[1]=536876003".

The third event of the chain has an ID (971) which cannot be represented using a 4-bit delta, so the indicator for the third event (a "1" bit followed by a "0" bit) signifies that the next 32 bits are to be interpreted as the full event ID of the third event. Accordingly, the next 32 bits are read, and the ID 971 is recognized as the third event ID of the chain, as suggested by the annotation "header[2]=971". So far, the decompressed event IDs making up the first event chain of the header are 536876001, followed by 536876003, followed by 971.

After 971, the next event ID of the chain is 536876006, which is also represented using a "10" bit-pair indicator and the succeeding 32 bits. The next event ID is 536876033, also represented using a "10" bit-pair indicator and the succeeding 32 bits. The bit immediately after the event ID 536876033 is a "0" indicating that a delta value is to be used for the next event ID. The next four event IDs are all accommodated using delta values, resulting in setting header[5]=536876035, header[6]=536876038, header[7]=536876-039, and header[8]=536876041.

These event IDs are followed by full event IDs 973 and 536876042 and a delta-based event ID 536876043. At this point, the next indicator is the two-bit sequence "11", which means that a back-reference entry follows, taking up the next four bits. The back-reference entry is the integer "11", indicating that the entry at index 11 of the event chain is the back-referenced event. The first chain of the header may thus be terminated by the 4-bit back-reference pointer in the depicted embodiment.

The first bit after the end of the first event chain is a "0" (a "more-chains indicator") which signifies that there is another event chain in the header. Similar processing may then be conducted for the next event chain, which starts with an event ID 536876100 in the depicted example, and continues with delta-based event ID 536876104 and full event ID 536876113. The decompressed set of event IDs making up the first few entries of the part of the header illustrated in FIG. 14 are:

Event Chain #1:
   header[0]=536876001
   header[1]=536876003
   header[2]=971
   header[3]=536876006
   header[4]=536876033
   header[5]=536876035
   header[6]=536876038
   header[7]=536876039
   header[8]=536876041
   header[9]=973
   header[10]=536876042
   header[11]=536876043
   header[12]=back-reference to header[11]; end of chain #1

Event Chain #2:
   header[13]=536876100
   header[14]=536876104
   header[15]=536876113

Figure 15:
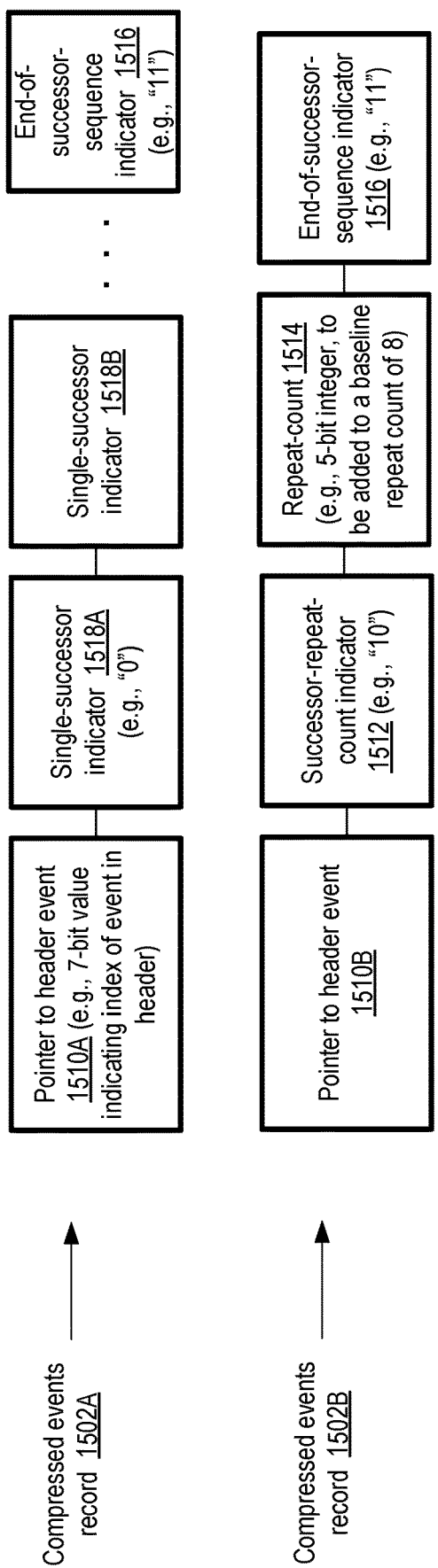
FIG. 15 illustrates examples of compressed events records which may be stored in a data portion of a trace partition, according to at least some embodiments.

In addition to (or instead of) being used for header portions, compression algorithms may be used for data portions of trace partitions in various embodiments. FIG. 15 illustrates examples of elements of compressed events records which may be stored in a data portion of a trace partition, according to at least some embodiments. As discussed earlier, the event chains stored in the header portions of trace partitions may at least in some embodiments be constructed using sequence frequency records, and thus may comprise most-likely-successor events of various predecessor events. In the data portion of the partition, in some embodiments, references or location pointers may be stored to the event chains stored in the header, but the actual sequence of events that occurred in the trace may at least in some cases differ (at least partly) from the events represented in the event chains. That is, even though an event chain of a header may represent a frequent sequence of events, that frequent sequence may not always occur, and so the data portion may have to indicate how closely the actual successor events in the traced execution matched the successor events represented in the header in various embodiments. If, for example, an event chain stored in the header comprises the sequence E1-E2-E3-E4, and an actual occurrence sequence during the execution was E1-E2-E3-E5, the data portion may point to the event chain E1-E2-E3-E4 of the header, but may also have to indicate that the fourth event was E5 and not E4.

Two types of compressed events records are shown by way of example in FIG. 15: one (1502A) in which single-successor indicators are used to represent occurrences of individual cases of successive events of event chains of the header, and another (1502B) in which cases where a large number of events actually occurred in the sequence indicated in an event chain are indicated by a short successor-repeat-count encoding.

Compressed events record 1502A starts with a pointer to a header event 1510A, such as a 7-bit value indicating an index of an event ID stored within one of the event chains of the header. Note that, after a header is decompressed, it may be thought of simply as a sequence of events (with some back references included), so any index within the header may be considered the starting event of an event chain for the purposes of describing the actual set of detected events in the data portion in various embodiments. That is, even though the compressed version of the header may comprise disjoint event chains in some embodiments, each chain starting with a full starting event ID and ending with a back reference, a pointer in the data portion may in some cases point to an event which is not the starting event of a compressed event chain in the header.

In compressed events record 1502A, a single-successor indicator 1518A (such as the single bit "0") following the pointer 1510A may be used to indicate that the event that succeeds (in the header) the event pointed to by 1510A actually occurred in the trace. A number of single-successor indicators (such as 1518B) may follow, each indicating that one more successor event recorded in the header was actually encountered during the execution of the traced program. The sequence of single-events as recorded in the pointed-to part of the header may be terminated by an end-of-successor-sequence encoding 1516 (such as the 2-bit sequence "11") in the depicted embodiment.

The single-successor indicators 1518 may be used in cases when the number of actual successor events that match the event chains of the header is relatively small. For example, consider a scenario where an event chain of the header comprises E1-E2-E3-E4-E5-E6, and the actual events represented by a record 1502 were E1-E2-E3-E4-E7 . . . . If the index of E1 within the header is 5, the corresponding compressed events record may comprise the following: <pointer-to-index-of-E1-in-the-header>00011 <pointer-to-index-of-E7-in-the-header>. In this example, the 3 zeros of the bit-sequence "00011" indicate that in the actual trace, E1 was followed by three successor events which match the header (E2, E3 and E4), and the two-bit encoding "11" indicates that despite the presence of E5 as the successor of E4 in the header, E5 did not follow E4 in the part of the actual execution being represented by the compressed events record.

Compressed events records similar to 1502B may be used when the number of actual successor events that match the event chains of the header is relatively large, e.g., greater than N where N is a configurable parameter. Record 1502B also beings with a pointer to a header event 1510B in the depicted example, and ends with and end-of-successor-sequence indicator 1516. Instead of single-successor indicators 1518, however, record 1502B comprises a successor-repeat-count encoding or indicator 1512 (such as the two-bit sequence "10"), followed by an actual repeat-count 1514 (e.g., a K-bit integer to be added to a baseline repeat count L). The K-bit integer may be added to the baseline repeat count of L in embodiments in which, if the repeat count was less than the baseline L, using the single-successor indicators may have been more efficient.

Consider an example scenario in which, during the part of the execution of the program to be represented by record 1502B, the event pointed to be 1510B was followed by 36 successor events which match those in the header, and that the baseline repeat count L is 8. Instead of using 36 single-successor indicators, the following bit encoding may be used: "101110011". In this encoding, the initial "10" indicates that the following 5 bits (11100 in binary, or decimal 28) represent a repeat count in addition to the baseline count of 8 (making a total of 36 successor events which match the header), and the final 11 indicates the end-of-successor-sequence. Note that at least in some embodiments, single-successor indicators may be used after one or more successor-repeat-counts.

As with the concepts underlying the header compression algorithm, the concepts underlying the compression algorithm used for the data portion of a trace partition may also be better understood using a concrete example of decompression. Such a decompression may, for example, be performed by a trace presentation tool when the trace object is processed for presentation to a user. FIG. 16 illustrates an annotated example of a decompression of part of a data portion of a trace partition, according to at least some embodiments. The annotated example 1602 begins by indicating that a new chain of the data portion, corresponding to a compressed events record 1502, is being processed. The first seven bits represent a pointer to a header event index, which is 0 in this example, so the first event in the compressed events record has the event ID 536876001 corresponding to header[0]. In at least some embodiments, the number of bits used for the pointer may be approximately $\log_2$(the number of events in the header). The next two bits are "10" (one example of the successor-repeat-count indicator 1512 of FIG. 15), which signify that the next 5 bits specify how many times the successor events represented in the header were actually encountered in the traced execution. These next 5 bits contain the value 8, which is added to a baseline of 8, making a total of 16 successor events that can be computed without reading any more of the data portion. Note that values of 5 (the number of bits used to indicate the repeat count) and 8 (the baseline) may be configurable parameters in some embodiments.

The sixteen successor events of 536876001, shown as uncompressed[1] through uncompressed[16], may then be computed simply by processing the events listed in the decompressed version of the header. In some cases, back-references of the header event chains may be processed, as in the entries for uncompressed[12] through uncompressed[16] in the depicted example. The bit sequence "11" following the 5 bits of the repeat count may indicate the end of the actual event chain and the corresponding compressed events record in the depicted embodiment.

A second example of a compressed events record is also shown in FIG. 16, starting with the line "Read 7 bits: 67 . . . .". This second compressed events record begins with a pointer to index 67 of the header, which corresponds to an event ID 536876047. The next 7 events of the execution actually match the successor events indicated in the header, and are represented by 7 successive single-successor-indicators (7 "0" bits). The second compressed events record also ends with a "11" bit sequence in FIG. 16. It is noted that the compression techniques and parameters used in some embodiments for trace partition headers and data portions may differ from those indicated in FIG. 13, FIG. 14, FIG. 15 and FIG. 16.

As mentioned earlier, a tree of nodes representing respective execution units may be generated from a trace object in various embodiments to generate a visualization data set, and some number of nodes of the tree may be pruned to optimize memory usage. FIG. 17 illustrates an example of pruning of a trace tree generated for a visualization data set, according to at least some embodiments. A potential full trace tree 1702 of a simple execution of a program, which would have been created if pruning were not implemented, may comprise seven nodes corresponding to seven execution units in the depicted example: an invocation of a main( ) function, and respective invocations of functions a1( ) and a2( ) from main( ), functions b1( ) and b2( ) from a1( ), and functions c1( ) and c2( ) from b1( ). The events corresponding to the calls of the seven functions may occur, and be recorded in the trace object, in the order (main( ), a1( ), b1( ), c1( ), c2( ), b2( ), a2( )) relative to one another in the example shown. The events corresponding to the returns from the functions may occur in the order (c1( ), c2( ), b1( ), b2( ), a1( ), a2( ), main( )). Note that although the arrows shown in the tree representation of the trace (in FIG. 17, and also in FIG. 19-FIG. 21) point from the nodes representing caller (or invoking) functions to called (or invoked) functions, in at least some embodiments a user may move up and down the call stack as desired when the trace is visualized—that is, the arrows may be considered logically bi-directional in that a given node may be accessed from either direction.

A trace presentation tool or some other program may parse the partitions of the trace object in order, and create respective nodes as the call events (the starting or entry events of the functions) are encountered in some embodiments. Node pruning decisions may be made, based at least in part on a partition locality criterion, when return or ending events are encountered in various embodiments. In the depicted embodiment, a node representing a given function may be pruned if both the starting event (the call or entry into the function) and the ending event (the return) for that function are present within the same partition of the trace object. When such a node is pruned, information about the partition from which its starting and ending events can be retrieved may be retained in various embodiments, so that it is easy to reconstruct or instantiate the details of the pruned node and its child nodes (e.g., in response to a programmatic request from a user or viewer to expand the pruned node). In some embodiments, for example, the location (e.g., event index) in the partition of the starting event and/or the ending event of an execution unit being targeted for pruning may be saved in a compact data structure pointed to from the parent node of the pruned node. The fact that both the starting and ending events (as well as events representing calls from the pruned node) can be retrieved quickly, by reading the contents of a single partition, may in various embodiments justify the tradeoff between the memory savings associated with pruning the node, and the potential cost of instantiating the node details if/when needed. In effect, in various embodiments, pruning a node may represent the logical equivalent of deleting information about the node's children (from memory), and keeping track of where in the trace file the deleted information can be obtained if the node were to be re-instantiated or re-populated with the children-related information. Of course, some pruned nodes may not have to be re-instantiated at all (e.g., if no request that requires such re-instantiation is received), in which case the memory savings would be achieved without any re-instantiation costs. Note that if a given node A is pruned, and then A's parent node B is also pruned, information about the node A may in effect be deleted entirely from memory in various embodiments. However, this may not present a problem, because user interactions to expand (re-instantiate) nodes may proceed top-down in the tree in such embodiments, and all the information regarding A would be obtained if/when its parent B were to be expanded. Some additional operations to facilitate searches, involving the insertion of dummy nodes in a search index, may be performed when parent-child combinations (or longer hierarchical combinations of nodes) are pruned in some embodiments. Additional details regarding such dummy nodes are provided below in the context of FIG. 19-FIG. 21. In at least some embodiments, a different partition locality criterion may be used to select nodes for pruning: e.g., if reconstructing a node's details requires reading less than N partitions, where N is configurable, the node may be pruned.

In state 1704 of the creation of the tree, the trace object has been partially parsed in execution order, and nodes for the functions main( ), a1( ), b1( ) and c1( ) have been created as their starting events are encountered. No ending events have yet been encountered, so pruning decisions have not yet been needed. In state 1706, an ending event for c1( ) has been encountered within the same partition as the starting event, so the node for c1( ) is pruned based on locality considerations.

In state 1708, the parsing of the trace object has continued, and a node for c2( ) has been created when its starting event is detected. The name and trace object address information for the pruned node c1( ) has been retained in a compact data structure, as suggested by the dotted-line representation of c1( ). In state 1710, the ending events of both c2( ) and b1( ) have been found in the same partitions as their respective starting events, so both c2( ) and b1( ) have also been pruned based on the partition locality criterion in use. When a parent node (e.g., b1( ) of one or more previously-pruned nodes (e.g., c1( ) and c2( )) is itself pruned, in the depicted embodiment the data structures representing the child nodes may also be removed from the tree. In state 1712, the ending events of all the functions have been encountered, and none of the other functions has met the partition locality criterion for pruning. As a result, the initial visualization data set comprises full nodes for main( ), a1( ), b2( ) and a2( ), a compact data structure for the pruned node b1( ), and no data structures for the child nodes c1( ) and c2( ) of the pruned node. The nodes retained in the pruned tree of state 1712, including the pruned nodes for which address information has been retained, such as b1( ) may be displayed via an interactive interface in the depicted embodiment. If and when a viewer or interface user submits a request to expand b1( ) to obtain more information about the pruned node, the lower-level details may be re-instantiated using the partition address information saved for the pruned node in the depicted embodiment. Such reconstruction may include the creation and display of nodes for c1( ) and c2( ) in at least some embodiments. In various embodiments, in a scenario in which both a child node and its parent node are pruned, the address information may only be retained in memory for the parent node, since all the information pertaining to the child node would be obtained when the trace object is read to expand the parent node. The overhead required for reconstructing the child nodes of a pruned node may be quite small in embodiments in which a locality criterion of the kind discussed above is used to select pruning candidates: for example, only a single read I/O directed at the trace object may be required to reconstruct the details for all the child nodes of one or more pruned nodes in some cases. As mentioned earlier and described in greater detail below, in order to facilitate searches, dummy nodes may be inserted into a search index in some embodiments when nodes at multiple levels of the tree are pruned. In at least some embodiments, a pruned node that has been re-instantiated in response to an expansion request may eventually be re-pruned (e.g., if a request to reduce the amount of information to be displayed is received).

Figure 18:
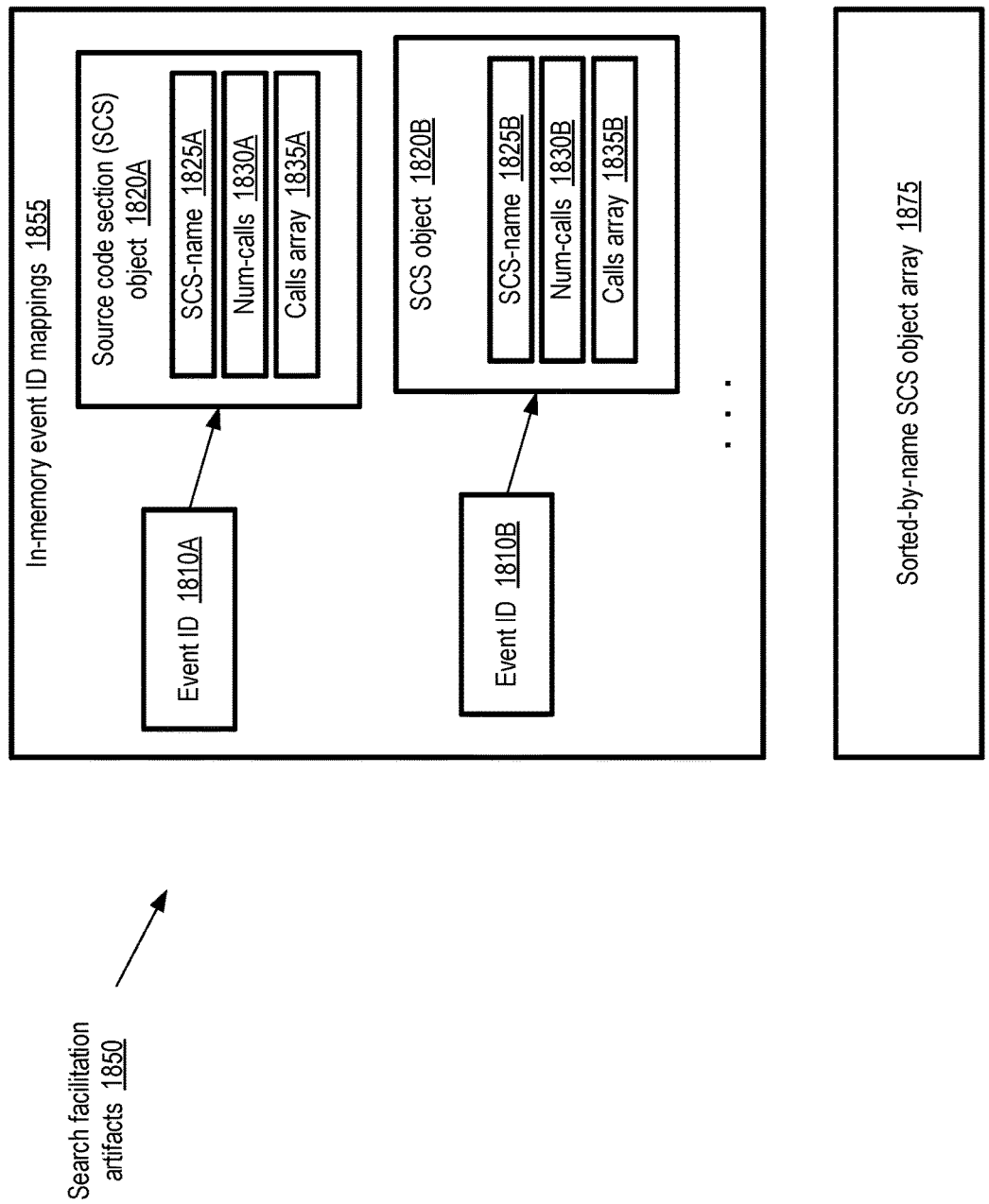
FIG. 18 illustrates example search facilitation artifacts which may be created for a trace object, according to at least some embodiments.

As mentioned earlier, a search index may be created from the trace object in various embodiments, which may help facilitate the exploration of the program execution via an interactive interface. In at least some embodiments, a trace presentation tool may create the search index as well as the visualization data set comprising a pruned tree, e.g., in a single pass through the trace object. FIG. 18 illustrates example search facilitation artifacts which may be created for a trace object, according to at least some embodiments. In the depicted embodiment, the artifacts 1850 which help facilitate searches may comprise a set of in-memory event ID mappings 1855. A given event ID mapping may indicate, with respect to an event ID 1810 (e.g., 1810A or 1810B), an object 1820 (e.g., 1820A or 1820B) representing potentially multiple invocations of the corresponding source code section (SCS), with more information being added to the mapping as additional invocations are detected in the trace object. The SCS object 1820 may in turn comprise a name 1825 (e.g., SCS-name 1825A or 1825B) of the source code section, the number of invocations or calls 1830 (e.g., num-calls 1830A or 1830B) of the SCS that have been encountered in the trace thus far, and an array of pointers 1835 (e.g., calls array 1835A or 1835B) to the tree nodes representing each of the invocations or calls. The in-memory mappings 1855 may, for example, be used to quickly provide a listing of numerous calls to a given SCS indicated by a user during an interaction session, such as a particular function, method or procedure. Note that some of the information shown in FIG. 18 may have other uses than for searches alone in some embodiments—e.g., the mappings from event IDs to SCS-names may be used to create the tree representations of the trace.

In at least one embodiment in which the search facilitation artifacts are created by a trace presentation tool, the presentation tool may load and examine a call index file (similar to file 916 shown in FIG. 9) of the trace object, e.g., prior to parsing the trace partitions. Event ID mappings 1855 may be initialized (e.g., with just the SCS-name fields populated) at this stage in some embodiments. The mappings may be implemented using any of a variety of data structures in various embodiments, such as an array, or a hash table with event IDs as keys. In at least some embodiments, the mappings 1855 may retain information about only N calls for each SCS, where N is a configurable parameter. If there are more than N calls to a given source code section, such "extra" calls may not be tracked in the calls array in various embodiments. Num-calls may still be incremented, and navigation to such extra calls via the tree in the interactive interface may still be possible, even though the extra calls may not be included in search results in such embodiments.

In at least one embodiment, another data structure to facilitate searching of the execution units by name, such as a sorted-by-name array 1875 of the SCS objects 1820 may also be created and retained at least partially in memory during an interaction session. For name-based searches, binary searches may be conducted within array 1875 in one embodiment; linear searches may also or instead be used in other embodiments. Name based searches may also be performed based on specified sub-strings of the SCS names, and/or regular expressions, in various embodiments. In some embodiments, at least some of the event ID mappings 1855 may be stored at persistent storage devices, instead of, or in addition to, being stored in volatile memory.

As indicated in FIG. 18, search facilitation artifacts (such as the calls arrays 1835) may be closely associated with the nodes of the tree generated during the parsing of a trace object in at least some embodiments. In embodiments in which nodes may be pruned based on partition locality as discussed earlier, this may potentially lead to complexity during the creation of the search facilitation artifacts.

As the partitions of the trace object are parsed in order, in some embodiments, every time a call to a source code section (SCS) is encountered, the SCS object 1820 for the event ID representing that call may be modified to reflect the occurrence of the call (e.g., the num-calls field 1830 indicating how many times the SCS has been called so far, may be modified). In at least some embodiments, a "node builder" object may also be created when a calling event is encountered. When the corresponding return event is encountered, in such embodiments, the node builder object may be finalized and one of two types of tree nodes may be created based on whether a partition locality criterion is met: a concrete node (an unpruned node) or an expandable node (a representation of a pruned node).

When the matching return event is encountered for a given invocation of an SCS, the search event ID mappings may also be updated in some embodiments. The appropriate SCS object may be looked up, and the appropriate calls array entry may be set to point to the created tree node. In at least some embodiments, some additional considerations may have to be taken into account when tree nodes are pruned. It is fine to point to an expandable node as long as it exists in the tree. However, there is a chance its parent gets pruned also, in which case the child expandable node may be orphaned in at least some embodiments. Such potential orphan-causing operations may be detected in various embodiments, and the search artifacts may have to be updated accordingly, as having a calls-array entry pointing to an orphaned tree node may be problematic.

In some embodiments, the complexity introduced into search artifact generation due to the possibility of orphaned nodes may be handled by maintaining a list of "re-parentable" objects as the tree is built and pruned. A re-parentable object may represent a node that is at risk of becoming an orphan. When the trace presentation tool encounters a return event of an execution unit (a particular invocation of an SCS), it also checks if the tree node for that execution unit could become an orphan in future. In embodiments in which the criterion for pruning is that the starting and ending event of an execution unit (EU) lie in the same trace partition, the parent of a node that cannot be pruned also cannot be pruned by definition, as the parent also cannot meet the partition locality criterion. For these (un-pruned) cases, it is always safe for the calls array to point directly at the tree node. However, if an expandable or pruned tree node is created for an EU, there is some chance that the parent might get pruned also, resulting in orphaning. Therefore, such a potentially orphan-able node may be stored in a "re-parentables" list in some embodiments. In one implementation, a reference to the appropriate calls array entry may be stored in the re-parentable object, so that the entry can be updated if the original value becomes orphaned as a result of the parent having been pruned.

Figure 20:
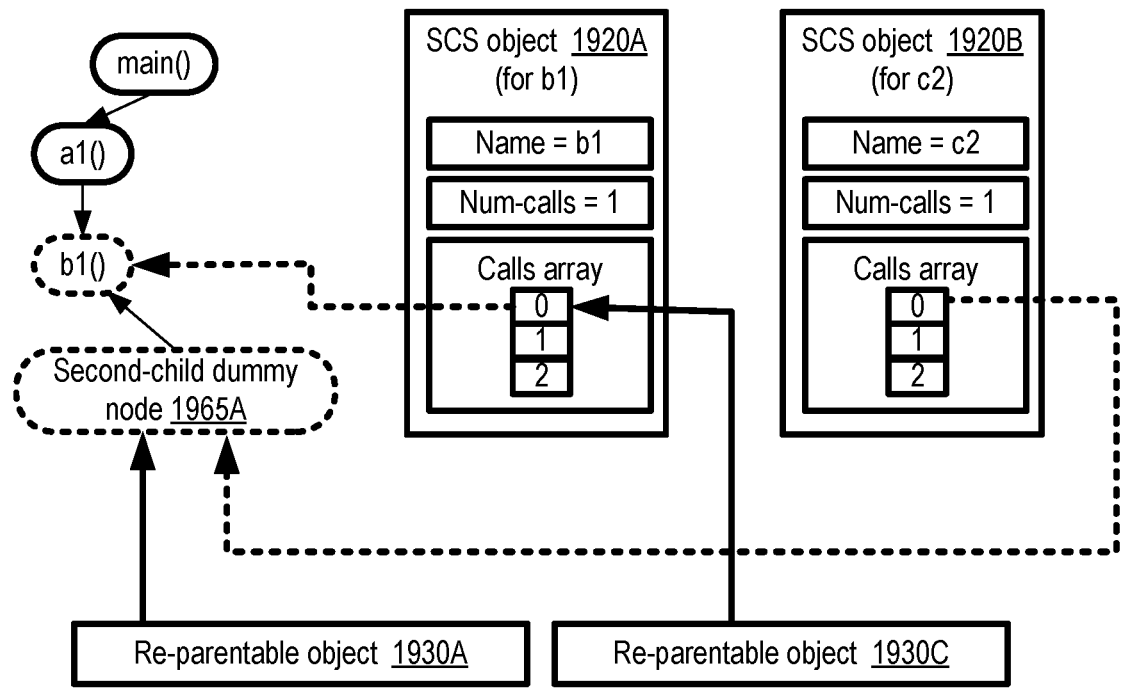
Figure 21:
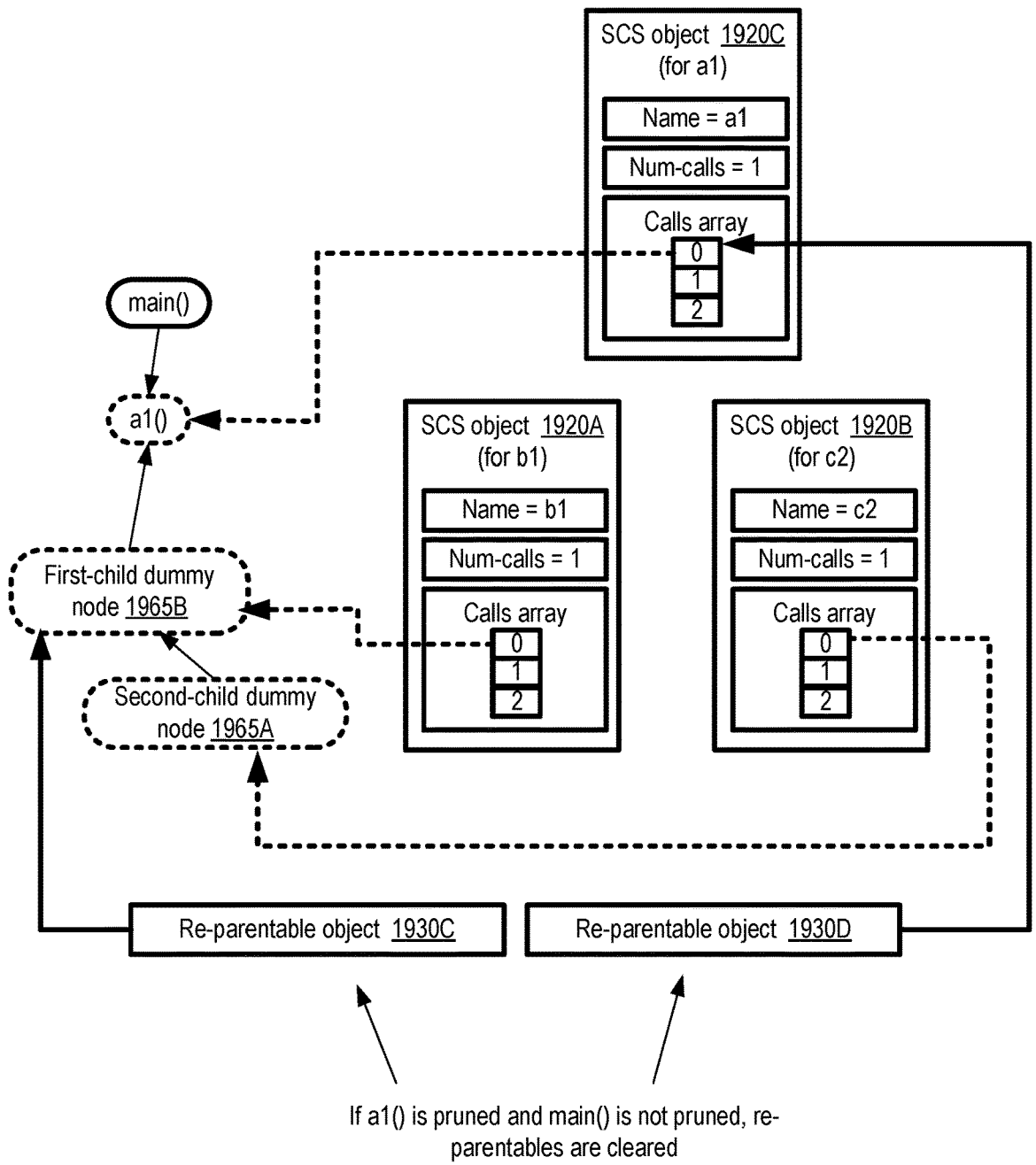

FIG. 19, FIG. 20 and FIG. 21 collectively illustrate examples of the creation of "re-parentable objects" during search index generation for some traced programs, according to at least some embodiments. A subset 1950A of the SCS objects corresponding to a trace tree 1902 is shown in FIG. 19. At the stage of the parsing of the trace object when the call to c2( ) is encountered, num-calls in SCS object 1920A corresponding to b1( ) has been set to 1, and num-calls in SCS object 1920B corresponding to c2( ) has been set to 1. Later, when c2( )'s return event is encountered in the trace object, as indicated in subset 1950B, a potentially orphaned pointer 1960A (i.e., a pointer to a potentially orphaned node c2( ) may be created, and a re-parentable object 1930A may be generated (e.g., if a decision to prune c2( ) is reached). Re-parentable 1930A may point initially to the calls array entry of SCS object 1920B from which the potentially orphaned pointer 1960 emerges. Note that other re-parentable objects, such as 1930B corresponding to b1( )'s call to c1( ) may also have been created at this stage. In the depicted embodiment, the set of re-parentables corresponding to children nodes of a given parent node may be passed to the parent node for resolution when the parent's own pruning decision is eventually made.

In FIG. 20, the subset 1950C is shown after both c2( ) and its parent b1( ) have been pruned. A dummy node 1965A corresponding to c2( ), indicating that c2( ) was the second child of b1( ), may be created in the depicted embodiment, and the re-parentable 1930A may now point to the dummy node 1965A. As shown, the dummy node itself points to the compact representation of the pruned parent node b1( ) in the tree. As an optimization, in some embodiments dummy nodes may also store the corresponding call event IDs, ensuring that a text representation of a call stack (showing SCS names) can be built if desired without having to re-examine the trace object itself. In FIG. 20, another re-parentable object 1930C may be created for the potentially orphaned pointer to b1( ) from 1920A's calls array.

In FIG. 21, subset 1950D of SCS objects, at the stage where a1( ) has also been pruned is shown. Now, the calls array entry from SCS object 1920B for c2 points to the second-child dummy node 1965A, which is itself a child of a first-child dummy node 1965B representing b1( ). Re-parentable 1930C points to the dummy node 1965B, and a new re-parentable object 1930D corresponding to a1( ) has been created in case a1( )'s parent (main( )) also gets pruned. If main( ) does not get pruned, eventually the re-parentables passed to main( ) may be cleared/discarded in the depicted embodiment. Note that in various embodiments, the search index may be navigated starting from the bottom up—e.g., starting at a particular call, the search logic may navigate up using dummy nodes to the first/lowest tree node, expand that tree node, and then navigate down the expanded tree to get to the appropriate node for the particular call.

In various embodiments, the entire call stack for each traced call may be constructed without needing to examine the trace object itself, e.g., by traversing up all the parent nodes (whether unpruned tree nodes or dummy nodes) and looking up the name of the source code section corresponding to each execution unit. If a user actually clicks on (or otherwise indicates) a particular search result via an interactive interface, the trace file may have to be accessed to expand the appropriate tree node in some embodiments. As indicated above, the entry from the calls array of the SCS object may be a dummy node in some cases. In the latter scenario, the chain of dummy nodes may be traversed upwards until an actual expandable tree node is encountered. From this expandable node, the partition to be loaded from the trace object may be determined, and then the nodes of the tree below the expandable node may be constructed in at least some embodiments in its entirety without further pruning. The child numbers in the dummy nodes may be used as a roadmap to find the correct tree node during the traversal down the tree from the expandable node. In one embodiment, a garbage collection algorithm may be used to discard nodes that were initially pruned but later expanded.

Figure 22:
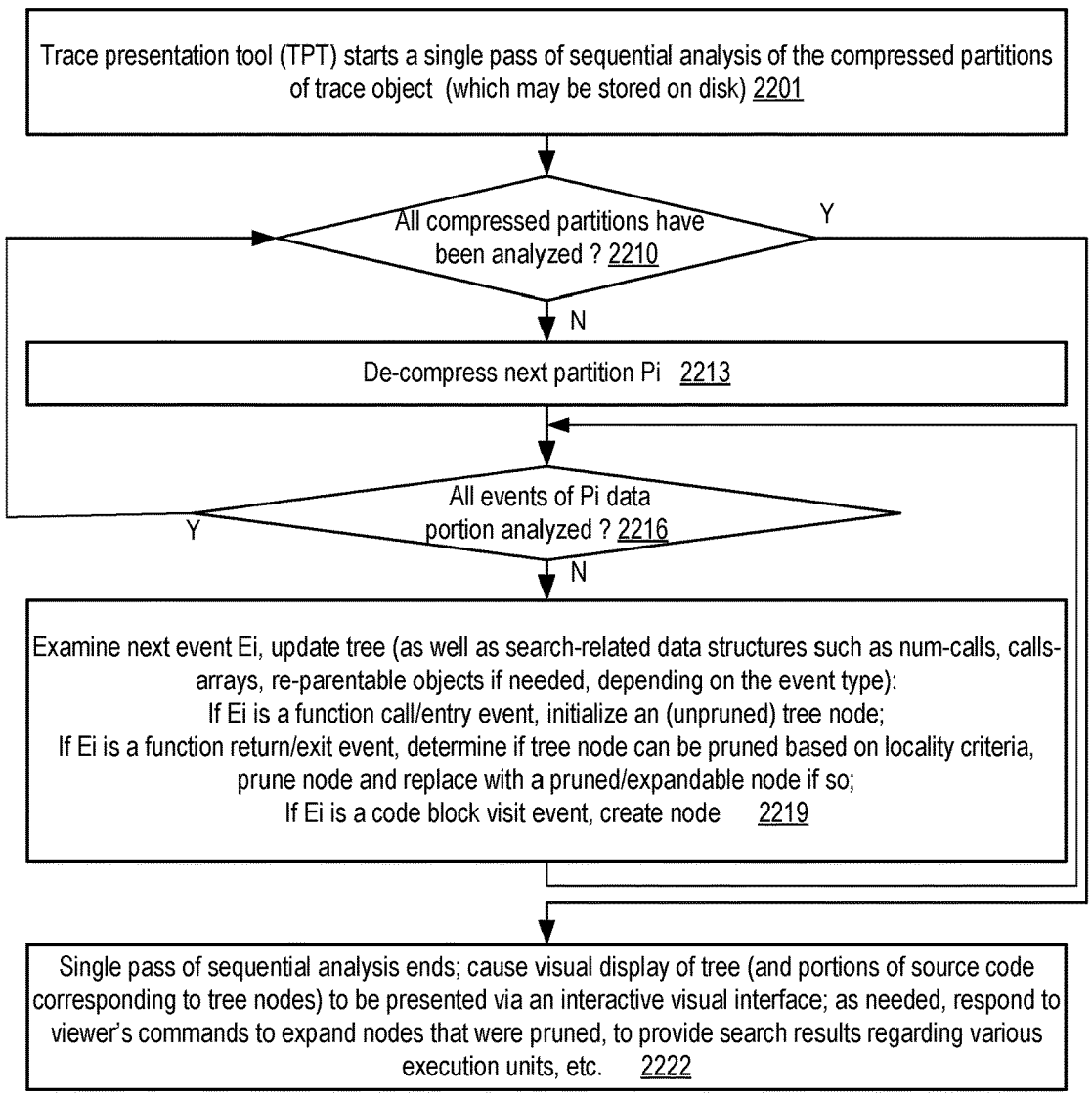
FIG. 22 is a flow diagram illustrating aspects of operations that may be performed to generate contents of a visualization data set corresponding to a trace object, according to at least some embodiments.

FIG. 22 is a flow diagram illustrating aspects of operations that may be performed to generate contents of a visualization data set corresponding to a trace object, according to at least some embodiments. As shown in element 2201, a trace presentation tool (TPT) may start a single pass of sequential analysis of the trace object corresponding to a particular execution of a program. The partitions may, for example, be stored as respective files or blocks on disk or other types of media in various embodiments.

If at least some compressed partitions of the trace object have not yet been analyzed (as determined in operations corresponding to element 2210, the next partition may be decompressed (e.g., using techniques similar to those discussed earlier) in the depicted embodiment (element 2213). The events indicated in the uncompressed data portion may then be analyzed in sequence in the depicted embodiment. If at least one event remains to be analyzed (as detected in operations corresponding to element 2216), the next event Ei may be processed based on its type (e.g., function/procedure/method call vs. return vs. code block visited event) (element 2219) in the depicted embodiment.

If, for example, the event Ei is a function call/entry event, an unpruned tree node may be initialized for it in various embodiments. If Ei is a function return/exit event, a decision may be made, e.g., based on partition locality criteria as discussed earlier, whether the node corresponding to the invocation of the function (i.e., the execution unit representing the just-completed execution of the function) can be pruned in the depicted embodiment; if so, the original node may be replaced by a pruned/expandable node. If Ei happens to be a code block visit event, a node may be created. Note that at least in some embodiments, different types of data structures may be used to represent function invocations than the data structures used for code block visits, since more complex data may be needed for presenting visualizations of at least some function invocations (which may include invocations of numerous other functions and visits to numerous code blocks) than is needed for visualization of code block visits. In various embodiments, as mentioned earlier, clutter-reduction criteria may be used when deciding whether to display code block visit events. In one embodiment, such clutter-reduction techniques may be implemented primarily when a pruned node is expanded; e.g., with respect to unpruned nodes, all the information about the code block visits may be retained in memory in such an embodiment. In some embodiments, as a default the expanded version of a previously pruned portion of the tree may initially be populated primarily with nodes representing functions, with code block visit nodes being inserted into the tree only under certain conditions (e.g., if the number of consecutive code block visit events encountered, without an intervening function call or return event, exceeds some threshold) to avoid cluttering the provided view of the program execution. Note that when a user views the tree via an interactive interface, the user may of course expand the view provided of individual function invocations (e.g., by clicking on the corresponding node) and view more details about the code blocks that were visited within the function. In addition to the tree nodes, search-related data structures such as those shown in FIG. 18 may also be updated as events are encountered in the single pass through the partition in the depicted embodiment.

After all the events of one of the partitions have been analyzed (as may be detected in operations corresponding to element 2210) the next partition may be analyzed similarly in the depicted embodiment, until eventually the single pass through all the partitions has been completed (as determined in operation corresponding to element 2210). A visual display of the tree, as well as corresponding portions of source code may be presented via an interactive visual interface (element 222) in various embodiments. Note that the mappings between event IDs and source code (similar to those indicated in FIG. 9) may be used to access the appropriate files of source code, e.g., from portions of a source tree to which the trace presentation tool has been provided access. As needed, the presentation tool may respond to a viewer's commands, e.g., to expand nodes that were pruned, to respond to search requests regarding various execution units, and the like in various embodiments.

Figure 23:
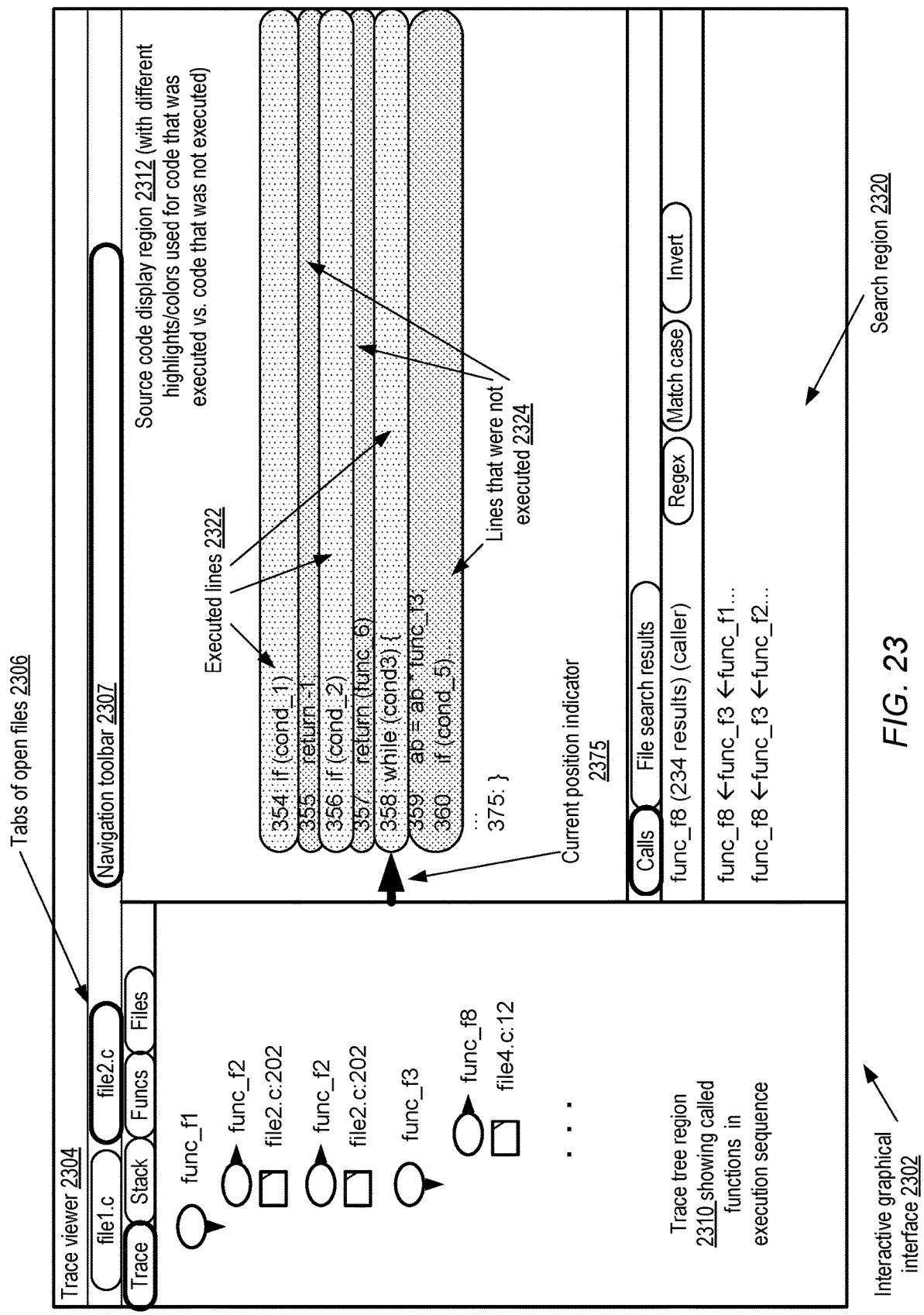
FIG. 23 illustrate example aspects of an interactive interface which may be employed to display and explore trace information, according to at least some embodiments.

As indicated above, after the tree of nodes corresponding to the trace object (from which one or more nodes may have been pruned in some cases) has been created, and the artifacts used for the search index have been generated, in various embodiments at least a portion of the trace information may be presented via an interactive interface to parties interested in exploring the program's execution. FIG. 23 illustrate example aspects of an interactive interface which may be employed to display and explore trace information, according to at least some embodiments. As shown, an interactive graphical interface 2302 may comprise at least three regions in some embodiments: a trace tree region 2310 showing execution units such as invocations of functions in execution order, a search region 2320 and a source code region 2312.

In the trace tree region 2310, a hierarchy of nodes showing caller-callee relationships may be displayed in various embodiments, including source code file and line number information (e.g., "file2.c: 202" and "file4.c: 12") corresponding to various traced events. A user may, for example, click on an icon indicating an un-expanded execution unit (such as the icons shown for execution unit "func_f2", "func_f8", etc.) to expand the information displayed for that execution unit and its corresponding source code, or on an icon indicating a location within a source file to view that portion of the source code. A number of viewing options for the traced execution may be made available in different embodiments, in the portion of the interface corresponding currently to the trace tree, as shown by the tab headers labeled "Trace", "Stack" (for the call stack), "Funcs" (to obtain a list of the functions encountered in the trace), and "Files" (a list of source files whose code was encountered in the traced program execution).

In the depicted embodiment, highlighting (e.g., backgrounds of different colors) in the source code display region 2312 may be used for a number of purposes, such as to immediately indicate which particular parts of the source code were actually executed (such as lines 2322), and which ones (such as 2324) were not executed. (Note that to avoid clutter, only a few examples of highlighting are shown in FIG. 23.) In contrast to some tools, the code may not have to be stepped through laboriously to distinguish executed portions from the unexecuted portions. In some embodiments, several different configurable highlighting settings may be used—e.g., one color of highlighting may indicate lines that were executed elsewhere during the trace, but not in the execution units being examined/explored currently, another color may indicate lines that were executed in the execution units being explored currently, while a third color (or an absence of color) may be used to indicate lines that were not executed at all in the entire trace. In the example shown in FIG. 23, an arrow 2375 is used to indicate the current position in the source code; in other embodiments, highlighting may also be used to indicate the current position. In one embodiment, two different highlighting colors (or other visual indicators) may be used to indicate whether the current position is a function that can be jumped into, or not. In one embodiment, different highlight colors may be used to indicate the relative frequency of execution of different lines of the source code. Providing an instantaneous indications of lines that were not executed, as opposed to those that were executed in a given invocation, may be extremely helpful in security audits (and/or other types of audits, such as audits to identify unused code) in various embodiments. For example, an auditor may easily compare different invocations of the same function and spot, at a glance, if one invocation differs in a potentially suspicious way from another (e.g., if an important security-related task is skipped in one invocation).

In some embodiments, tabs (or new windows) may be used to clone the entire visual interface. Cloning the entire interface may be very helpful in such embodiments, e.g., to compare different calls to the same function and so on, with the differences being indicated by any of several categories of highlighting. In another common use case, the current tab may be cloned in some embodiments, enabling various operations such as (a) more detailed analysis in the cloned tab without losing one's place in the original tab, (b) searches in the cloned tab, and/or (c) visualization of search results in separate tabs. The navigation toolbar 2307 may include a number of additional interaction elements to navigate among source file lines in files 2306 corresponding to various traced events. A number of different ways to search for execution units or the corresponding source code sections may be supported in the depicted embodiment, as shown in the search results region—e.g., regular expressions (using the RegEx option) may be used, case may be matched if desired (using the "Match case" option), and/or inverted searches may be performed. Search results may be presented as a list of calls, showing a list of the parent execution units (e.g., func_f8 was called by func_f3, which was called by func_f1), etc. In addition to getting lists of searched-for functions and other source code sections corresponding to execution units, the answers to fairly complex search requests may be obtained easily in various embodiments using trace visualization capabilities similar to those illustrated in FIG. 23. For example, if a user wants to find all the invocations of a function Fx that were invoked via a different function Fy, or all the invocations of Fx that did not originate in Fy, the list of call stacks returned from a search for Fx may be filtered using regular expressions and the like in such embodiments.

In at least some embodiments, the visualization data set generated from the trace file may be pruned sufficiently that it can fit into a main memory of the computing device being used to display the trace information, even if the number of traced events is in the tens or hundreds of millions or even billions. As a result, the interface 2302 may be highly responsive to user input, with no detectable waiting required as various parts of the program's execution are explored. In addition to the kinds of pruning discussed earlier (e.g., with respect to FIG. 17), another type of pruning or information hiding operation may be conducted in at least some embodiments. At least some of the "file:line" nodes in the tree, such as "file2.c:202", may represent visited blocks of code (other than functions) for which events were captured in the trace. The number of such code-block-visited events may be quite large, so only a selected subset of such events (e.g., every Nth code-block-visited event, where N is a tunable parameter) may be included in the visualized version of the trace in some embodiments. Such a reduction in the count of displayed code-block-visited nodes may help reduce clutter substantially in the visual interface. Users may, of course, view all the code blocks visited (including the ones that were hidden) in various embodiments, e.g., by highlighting a given function in which such code blocks are visited and stepping through the code. As indicated in FIG. 23, where two calls to func_f2( ) are illustrated in the tree in succession, each call or visited block may be captured and represented by a separate node in some embodiments, even if the calls occurred from the same place in the code, such as from within a loop. Numerous types of information regarding a program execution may be obtained near-instantaneously in different embodiments, including, among others: (a) the total number of calls made to a particular source code section corresponding to an execution unit, (b) full and accurate call stacks of the execution units even when the program makes use of exception handling (exceptions may lead to mismatches among calls and returns, as the normal return events may conceptually be missing in some cases), (c) the number of times a given iterative construct such as a while loop or a for loop was executed during a given invocation (this type of information may be provided via a trace tree without the user having to single step through the code), (d) lines of code that were executed in the currently-focused-on portion of the trace execution (corresponding to a portion of the tree currently expanded), as opposed to the execution as a whole, (e) portions of code that were not executed at all during the trace, and so on. With respect to a conditional iteration construct, for example, in some embodiments the display may indicate, without requiring stepping through the code, that a source line corresponding to a testing of the condition was executed during a given portion of the trace, while one or more lines corresponding to an operation which would be performed if the condition were satisfied were not executed. The examination of execution units in reverse order of execution may be as easy as in the actual order of execution; such reverse-order may be cumbersome or impossible using other tools.

In at least one embodiment, a number of configuration options may be provided to enable users to customize the interface—e.g., mappings between keyboard keys/tabs and navigation operations may be made customizable, the manner in which different portions of source code are distinguished from one another based on actual execution may be made customizable, and so on. In some embodiments, a right click on a function name in the source code may be used to step forward and into the function; such a mouse click may typically be much faster and easier than using other interactive elements of the graphical interface for the same operation. If the function cannot be reached by stepping forward, the code may be automatically stepped backward in some embodiments, and the function may be jumped into. If the right click occurs on a function name outside the currently visualized function, a jump to the first call of the clicked-on function may result in one embodiment. A fast version of stepping forwards and backwards may be supported in some embodiments, in effect hopping along function calls. Clicking on the nodes in the tree portion of the interface may of course also provide another navigation mechanism in various embodiments. Customizable back and forward interface elements may also be used to restore state in some embodiments—e.g., a user could go back to a previous position in the trace tree and code using such elements. Up and down buttons/keys may be used to navigate up and down the call stack in various embodiments; the call stack may also be navigated by clicking on the desired point in the call stack.

Figure 24:
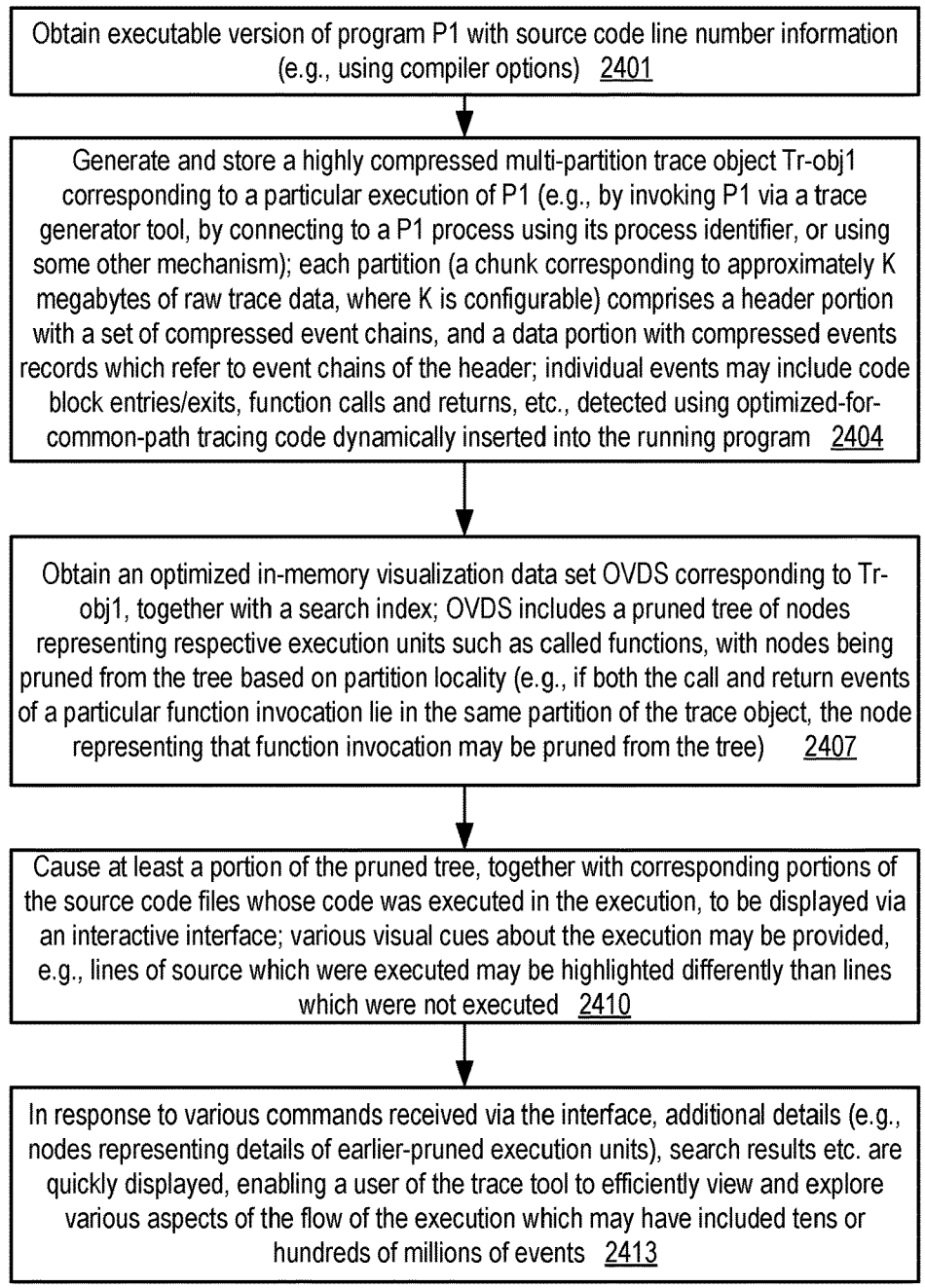
FIG. 24 is a flow diagram illustrating aspects of operations which may be performed to enable scalable tracing of programs, according to at least some embodiments.

FIG. 24 is a flow diagram illustrating aspects of operations which may be performed to enable scalable tracing of programs, according to at least some embodiments. As shown in element 2401, an executable version of a program P1 (the target program to be traced) with source code line number information may be obtained (e.g., using the appropriate compiler options).

A highly compressed multi-partition trace object Tr-obj1 corresponding to a particular execution of P1 (e.g., by invoking P1 via a trace generator tool, by connecting to a P1 process using its process identifier, or using some other mechanism) may be generated and stored (element 2404) in various embodiments. Each partition (a chunk corresponding to approximately K megabytes of raw trace data, where K is configurable) may comprise a header portion and a data portion. The header portion may be used to store a set of compressed event chains in some embodiments, while the data portion may include various compressed events records which refer or point to event chains of the header. The individual events recorded may, for example, include code block entries/exits, function calls and returns, etc., detected using optimized-for-common-path tracing code dynamically inserted into the running program in some embodiments. Compression techniques of the kinds described earlier may be used for both the header and the data portions in various embodiments, resulting in some cases in order-of-magnitude reductions in space requirements for traced events.

From the trace object Tr-obj1, an optimized in-memory visualization data set OVDS may be obtained in various embodiments (element 2407), together with a search index comprising a number of artifacts such as calls arrays of the kind described above. The OVDS may, for example, include a pruned tree of nodes representing respective execution units such as called functions, with nodes being pruned from the tree based on partition locality (e.g., if both the call and return events of a particular invocation of a function lie in the same partition of the trace object, the node representing that invocation of the function may be pruned from the tree, as the details of the invocation can be retrieved quickly from the stored version of TR-obj1).

At least a portion of the pruned tree, together with corresponding portions of the source code files whose code was executed in the execution, may be caused to be displayed via an interactive interface in some embodiments (element 2410). As discussed above, a number of visual cues may be provided to make it easier to understand the traced execution in different embodiments; for example, lines of source which were executed may be highlighted differently (or otherwise visually distinguished, e.g., using different fonts) than lines which were not executed in various embodiments.

In response to various commands received via the interface, additional details (e.g., nodes representing pruned execution units), search results and the like may be quickly displayed (element 2413) in various embodiments. Consequently, a user of the trace tools may be able to efficiently view and explore various aspects of the flow of the traced program execution, which may have included tens or hundreds of millions of events.

It is noted that in various embodiments, at least some operations other than those illustrated in the flow diagrams of FIG. 4, FIG. 5, FIG. 8, FIG. 12, FIG. 22, and/or FIG. 24 may be performed to implement the trace generation and presentation techniques described above. Some of the operations shown may not be implemented in some embodiments, may be implemented in a different order, or in parallel rather than sequentially.

Figure 25:
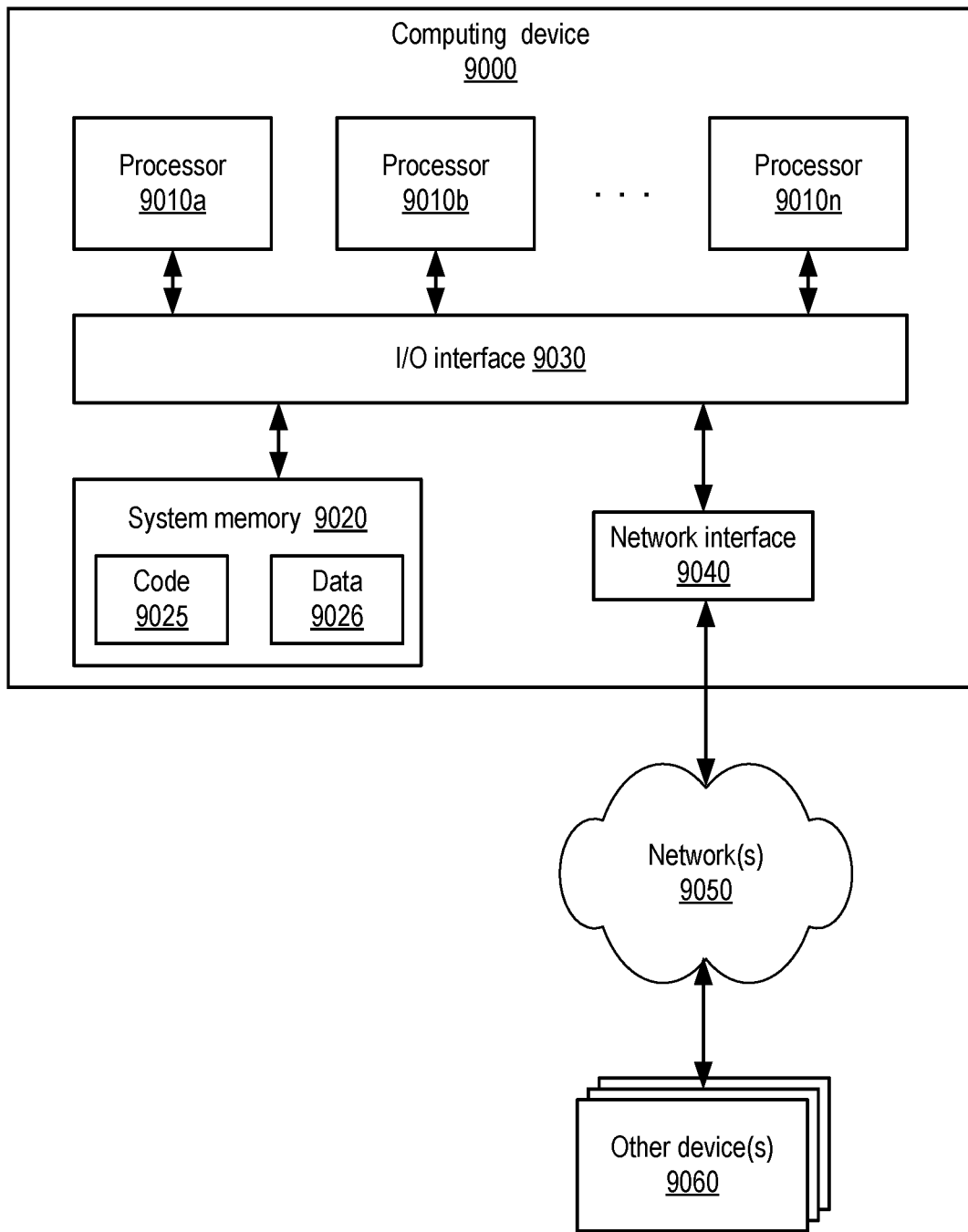
FIG. 25 is a block diagram illustrating an example computing device that may be used in at least some embodiments.

In at least some embodiments, a server that implements a portion or all of one or more of the technologies described herein, including the various components of a trace generation subsystem, a trace presentation subsystem, and the like may include a general-purpose computer system that includes or is configured to access one or more computer-accessible media. FIG. 25 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example.

Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 24, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 24 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 25 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Figure 26:
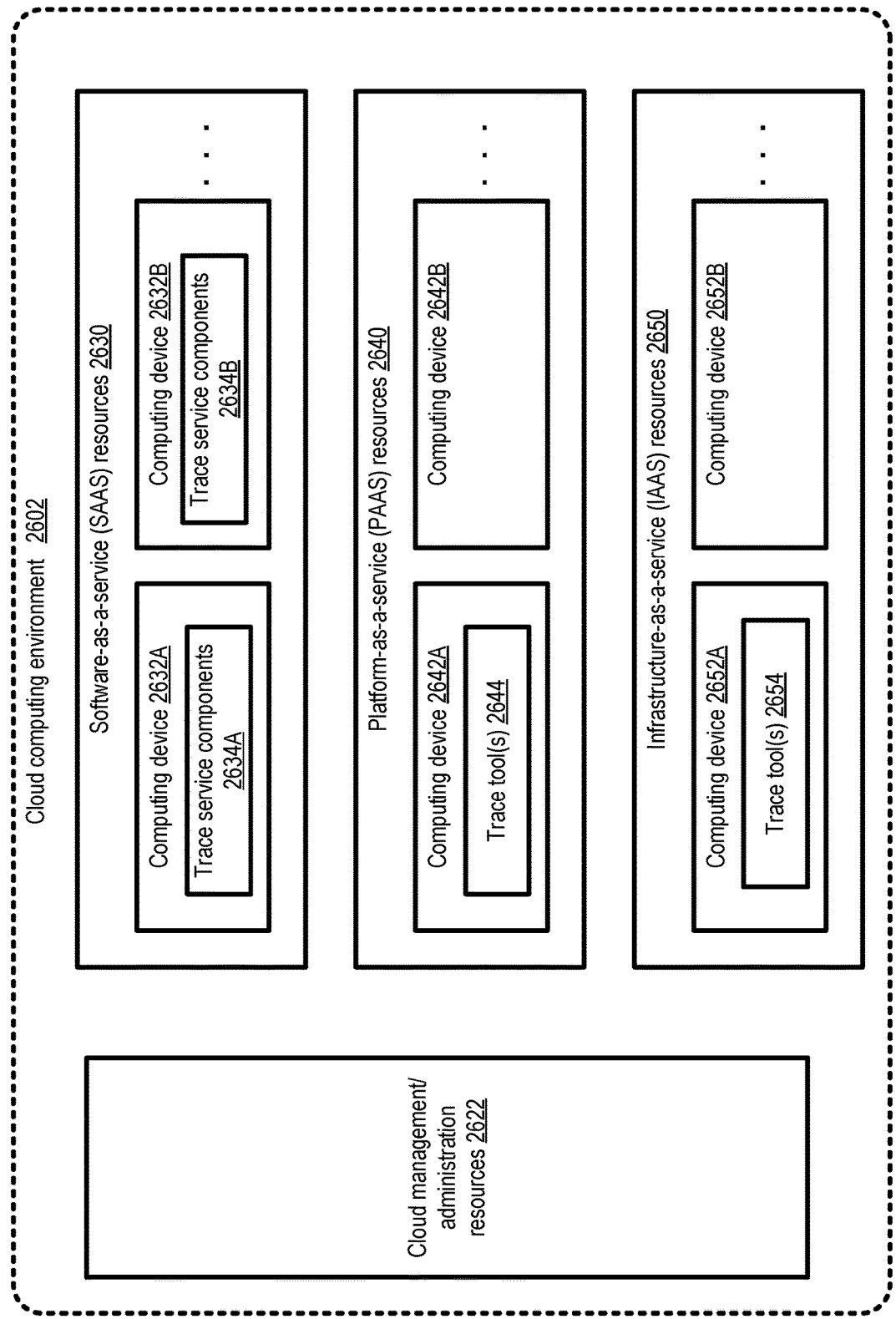
FIG. 26 illustrates an example cloud computing environment whose resources may be employed to efficiently trace programs with large code bases, according to at least some embodiments.

FIG. 26 illustrates an example cloud computing environment whose resources may be employed to efficiently trace programs with large code bases in at least some embodiments. As shown, cloud computing environment 2602 may include cloud management/administration resources 2622, software-as-a-service (SAAS) resources 2630, platform-as-a-service (PAAS) resources 2640 and/or infrastructure-as-a-service (IAAS) resources 2650. Individual ones of the these subcomponents of the cloud computing environment 2602 may include a plurality of computing devices (e.g., devices similar to device 9000 shown in FIG. 25) distributed among one or more data centers in the depicted embodiment, such as devices 2632A, 2632B, 2642A, 2642B, 2652A, 2652B and the like. A number of different types of network-accessible services, such as tracing services, database services, customer-relationship management services, machine learning services and the like may be implemented using the resources of the cloud computing environment in various embodiments.

In the depicted embodiment, clients or customers of the cloud computing environment 2602 may choose the mode in which they wish to utilize one or more of the network-accessible services offered. For example, in the IAAS mode, in some embodiments the cloud computing environment may manage virtualization, servers, storage and networking on behalf of the clients, but the clients may have to manage operating systems, middleware, data, runtimes, and applications. If, for example, a client wishes to use IAAS resources 2650 for efficient tracing of programs, the clients may identify one or more virtual machines implemented using computing devices 2652 (e.g., 2652A or 2652B) as the platforms on which the trace tool(s) 2654 (e.g., the trace generator and/or trace presentation tools similar to those discussed above) are to be run, download the trace tools, program source code, etc., and issue commands to capture and view traces via programmatic interfaces provided by the cloud computing environment. In the PAAS mode, clients may be responsible for managing a smaller subset of the software/hardware stack in various embodiments: e.g., while the clients may still be responsible for application and data management, the cloud environment may manage virtualization, servers, storage, network, operating systems as well as middleware. Trace tools 2644 may be deployed to, and run at, PAAS resources (e.g., 2642A, 2642B etc.) as applications managed by various clients in different embodiments. In the SAAS mode, the cloud computing environment may offer tracing as a pre-packaged service, managing even more of the software/hardware stack in various embodiments—e.g., clients may not even have to explicitly manage applications or data. Instead, for example, with respect to tracing functionality of the kind discussed above, clients may simply indicate (e.g., via programmatic interfaces) which programs are to be traced, and the SAAS resources may utilize tracing service components 2634 (e.g., 2634A or 2634B) pre-installed on computing devices 2632 to generate, store, and display traces as desired.

The administration resources 2622 may perform resource management-related operations (such as provisioning, network connectivity, ensuring fault tolerance and high availability, and the like) for all the different modes of cloud computing that may be supported in some embodiments. Clients may interact with various portions of the cloud computing environment using a variety of programmatic interfaces in different embodiments, such as a set of APIs (application programming interfaces), web-based consoles, command-line tools, graphical user interfaces and the like. Note that other modes of providing services (including tracing services) may be supported in at least some embodiments, such as hybrid public-private clouds and the like.

The various methods as illustrated in the Figures and described herein represent exemplary embodiments of methods. The methods may be implemented in software, hardware, or a combination thereof. The order of method may be

What is claimed is:

1. A computer-implemented method, comprising:
obtaining a trace object representing a particular execution of a program, wherein the particular execution of the program comprises one or more invocations of a particular execution unit of the program, wherein source code of the particular execution unit comprises a plurality of lines;
identifying, based at least in part on input received via an interactive graphical user interface, a particular invocation of the one or more invocations; and
causing a display of the plurality of lines to be presented via the interactive graphical user interface, wherein the display includes respective visual cues indicating (a) one or more lines of the plurality of lines whose code was executed during the particular invocation and (b) one or more lines of the plurality of lines whose code was not executed during the particular invocation, wherein the respective visual cues are presented without receiving input requesting stepping through the source code, and wherein the respective visual cues are presented without receiving input to insert a break point in the code, and wherein the display includes a particular visual cue indicating that code corresponding to a particular line of the plurality of lines was not executed during the particular invocation.

2. The method as recited in claim 1, wherein a particular visual cue of the respective visual cues comprises one or more of: (a) a font, (b) a text color, or (c) a highlighting color.

3. The computer-implemented method as recited in claim 1, wherein the particular visual cue indicates that the code corresponding to the particular line of the plurality of lines was executed during another invocation of the one or more invocations.

4. The computer-implemented method as recited in claim 1, wherein the interactive graphical user interface comprises a trace tree region corresponding to the trace object, wherein the trace tree region displays invocations of a plurality of execution units in a sequence in which the invocations occurred during the particular execution, and wherein the trace tree region indicates source code file line numbers corresponding to individual execution units of the plurality of execution units.

5. The computer-implemented method as recited in claim 1, further comprising:
in response to additional input received via the interactive graphical user interface, stepping backwards, with respect to the particular execution of the program, from a particular execution of a first line of source code, to indicate an execution of a second line of source code prior to the particular execution of the first line of the source code.

6. The computer-implemented method as recited in claim 1, further comprising:
indicating, via the interactive graphical user interface, a number of times a particular line of source code of the program was executed during the particular execution of the program.

7. The computer-implemented method as recited in claim 1, further comprising:
in response to obtaining a search request via the interactive graphical user interface, wherein the search request indicates the particular execution unit and another execution unit of the program, presenting a set of call stacks, wherein in individual call stacks of the set of call stacks, the particular execution unit is invoked from the other execution unit during the particular execution of the program.

8. One or more non-transitory computer-accessible storage media storing program instructions that when executed on or across one or more processors:
obtain a trace object representing a particular execution of a program, wherein the particular execution of the program comprises one or more invocations of a particular execution unit of the program, wherein source code of the particular execution unit comprises a plurality of lines;
identify, based at least in part on input received via an interactive graphical user interface, a particular invocation of the one or more invocations; and
cause a display of the plurality of lines to be presented via the interactive graphical user interface, wherein the display includes respective visual cues indicating (a) one or more lines of the plurality of lines whose code was executed during the particular invocation and (b) one or more lines of the plurality of lines whose code was not executed during the particular invocation, wherein the respective visual cues are presented without receiving input requesting stepping through the source code, wherein the respective visual cues are presented without receiving input to insert a break point in the code, and wherein the display includes a particular visual cue indicating that code corresponding to a particular line of the plurality of lines was not executed during the particular invocation.

9. The one or more non-transitory computer-accessible storage media as recited in claim 8, wherein a particular visual cue of the respective visual cues comprises one or more of: (a) a font, (b) a text color, or (c) a highlighting color.

10. The one or more non-transitory computer-accessible storage media as recited in claim 8, wherein the particular visual cue indicates that the code corresponding to the particular line of the plurality of lines was executed during another invocation of the one or more invocations.

11. The one or more non-transitory computer-accessible storage media as recited in claim 8, wherein the interactive graphical user interface comprises a trace tree region corresponding to the trace object, wherein the trace tree region displays invocations of a plurality of execution units in a sequence in which the invocations occurred during the particular execution, and wherein the trace tree region indicates source code file line numbers corresponding to individual execution units of the plurality of execution units.

12. The one or more non-transitory computer-accessible storage media as recited in claim 8, storing further program instructions that when executed on or across the one or more processors:
in response to additional input received via the interactive graphical user interface, step backwards, with respect to the particular execution of the program, from a particular execution of a first line of source code, to indicate an execution of a second line of source code prior to the particular execution of the first line of the source code.

13. The one or more non-transitory computer-accessible storage media as recited in claim 8, storing further program instructions that when executed on or across the one or more processors:
   indicate, via the interactive graphical user interface, a number of times the particular execution unit was invoked during the particular execution of the program.

14. The one or more non-transitory computer-accessible storage media as recited in claim 8, storing further program instructions that when executed on or across the one or more processors:
   in response to a search request received via the interactive graphical user interface, wherein the search request indicates the particular execution unit and an additional execution unit of the program, present a set of call stacks, wherein in individual call stacks of the set of call stacks, the particular execution unit is invoked from an execution unit other than the additional execution unit during the particular execution of the program.

15. A system, comprising:
   one or more computing devices;
   wherein the one or more computing devices include instructions that upon execution on or across the one or more computing devices:
      obtain a trace object representing a particular execution of a program, wherein the particular execution of the program comprises one or more invocations of a particular execution unit of the program, wherein source code of the particular execution unit comprises a plurality of lines;
      identify, based at least in part on input received via an interactive graphical user interface, a particular invocation of the one or more invocations; and
      cause a display of the plurality of lines to be presented via the interactive graphical user interface, wherein the display includes respective visual cues indicating (a) one or more lines of the plurality of lines whose code was executed during the particular invocation and (b) one or more lines of the plurality of lines whose code was not executed during the particular invocation, wherein the respective visual cues are presented without receiving input requesting stepping through the source code, wherein the respective visual cues are presented without receiving input to insert a break point in the code, and wherein the display includes a particular visual cue indicating that code corresponding to a particular line of the plurality of lines was not executed during the particular invocation.

16. The system as recited in claim 15, wherein a particular visual cue of the respective visual cues comprises one or more of: (a) a font, (b) a text color, or (c) a highlighting color.

17. The system as recited in claim 15, wherein the particular visual cue indicates that the code corresponding to the particular line of the plurality of lines was executed during another invocation of the one or more invocations.

18. The system as recited in claim 15, wherein the interactive graphical user interface comprises a trace tree region corresponding to the trace object, wherein the trace tree region displays invocations of a plurality of execution units in a sequence in which the invocations occurred during the particular execution, and wherein the trace tree region indicates source code file line numbers corresponding to individual execution units of the plurality of execution units.

19. The system as recited in claim 15, wherein the one or more computing devices include further instructions that upon execution on or across the one or more computing devices:
   in response to additional input received via the interactive graphical user interface, step backwards, with respect to the particular execution of the program, from a particular execution of a first line of source code, to indicate an execution of a second line of source code prior to the particular execution of the first line of the source code.

20. The system as recited in claim 15, wherein the one or more computing devices include further instructions that upon execution on or across the one or more computing devices:
   indicate, via the interactive graphical user interface, a number of iterations of a loop of source code during the particular execution of the program.

* * * * *

UNITED STATES PATENT AND TRADEMARK OFFICE
CERTIFICATE OF CORRECTION

| | |
|---|---|
| PATENT NO. | : 12,353,319 B2 |
| APPLICATION NO. | : 18/052888 |
| DATED | : July 8, 2025 |
| INVENTOR(S) | : Hoermann |

It is certified that error appears in the above-identified patent and that said Letters Patent is hereby corrected as shown below:

In the Specification

In Column 3, Line 56, delete "or and" and insert -- or/and --, therefor.

In Column 4, Line 40, delete "main( )" and insert -- main( ), --, therefor.

In Column 4, Line 41, delete "f1( )" and insert -- f1( ). --, therefor.

In Column 19, Line 19, delete "F30." and insert -- F3( ). --, therefor.

In Column 19, Line 21, delete "F20." and insert -- F2( ). --, therefor.

In Column 19, Line 22, delete "F30," and insert -- F3( ), --, therefor.

In Column 19, Line 22, delete "F30." and insert -- F3( ). --, therefor.

In Column 19, Line 42, delete "F20," and insert -- F2( ), --, therefor.

In Column 20, Line 24, delete "F1( )." and insert -- F1( )). --, therefor.

In Column 23, Line 66, delete "f10-f2" and insert -- f1-f2 --, therefor.

In Column 33, Line 24, delete "b1( )" and insert -- b1( )) --, therefor.

In Column 33, Line 37, delete "b1( )" and insert -- b1( ), --, therefor.

In Column 35, Line 66, delete "c2( )" and insert -- c2( )) --, therefor.

In Column 43, Line 56, delete "DVD/CD-ROM, volatile or non-volatile media such as" and insert the same on Column 43, Line 55, as a continuation of the same paragraph, therefor.

Signed and Sealed this
Fourteenth Day of October, 2025

John A. Squires
*Director of the United States Patent and Trademark Office*

In the Claims

In Column 45, Line 29, in Claim 1, delete "code, and" and insert -- code, --, therefor.